United States Patent [19]

Ogasawara et al.

[11] Patent Number: 5,675,638
[45] Date of Patent: Oct. 7, 1997

[54] COMMUNICATIONS DEVICE ENTRY METHOD AND APPARATUS

[75] Inventors: Hajime Ogasawara; Kenichi Hikawa, both of Kawasaki, Japan

[73] Assignee: Fujitsu Limited, Kanagawa, Japan

[21] Appl. No.: 405,540

[22] Filed: Mar. 16, 1995

[30] Foreign Application Priority Data

Mar. 17, 1994 [JP] Japan .................. 6-046705
Jan. 25, 1995 [JP] Japan .................. 7-009408

[51] Int. Cl.⁶ .................................................. H04M 3/42
[52] U.S. Cl. .................. 379/220; 379/58; 379/115; 379/219; 379/229; 379/207
[58] Field of Search .................. 379/207, 219, 379/220, 221, 225, 226, 227, 229, 230, 231, 232, 233, 234, 242, 245, 201, 56, 57, 58, 59, 60, 61, 62, 63, 112, 115, 265, 266, 114

[56] References Cited

U.S. PATENT DOCUMENTS

| | | | |
|---|---|---|---|
| 5,321,743 | 6/1994 | Bogart et al. | 379/234 |
| 5,337,352 | 8/1994 | Kobayashi et al. | 379/234 |
| 5,339,356 | 8/1994 | Ishii | 379/234 |
| 5,410,539 | 4/1995 | Ikeno | 379/234 |
| 5,422,943 | 6/1995 | Cooney et al. | 379/234 |
| 5,422,944 | 6/1995 | Sakai | 379/266 |
| 5,448,617 | 9/1995 | Hong et al. | 379/207 |
| 5,452,349 | 9/1995 | Uehara et al. | 379/234 |
| 5,481,603 | 1/1996 | Gutierrez et al. | 379/207 |

*Primary Examiner*—Thomas W. Brown
*Assistant Examiner*—Scott Wolinsky
*Attorney, Agent, or Firm*—Helfgott & Karas, P. C.

[57] ABSTRACT

When an optional communications device connected to a public network is entered as an extension terminal accommodated by a private network, the communications device sends a predetermined special number. If the service control device provided in the public network receives the special number, then it prompts the communications device for the identification information of a user of the communications device. At the prompt, the user transmits the user identification information from the communications device to the service control device. If the identification information is preliminarily entered, then the communications device sends a user number in the number system of the public network assigned to the communications device to the service control device. The service control device enters the user number as being associated with a predetermined number in a number system in the private network.

28 Claims, 41 Drawing Sheets

Fig. 9

DATA A1 (DATA OF EXCHANGE 42, SUBSCRIBER DATA)

| PHYSICAL ACCOMODATION NUMBER | SUBSCRIBER NUMBER | SERVICE PROFILE | | |
|---|---|---|---|---|
| | | | ENTRY SERVICE | |
| | | ⋯ | EFFECTIVE | ⋯ |
| XX-XXX | 044-954-XXXX | | | |

44 DATA BASE

DATA B1 (DATA OF EXCHANGE 43, INDEX DATA)

| 044-777-yyyy | |
|---|---|
| 044-954-XXXX | |

DATA B2 (DATA OF EXCHANGE 43, SPECIAL NUMBER INDEX)

| 0120-111-zzzz | |
|---|---|

DATA B3 (DATA OF EXCHANGE 43, DATA OF USER ENTERED FOR ENTRY SERVICE)

| PERSONAL ID | PASSWORD | EXTENSION NUMBER | NUMBER AT PRESENT ADDRESS | SERVICE CODE | REPRESENTATIVE NUMBER |
|---|---|---|---|---|---|
| 8111417 | 9999 | 45471 | 044-954-XXXX | 100 | 044-777-yyyy |
| 9900088 | 8888 | 45430 | 03-3456-XXXX | 110 | 044-777-yyyy |

DATA PBX 1 (DATA OF PBX)

| EXTENSION NUMBER | PHYSICAL ACCOMMODATION NUMBER |
|---|---|
|  |  |
| 45471 | EXTERNAL ENTRY NUMBER |
|  |  |

Fig. 11

| CTXID (CWCID) | ADDRESS |
|---|---|
| 7240 | 342 |
| 7250 | 343 |
| 7260 | 541 |
| 7270 | 823 |
| 7280 | 824 |
| ... | ... |

Fig. 22

SUBSCRIBER DATA U1

| SUBSCRIBER CODE | PASSWORD | DEFAULT EXTENSION | SERVICE PROFILE | MOBILITY INDEX |
|---|---|---|---|---|
| 8805521 | 3420 | 7114-3812 | $P_1$ | 1 |
| 8890346 | 0245 | 7114-3811 | $P_2$ | 0 |
| 9207789 | 3232 | 7114-5472 | $P_3$ | 1 |
| ... | ... | ... | ... | ... |

SUBSCRIBER DATA U2

| SUBSCRIBER CODE | PRESENT POSITION(DN) | PRESENT EXTENSION | SUBSCRIBER TYPE |
|---|---|---|---|
| 8805521 | 852-4545 | 7114-3812 | 0 |
| 9207789 | 751-4600 | 7113-2010 | 6 |
| 4723335 | 321-5002 | 7113-2013 | 0 |
| ... | ... | ... | ... |

INDEX DATA

| CTX | Index |
|---|---|
| 7240 | |
| 7250 | |
| 7260 | |
| ... | |

Fig. 23

| SUBSCRIBER CODE | SERVICE NAME | | | | | | TRIGGER CONDITION | | | |
|---|---|---|---|---|---|---|---|---|---|---|
| | A | B | C | D | E | F | a | b | c | d |
| 880521 | 1 | 1 | 0 | 0 | 1 | 0 | 1 | 1 | 1 | 1 |
| 890346 | 1 | 0 | 0 | 0 | 1 | 0 | 1 | 0 | 1 | 1 |
| ... | | | | | | | | | | |

Fig. 24

SERVICE PROFILE DATA SPF

| SUBSCRIBER SERVICE NUMBER | |
|---|---|
| CALL WAITING | 1 |
| AUTOMATIC RE-DIAL | 0 |
| 3-PERSON COMMUNICATIONS | 1 |
| ⋮ | ⋮ |
| CALL ISSUE DETECTION TRIGGER | 1 |
| BUSY DESTINATION DETECTION TRIGGER | 0 |
| HOOKING DETECTION TRIGGER | 1 |
| ⋮ | |

Rows "CALL WAITING", "AUTOMATIC RE-DIAL", "3-PERSON COMMUNICATIONS" grouped as SERVICE NAME.
Rows "CALL ISSUE DETECTION TRIGGER", "BUSY DESTINATION DETECTION TRIGGER", "HOOKING DETECTION TRIGGER" grouped as TRIGGER CONDITION.

Fig. 25

EXCHANGE DATA SSP

| PHYSICAL ACCOMMODATION NUMBER | COMMON SUBSCRIBER TELEPHONE NUMBER (TELEPHONE NUMBER) | TRIGGER INFORMATION | | | |
|---|---|---|---|---|---|
| | | TRIGGER a | TRIGGER b | TRIGGER c | TRIGGER d |
| XX-XXXX | 852-4545 | 0/1 | 0/1 | 0/1 | 0/1 |
| .... | .... | | | | |

Fig. 30

COMMUNICATIONS DEVICE ENTRY METHOD AND APPARATUS

BACKGROUND OF THE INVENTION

1. Field of the Invention

The present invention relates to a communications service among networks having different number systems, and to a communications service for entering an optional communications device in a public network as a terminal unit to be provided with specific services.

2. Description of the Related Art

Since large companies and organizations which are equipped with a large number of communications devices such as telephones, facsimiles, etc. frequently set intra-office communications, they establish local networks or private networks to reduce communications costs. In a private network, user-defined extension numbers can be assigned optionally. For example, many number systems have parent numbers as extensions of respective communications devices classified by division or department category. Extension numbers are defined as 2 to 8 digits in many cases and are easy for users in the company to memorize. Exchanging processes in a private network and between the private network and a public network are normally performed by a private branch exchange (PBX).

If a user of a communications device accommodated in a private network communicates with another communications device in the private network, then he or she can establish communications by entering a defined extension number for the other communications device without using a public network.

When a common user externally communicates with a communications device in a private network, the common user first calls a telephone operator using, for example, a master number of the private network to have the telephone operator connect the calling user with the destination number. If an extension number of each communications device in the private network corresponds to a common subscriber number in a common number system of a public network (hereinafter referred to as an external number), then the common user external to the private network enters his or her external number and the PBX receives the external number, converts it into an extension number corresponding to the external number, and calls up the corresponding communications device.

If a user of the communications device in the private network communicates with a common user of a communications device external to the local area network, then the user first enters, for example, zero to notify the PBX of a request to call to an external number and then enters the external number to actually calls up the corresponding communications device.

Recently, centralized extension services have been realized to provide the functions of the PBX through a station exchange (an exchange of a common carrier). In the centralized extension service, functions are added to provide various services for the station exchange. A user who requests to use the centralized extension service is allowed, by contract with the common carrier, to be provided with the service for a group (a subscriber group) consisting of contract users as if the service is realized by a PBX.

The PBX and the centralized extension service provide various services in addition to the interconnection of extensions of the communications devices accommodated in the PBX (or the communications devices in a group of the centralized extension service). The additional services can be, for example, an automatic connection between an internal number and an external number, a call waiting, a transfer of a call, a conference through a communications system, etc.

Employees of a company which adopts the above described PBX or has subscribed for a centralized extension service frequently make phone calls and sends facsimile letters from external places to their company. Especially, those working at their homes have more opportunities to communicates with the members of the company.

However, if communications should be set from an external place to the private network of the company using a conventional communications system, then the sender has to call up the telephone operator first, and then enters an external number. Therefore, a convenient extension number cannot be used and a smooth work flow is disturbed. Since the communication fee is charged to the external user in this case except when a collect call is specified, thereby unfavorably charging a calling person.

When communications are set from a private network, that is, a company, to an employee working at home, it is also necessary to use the external number of the employee's communications device. Thus, it is more inconvenient than intra-office communications using extensions.

The above described nuisance can be easily solved if the home-working employee's communications device is entered for a centralized extension service. However, the existing centralized extension service system provides various services only for a communications device connected to a specified line designated when a contract is made. Therefore, a communications device (a communications device of a common user) not entered for the centralized extension service system is not provided with an extension connecting service or an automatic connection service between an internal number and an external number. For example, if an employee calls up his or her company from where he or she is on his or her business trip, then an extension number cannot be used. Thus, a communications device of a common user connected to a public network has never been used as being connected as if it were a communications device connected to a specific PBX or that entered for a centralized extension service.

If a communications device connected to a public network can be used as if it were a communications device accommodated by a specific PBX (or a centralized extension service system), then the communications device will be conveniently used by accepting various services through the PBX (or the centralized extension service system).

The present invention has been developed to solve the above described problems, and aims to realize a communications service system in which a communications device connected to a public network can be connected as a communications device in a network having a different number system. Another object of the present invention is to provide a service system in which a communications device connected to a public network is entered as a terminal unit in a specific group and the entered terminal unit receives services provided within the group.

SUMMARY OF THE INVENTION

The present invention has been developed to solve the above described problems, and aims to realize a communications service system in which a communications device connected to a public network can be connected as a communications device in a network having a different number system. Another object of the present invention is to provide a service system in which a communications device connected to a public network is entered as a terminal unit in a specific group and the entered terminal unit receives services provided within the group.

A method of entering the communications device according to a first aspect of the present invention is based on a communications system in which the first communications network of the first number system is connected to the second communications network of the second number system. This method is followed in the following steps. A predetermined special number is issued from a communications device connected to a first communications network. The service control device receives a special number and issues to the communications device a request for an identification information of the user of the communications device. In response to the request from the service control device, the identification information about the user is transmitted from the communications device to the service control device. If the service control device recognizes the above described identification information as a predetermined information, then the communications device issues to the service control device the user number of the first number system assigned to the above described communications device. The service control device associates the user number with a predetermined number in the second number system.

According to the above described entry method, the communications device is entered if the user identification information matches the preliminarily entered information. Therefore, only a specified user can enter a communications device as a device belonging to anther number system.

The service control device with entry capabilities of the first aspect is based on the communications system in which the first communications network of the first number system is connected to the second communications network of the second number system. This service control device is pursued using the following units.

That is, upon receipt of a predetermined special number from the communications device connected to the first communications network, an identification information requesting unit issues to the communications device a request for the identification information about the user of the communications device. A confirming unit receives the user identification information and checks whether or not the identification information matches the preliminarily entered information. When the confirming unit confirms that the identification information matches the preliminarily entered information, then a user number requesting unit issues to the communications device a request for the user number assigned to the communications device in the first number system. An entering unit receives the user number transmitted in response to the above described request from the communications device, and enters in a data base the user number as being associated with the predetermined number in the second number system.

In the communications system according to the first aspect, the first communications network of the first number system is connected to the second communications network of the second number system. The communications system comprises a communications device connected to the first communications network and assigned a predetermined number of the first number system. A service control device (for example, a service control device comprising the above listed units) with entry capabilities communicates with the communications device in a predetermined procedure, associates the predetermined number of the first number system assigned to the above described communications device and obtained from the communications device with a predetermined number of the second number system, and enters them in a data base. An exchange accommodates an office line connected to the first communications network and extensions of the second communications device.

The communications device according to a second aspect is an intelligent network (IN) comprising a first SSP (Service Switching Point) accommodating centralized extension service subscribers belonging to a centralized extension service group, a network connected to the first SSP, and a network SCP (Service Control Point), connected to the network, for managing the services provided by the centralized extension service group. In response to the communications set through a call from a centralized extension service subscriber or the communications to the centralized extension service subscriber, the network SCP controls the services for the centralized extension service subscribers. Since the network SCP provided in the network manages centralized extension services, the configuration of the SSP can be easily changed by simply changing the software in the network SCP.

The system can further comprises a second SSP connected to the above described network. If a subscriber accommodated by the second SSP is entered, in a predetermined procedure, as a centralized extension service subscriber who receives services from the centralized extension service group, the network SCP sets a trigger for the second SSP. When the trigger is detected by the second SSP in the communications through a call from or to the entered centralized extension service subscriber, the network SCP controls the services for the centralized extension service subscribers based on the detected trigger. Thus, any communications device accommodated in the second SSP can receive a desired centralized extension service.

The method of entering a communications device according to the second aspect is applied to the system comprising a first exchange (SSP) accommodating centralized extension service subscribers grouped according to predetermined centralized extension service identification information, a network SCP, connected to the first exchange, for managing the centralized extension services, and a second exchange (SSP) connected to the network. The method is pursued in the following steps. When the second exchange receives a predetermined special number for entry from one of its own communications devices, the network SCP is informed of the special number for entry and the identification number of the communications device. The network SCP issues to the communications device a request for the centralized extension service identification information and the identification information of a user who sent the special number for entry. In response to the request, the communications device transmits to the network SCP the centralized extension service identification information and the user identification information. Based on the centralized extension service identification information or the user identification information, the network SCP determines a centralized extension service to be provided for the communications device. According to this method, a communications device can be entered as a device to receive a centralized extension service provided for centralized extension service subscribers accommodated by the first exchange.

The communications method according to the second aspect is applied to the communications system comprising a first exchange (SSP) accommodating centralized extension service subscribers grouped according to a predetermined centralized extension service identification information, a network SCP, connected to the first exchange, for managing the centralized extension services, a second exchange SSP connected to the network, and a communications device accommodated by the second exchange and entered for the centralized extension service in a predetermined procedure. The method is pursued in the following steps.

The steps are performed after the second exchange has detected a trigger set in itself based on the service provided for the communications device in the communications in response to a call from the communications device or in the communications for the arrival of a call to the communications device. That is, the second exchange notifies the network SCP of the type of the detected trigger and the identification number of the communications device. The network SCP issues an instruction to control the first or the second exchange according to the detected trigger type and the identification number. According to the communications method, a centralized extension service can be provided for any communications device accommodating the second exchange by setting in the second exchange a trigger corresponding to the desired centralized extension service.

The exchange according to the second aspect is provided in a communications system having an SCP for managing centralized extension services and controls the exchange of the communications through the centralized extension services of accommodated subscribers. The exchange comprises the following units. According to an instruction from the SCP, a trigger setting unit sets a trigger corresponding to a service provided for an accommodated subscriber. A trigger detecting unit detects a trigger set by the trigger setting unit. When the trigger detecting unit detects the trigger, a notifying unit informs the SCP of it and issues a request to control a switching process. Therefore, if a trigger is set in an exchange corresponding to a desired centralized extension service, then a communications device accommodating the exchange can receive the service.

The service control device (corresponding to SCP) according to the second aspect controls the communications through centralized extension services for the subscribers accommodated in an exchange. The device comprises the following units. That is, an identification information requesting unit receives from a communications device accommodated in the exchange a special number for entry and an identification number of the communications device, and requests the communications device for the centralized extension service identification information and the identification information of the user who sent the special number for entry. A service determining unit determines a service provided for the user according to the centralized extension service identification information or the user identification information transmitted from the communications device in response to the request. A trigger set instructing unit instructs the exchange to set a trigger corresponding to the service determined by the service determining unit. According to the service control device, when a communications device accommodated in the exchange is entered as a centralized extension service terminal unit, the communications device is allowed to be provided with the centralized extension service depending on the centralized extension service identification information or the above described user identification information.

The service control device (corresponding to SCP) is provided in a communications system comprising a first exchange for accommodating centralized extension service subscribers, a second exchange connected to the first exchange over a network, and a communications device accommodated in the second exchange and entered for a centralized extension service in a predetermined procedure. The service control device can further comprises the following units. A trigger recognizing unit receives from the second exchange a trigger detection notification indicating that the trigger associated with the communications in response to a call from the communications device or the communications as the arrival of a call to the communications device has been detected. It also receives the identification information of the communications device, and then determines the type of the trigger. A control instructing unit issues an instruction to control the first or second exchange according to the trigger type determined by the trigger recognizing unit and the identification information of the communications device. According to the above described service control device, the communications device can be provided with a predetermined service by controlling the first or second exchange based on the trigger set in the first exchange.

BRIEF DESCRIPTION OF THE DRAWINGS

FIG. 9 shows an example of a configuration of the data (subscriber data) managed by the internal/external exchanges to a city;

FIG. 11 shows an example of a configuration of data managed by the PBX;

FIG. 22 shows the configuration of the data of the centralized extension service group;

FIG. 23 shows the configuration of centralized extension service subscriber data;

FIG. 24 shows an example of a configuration of data of a service profile;

FIG. 25 shows another example of a configuration of data of a service profile;

FIG. 30 shows the configuration of the data of the exchange managed by the SSP-A;

DESCRIPTION OF THE PREFERRED EMBODIMENTS

The embodiments of the present invention are described below by referring to the attached drawings.

Figure 1:
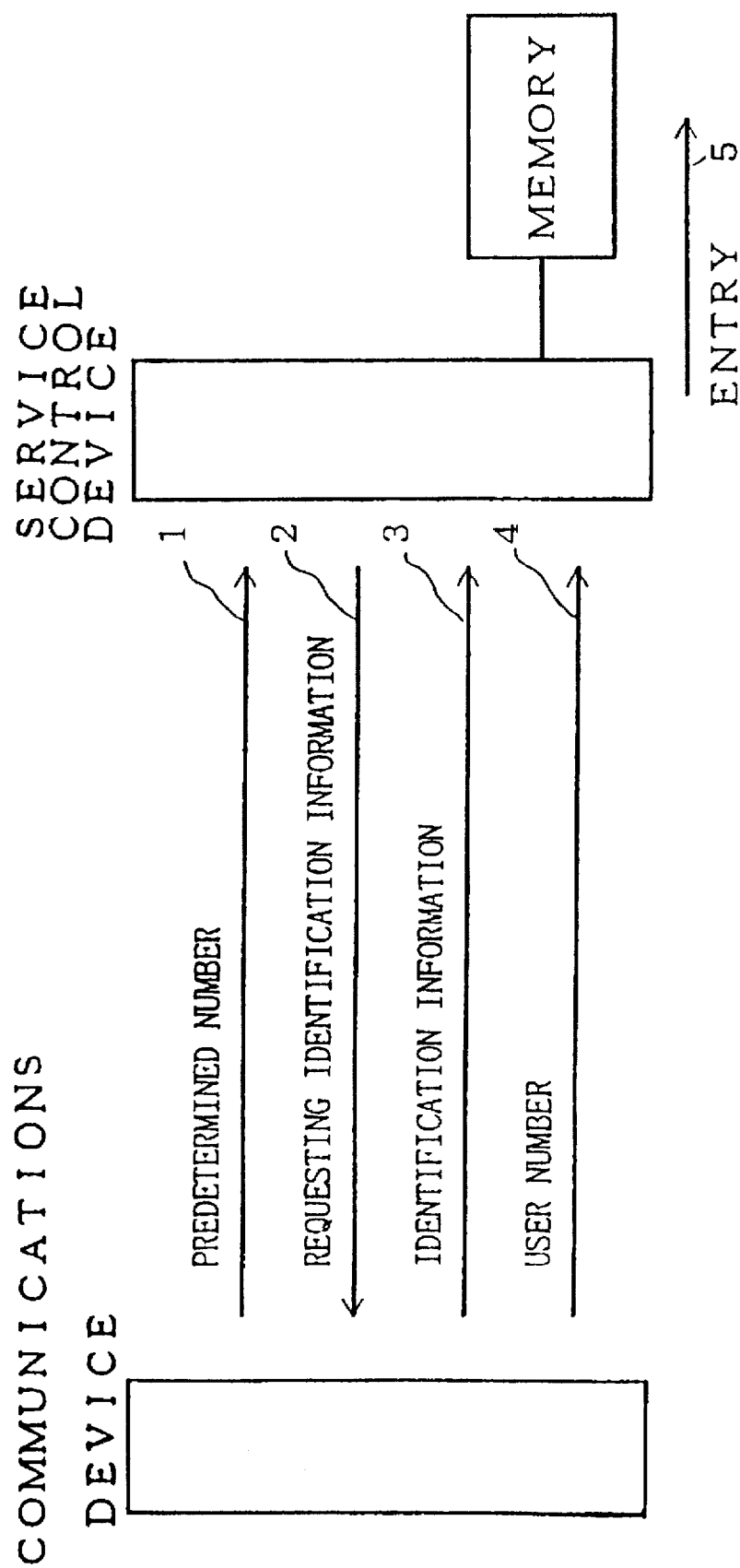
FIG. 1 shows the principle of the method of entering the communications device according to the first aspect of the present invention.

The first aspect of the present invention is described as follows by referring to FIGS. 1 and 2, and the second by referring to FIGS. 3 and 4. Two embodiments to be described of the first aspect will be called the first embodiment and the second embodiment; two embodiments to be described of the second aspect will be called the third embodiment and the fourth embodiment. FIG. 1 shows the method of entering a communications device.

The entry method of the present invention is based on a communications system having the first communications network of the first number system connected to the fourth communications network of the fourth number system. The entry method comprises the following steps where the first number system refers to common subscribers' telephone numbers. The fourth communications network can be, for example, a private network or a local network and the fourth number system refers to extension numbers.

In step 1, a communications device (for example, a telephone set) connected to the first communications network issues a predetermined special number. The predetermined number corresponds to the fourth communications network.

In step 2, upon receipt of the special number, the service control device connected to the first communications network issues to the communications device a request for the user identification information of the communications device.

In step 3, in response to the request from the service control device, the communications device transfers the user identification information to the service control device. The user identification information can be, for example, an employee number or a password.

In step 4, if the service control device recognizes that the identification information matches the preliminarily entered information, then the communications device transmits to the service control device a user number (for example, a common subscriber telephone number) of the first number system assigned to the communications device. Additionally, in the event of such a match, a user number requesting unit 13 asks the communications device for the user number assigned to the communications device in the first number system (first user number).

In step 5, the service control device associates the user number of the communications device with a predetermined number of the fourth number system.

In the above described entry method, a user issues a predetermined number from the user's communications device in step 1 so that the user can enter an optional communications device as a communications device in the communications network of the fourth number system. Since the user identification information is checked in steps 2 and 3, the security is guaranteed by enabling only a specified user (for example, an employee of the company which has established the private network) who correctly inputs an authorized identification information, e.g. an employee number and a password to enter his or her communications device. In steps 4 and 5, a user number assigned to the communications device, that is, the user number of the user's present communications device is entered as being associated with a predetermined number of the fourth number system. Therefore, any communications device in the first communications network can be entered in the communications network of the fourth number system.

Figure 2:
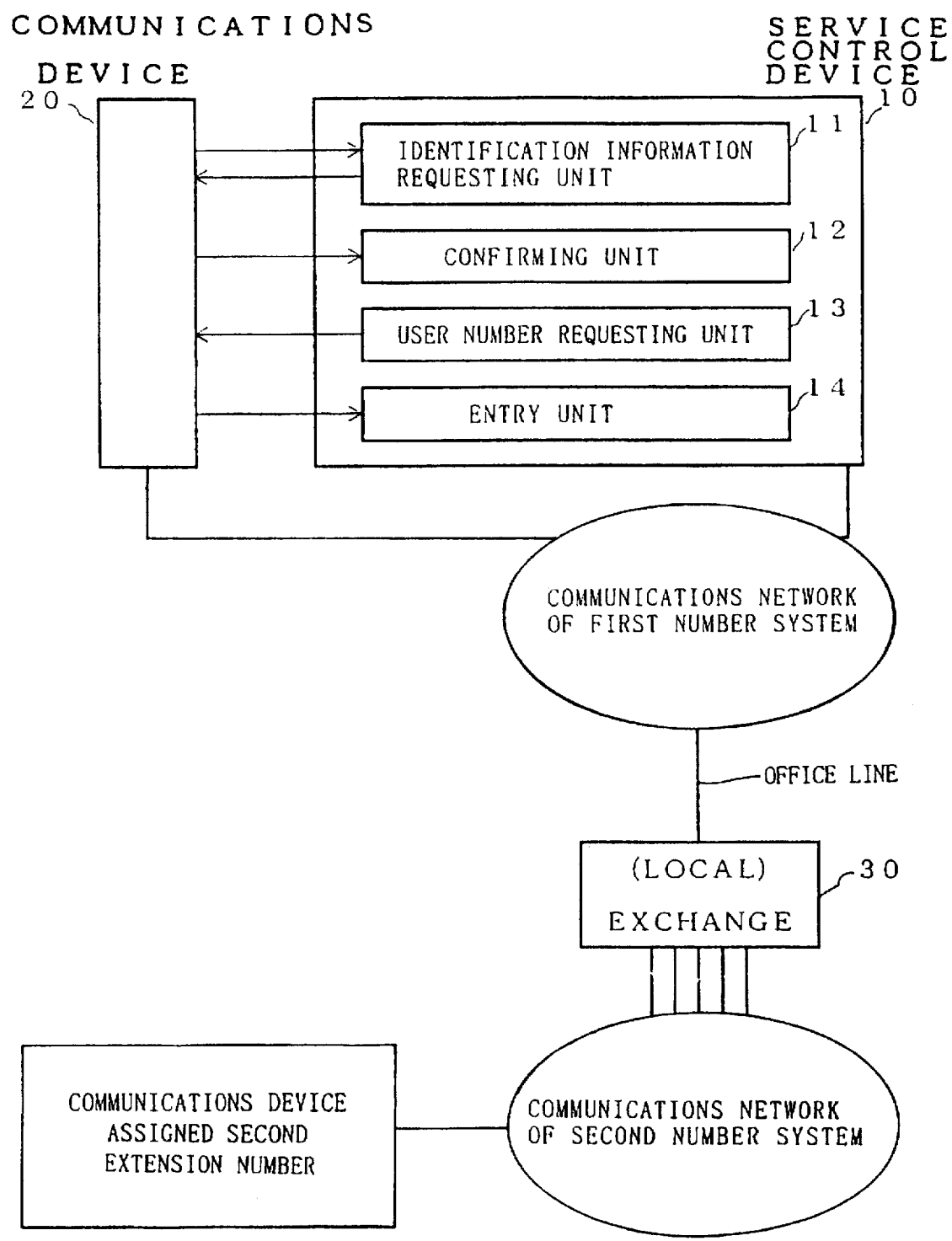
FIG. 2 shows the communications system comprising the communications control device and the communications system supporting the communications control device according to the first aspect of the present invention.

FIG. 2 shows the service control device with entry capabilities of the present invention and the communications device comprising the service control device.

A service control device 10 is used to enter a communications device as explained above by referring to FIG. 1, and comprises the following units 11 through 14.

Upon receipt of a predetermined special number by the communications device connected to the first communications network, an identification information requesting unit 11 issues to the communications device a request for identification information of the user of the communications device.

Upon receipt of the identification information from the communications device, a confirming unit 12 checks whether or not the identification information matches the preliminarily entered information.

If it is determined that the identification information matches the preliminarily entered information, then a user number requesting unit 13 requests the communications device for the user number assigned to the communications device in the first number system (first user number).

An entry unit 14 associates the user number (first user number) with a predetermined number (first extension number) of the fourth number system, and then enters them in the data base.

Each of the above listed units 11 through 13 can be realized, for example, software for executing the above described processes, the CPU for executing the software, etc. The entry unit 14 comprises a data base management system, a storage device for storing the data base, etc.

In addition to the service control device 10, the communications system according to the first aspect of the present invention further comprises a communications device 20 connected to the first communications network (for example, a public network) and assigned the first user number of the first number system, and an exchange 30 accommodating office lines connected to the first communications network and the extensions of the fourth communications network (for example, a private network).

When the communications device 20 issues a fourth extension number of the fourth number system, the service control device 10 transmits the fourth extension number to the exchange 30. When any communications device accommodated as an extension of the private network issues the first extension number, the service control device 10 extracts the first user number by referring to the correspondence data stored in the entry unit 14, and calls the communications device 20 using the first user number.

In the above described communications device, a user of the communications device 20 can communicates with any communications device in the fourth communications network (private network) using an extension number of the fourth number system because the service control device 10 transfers the fourth extension number to the exchange 30 when the fourth extension number of the fourth number system is issued by the communications device 20 entered in the procedure explained above.

If any communications device accommodated as an extension of the private network issues the first extension number, the first service control device 10 exercises control such that the communications device 20 is called by the first user number of the first number system. As a result, a user accommodated in the private network can communicate, using the first extension number of the fourth number system, with the communications device connected to the first communications network (public network) and entered with its extension number.

The fourth aspect of the present invention is explained below by referring to FIGS. 3 and 4. FIG. 3 shows the third embodiment, and FIG. 4 shows the fourth embodiment of the present invention.

Figure 3:
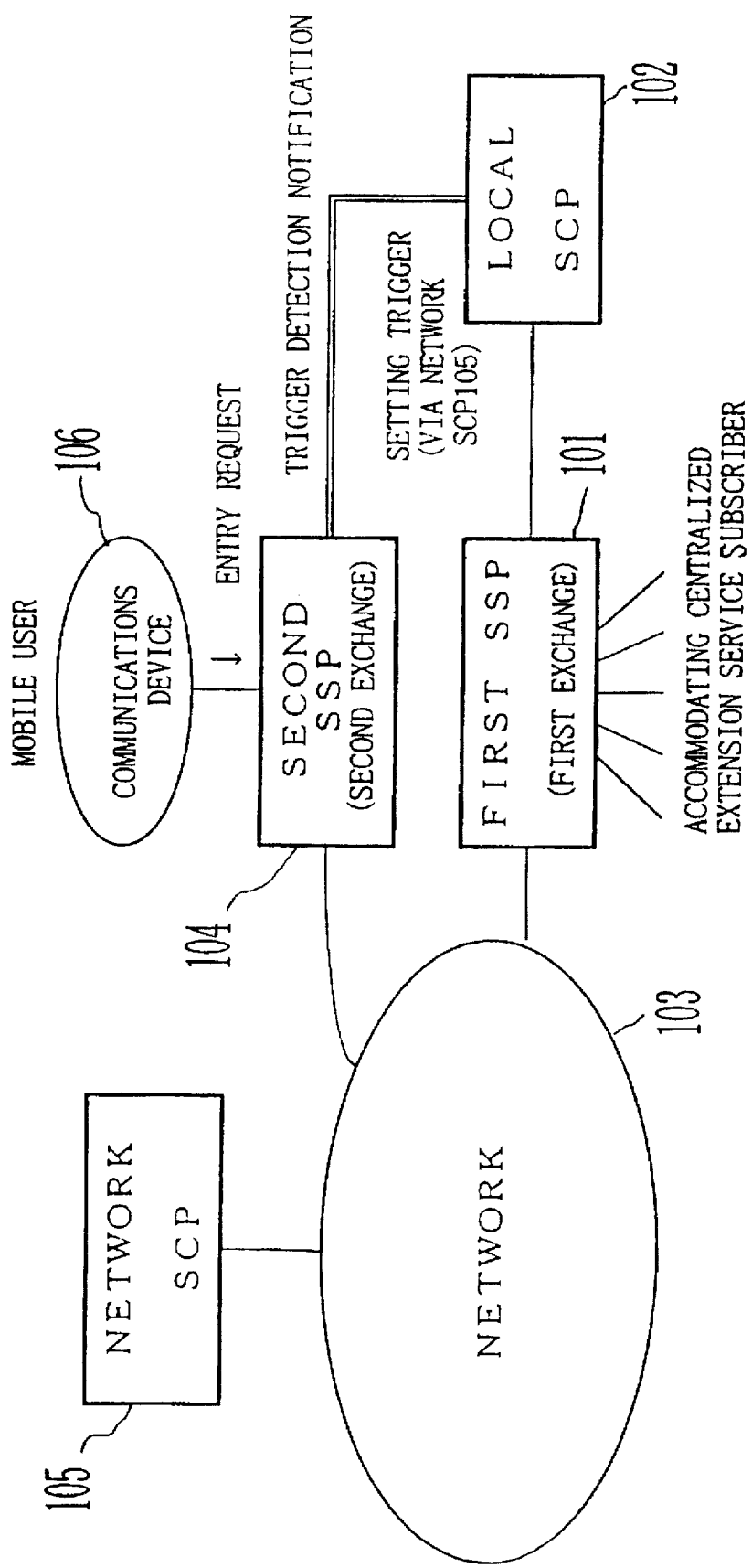
FIG. 3 shows the configuration of the first embodiment according to the second aspect of the present invention.

The communications system according to the third embodiment shown in FIG. 3 is an intelligent network comprising a first service switching point (SSP) 101 accommodating centralized extension service subscribers who belong to a predetermined centralized extension service group; and a local service control point (SCP) 102, provided corresponding to the first SSP 101, for managing services to be provided for the centralized extension service group. In response to the communications associated with the issue of a call from a centralized extension service subscriber or the communications associated with the arrival of a call at the centralized extension service subscriber, the local SCP 102 provides a centralized extension service to the centralized extension service subscriber.

The system further comprises a network 103 connected to the first SSP 101, a fourth SSP 104 connected to the network 103, and a network SCP 105 connected to the network 103. Then, a subscriber (communications device 106) accommodated in the fourth SSP 104 is entered in a predetermined procedure as a centralized extension service subscriber to be provided with services for the centralized extension service group. At this time, the network SCP 105 sets a trigger for the fourth SSP 104 based on the instruction from the local SCP 102. If the fourth SSP 104 detects the trigger in the communications associated with a call from or to the entered centralized extension service subscriber (communications device 106), the local SCP 102 exercises control such that the entered centralized extension service subscriber can be provided with the service based on the trigger.

The trigger is set based on the identification information of the centralized extension service group or of the entered centralized extension service subscriber.

Figure 4:
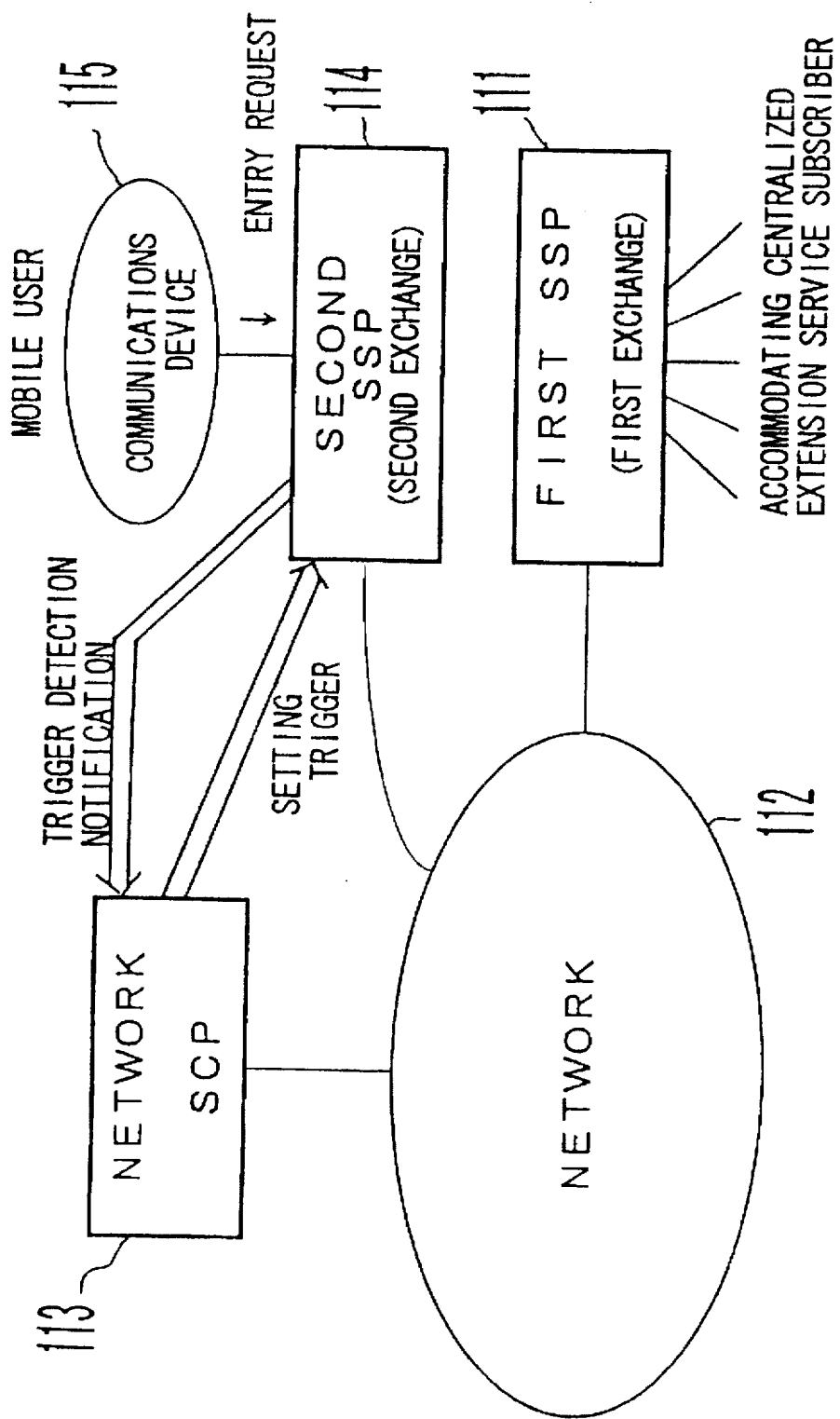
FIG. 4 shows the configuration of the second embodiment according to the second aspect of the present invention.

The communications system according to the fourth embodiment shown in FIG. 4 is an intelligent network comprising a first SSP 111 accommodating centralized extension service subscribers who belong to a predetermined centralized extension service group; a network 112 connected to the first SSP 111, and a network SCP 113, connected to the network 112, for managing services to be provided for the centralized extension service group. In the communications associated with the issue of a call from a centralized extension service subscriber or the communications associated with the arrival of a call at the centralized extension service subscriber, the network SCP 113 provides the service for the centralized extension service subscriber.

The system further comprises a fourth SSP 114 connected to the network 112, and enters in a predetermined procedure a subscriber (communications device 115) accommodated in the fourth SSP 114 as a centralized extension service subscriber to be provided with services for the centralized extension service group. At this time, the network SCP 113 sets a trigger for the fourth SSP 114. If the fourth SSP 114 detects the trigger in the communications associated with a call from or to the entered centralized extension service subscriber, the network SCP 113 exercises control such that the entered centralized extension service subscriber can be provided with the service based on the trigger.

In the communications system according to the fourth aspect of the present invention shown in FIG. 3 or 4, a system can be designed independently of the architecture of the first SSP 101 (111) by establishing a centralized extension service by an intelligent network.

When any of the communications devices 106 (115) not preliminary entered for a centralized extension service is to be entered for it, a predetermined trigger is set in the fourth SSP 104 (114) accommodating the communications device 106 (115). If the trigger has been detected, a centralized extension service is provided based on the trigger for the communications device 106 (115). Thus, a user can enter, at any place where he or she is, any communications device connected to the fourth SSP 104 (114) for a centralized extension service.

If the trigger is set according to the identification information of a centralized extension service group for subscription, then the communications device 106 (115) can receive the same services as a subscriber preliminarily entered in the group. On the other hand, if the trigger is set based on the identification information of a subscriber (user) who enters the communications device 106 (115), then the communications device 106 can be provided with a specific service to the user. Thus, various services can be available using the trigger.

According to the fourth aspect of the present invention, N units of the first SSPs 101 (111) can accommodate centralized extension service subscribers. Among the communications devices accommodated by the first SSP 101 (111), those not preliminary entered for a centralized extension service can be entered as a centralized extension service terminal.

The communications device entry method according to the third embodiment of the present invention is based on a communications system comprising a first exchange 101 accommodating centralized extension service subscribers who belong to a predetermined centralized extension service group, a local SCP 102, provided corresponding to the first exchange 101, for managing centralized extension services, the network SCP 105 connected to the first exchange 101 through the network 103, and the fourth exchange 104 connected to the network 103. The system is performed in the following steps.

When the first exchange 101 receives a predetermined special number for entry from communications devices 106 accommodated by the fourth exchange 104, the network SCP 105 is informed of the entered special number for entry and an identification number of the communications device 106. The network SCP 105 notifies the local SCP 102 of the entered special number for the entry and the identification number of the communications device 106. In response to the information, the local SCP 102 requests the communications device 106 to provide the local SCP 102 with the identification information of the centralized extension service and the identification information of the user who sent the special number for entry from the communications device 106. In response to the request, the communications device 106 transmits to the local SCP 102 the identification information of the centralized extension service and the user identification information. The local SCP 102 determines the centralized extension service to be provided for the communications device 106 based on the above listed identification information received from the communications device 106.

The communications device entry method according to the fourth embodiment of the present invention is based on a communications system comprising a first exchange 111 accommodating centralized extension service subscribers who belong to a predetermined centralized extension service group, the network SCP 113, connected to the first exchange 111 through the network 112, for managing centralized extension services, and the fourth exchange 114 connected to the network 112. The system is performed in the following steps.

When the first exchange 111 receives a predetermined special number for entry from communications devices 115 accommodated by the second exchange 114, the network SCP 113 is informed of the entered special number for entry and an identification number of the communications device 115. In response to the information, the network SCP 113 requests the communications device 115 to provide the network SCP 113 with the identification information of the centralized extension service and the identification information of the user who sent the special number for entry from the communications device 115. In response to the request, the communications device 115 transmits to the network SCP 113 the identification information of the centralized extension service and the user identification information. The network SCP 113 determines the centralized extension service to be provided for the communications device 115 based on the above listed identification information received from the communications device 115.

The above described method of entering a communications device according to the fourth aspect of the present invention can further comprise the following steps. Based on the determined centralized extension service, the local SCP 102 (or the network SCP 113) sets a trigger in the fourth exchange 104 (or 114) to activate the centralized extension service. The local SCP 102 (or the network SCP 113) assigns to the communications device 106 (or 115) a number in the number system to be used in the centralized extension service group. The local SCP 102 (or the network SCP 113) obtains a service to be provided for the communications device 106 (or 115) by communicating with the user through the communications device 106 (or 115), and associates the obtained service with the user identification information to store the data in a service profile.

In the above described entry method, a user transmits identification information of a centralized extension service or of the user when a desired communications device 106 (115) is entered for the centralized extension service, and thus determines the service to be provided for the communications device 106 (115) according to the information. Therefore, the communications device 106 (115) can receive the same service as a subscriber preliminarily entered in the group if the service is determined according to the identification information of the centralized extension service group. On the other hand, if the service is determined according to the user identification information, then the communications device receives a service specific to the user.

Another entry method according to the fourth aspect of the present invention is based on a communications system comprising a first exchange 101 (111) accommodating centralized extension service subscribers who belong to a predetermined centralized extension service group, a SCP 102 (113) for managing centralized extension services, and the second exchange 104 (114) connected to the first exchange 101 (111) through the network 103 (112). The system is performed in the following steps.

When the first exchange 101 (111) receives a predetermined special number for mobility entry from the first communications device 106 (115) accommodated by the fourth exchange 104 (114), it notifies the SCP 102 (113) of the special number for mobility entry and the identification number of the first communications device 106 (115). The SCP 102 (113) requests the first communications device 106 (115) to provide the SCP 102 (113) with the identification information of the centralized extension service and the identification information of the user who sent the special number for mobility entry from the first communications device 106 (115). In response to the request, the first communications device 106 (115) transmits to the SCP 102 (113) the identification information of the centralized extension service and the user identification information. The SCP 102 (113) receives the above mentioned identification information from the first communications device 106 (115), and requests the user to enter the mobile time information. In response to the request, the first communications device 106 (115) transmits the mobile time information to the SCP 102. If the first communications device 106 (115) receives a call during the time specified by the mobile time information, then the SCP 102 (113) exercises control on the call such that the sender can be provided with a predetermined service. The SCP 102 (113) requests the user to enter the identification number of the fourth communications device provided at the user. The SCP 102 (113) enters the fourth communications device for the centralized extension service when the time period specified by the mobility time information has passed.

The communications method according to the third embodiment of the present invention is based on a communications system comprising a first exchange 101 accommodating centralized extension service subscribers who belong to a predetermined centralized extension service group, a local SCP 102, provided corresponding to the first exchange 101, for managing centralized extension services, the network SCP 105 connected to the first exchange 101 through the network 103, the fourth exchange 104 connected to the network 103, and the communications device 106 accommodated by the fourth exchange 104 and entered for a centralized extension service in a predetermined procedure. A trigger is set in the fourth exchange 104 depending on a service provided for the communications device 106. The communications method is pursued in the following steps. That is, if a trigger is detected in the communications associated with a call from or to the communications device 106, then the fourth exchange 104 notifies the network SCP 105 of the type of the detected trigger and the identification number of the communications device 106. The network SCP 105 notifies the local SCP 102 of the fourth trigger information indicating the type of the trigger received through the notification and the identification number received through the notification. Based on the fourth trigger information and the identification number received through the notification, the local SCP 102 issues an instruction to control the first exchange 101 or the fourth exchange 104.

When the fourth exchange 104 detects a predetermined trigger in the communications associated with the user-entered communications device 106 in the above described communications method, the network SCP 105 is informed of the detection of the trigger. Then, the network SCP 105 informs the local SCP 102 of the detection as the fourth trigger information to provide a service. Therefore, in a communications system in which the centralized extension services associated with the first exchange 101 accommodating centralized extension service subscribers are managed by the local SCP 102 corresponding to the exchange, and the network SCP 105 manages the routing information between the first exchange 101 and the fourth exchange 104, the communications device 106 accommodated by the fourth exchange 104 can receive the same service as a centralized extension service subscriber accommodated by the first exchange 101.

The communications method according to the fourth embodiment of the present invention is based on a communications system comprising a first exchange 111 accommodating centralized extension service subscribers who belong to a predetermined centralized extension service group, the network SCP 113, connected to the first exchange 111 through the network 112, for managing centralized extension services, the fourth exchange 114 connected to the network 112, and the communications device 115 accommodated by the fourth exchange 114 and entered for a centralized extension service in a predetermined procedure. A trigger is set in the fourth exchange 114 depending on a service provided for the communications device 115. The communications method is pursued in the following steps. That is, if a trigger is detected in the communications associated with a call from or to the communications device 115, then the fourth exchange 114 notifies the network SCP 103 of the type of the detected trigger and the identification number of the communications device 115. The network SCP 113 issues an instruction to control the first exchange 111 or the fourth exchange 114 according to the type of the detected trigger and the identification number.

If the fourth exchange 114 has detected a predetermined trigger in the communications associated with the user-entered communications device 115 in the above described communications method, the network SCP 113 is informed of the detection of the predetermined trigger to provide the service for the communications device 115. In this method, the network SCP 113 manages not only the routing information between the exchanges 111 and 114 but also the information associated with centralized extension services. As a result, the communications device 115 can quickly receive a predetermined service corresponding to the detected trigger.

The exchange and the service control device (SCP) according to the fourth aspect of the present invention is described below by referring to FIGS. 5 through 7.

Figure 5:
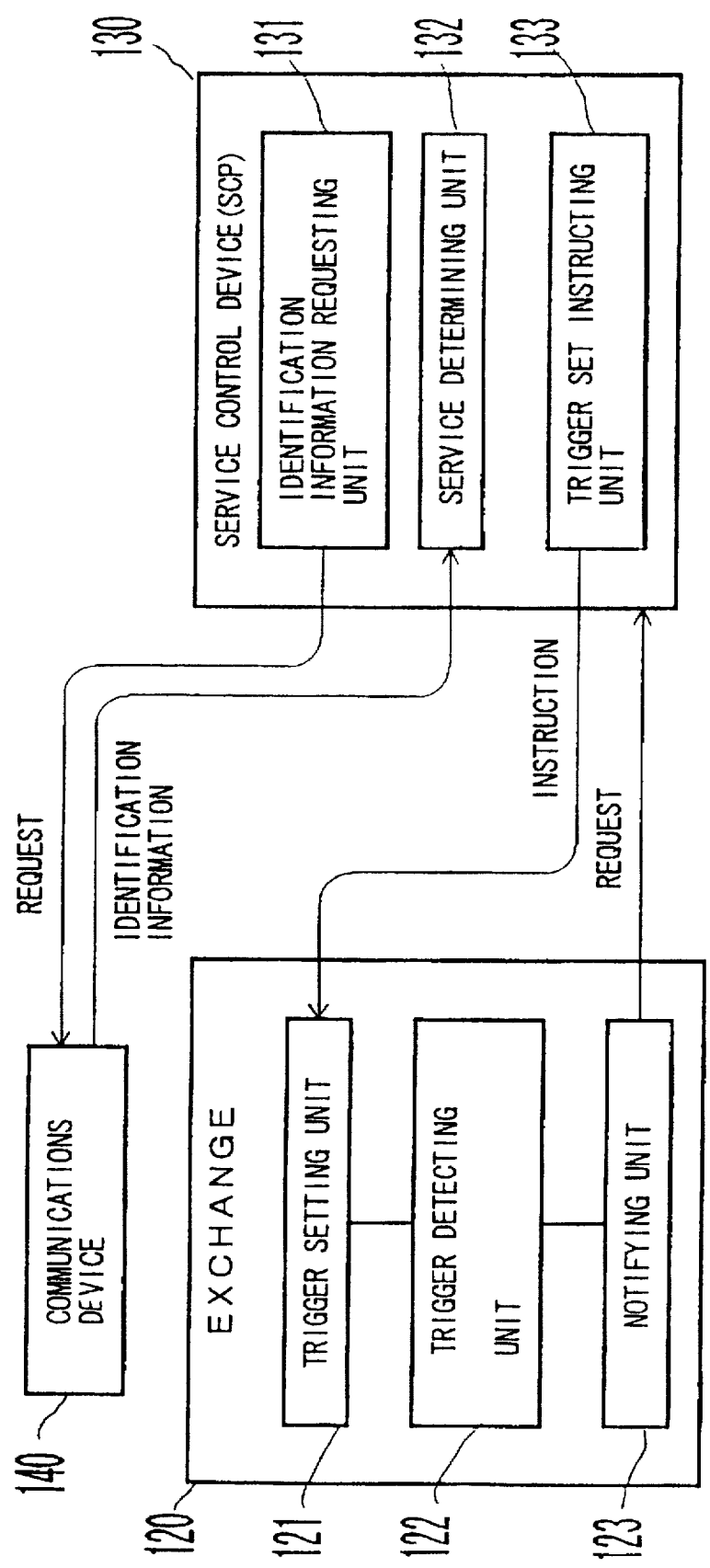
FIG. 5 is a block diagram of the exchange and the service control device according to the second aspect of the present invention.

FIG. 5 shows an exchange 120 in the communications system according to the fourth aspect of the present invention. The exchange 120 controls a switching operation at a control instruction from an SCP 130 for managing centralized extension services, and comprises the following units. A trigger setting unit 121 provides, for example, a memory and sets in the memory a trigger corresponding to a service provided for an accommodated subscriber at an instruction from the SCP 130. A trigger detecting unit 122 is provided for each trigger and detects the trigger set by the trigger setting unit 121. When the trigger detecting unit 122 has detected the trigger, a notifying unit 123 notifies the SCP 130 of the detection and issues an exchange control instruction. The units 121 through 123 comprises, for example, a program describing the procedure of the above process, a CPU for executing the program, a memory for storing the program, etc. The exchange can be applied to the communications system in the above described first and second embodiments.

The service control device 130 is provided in the communications system according to the fourth aspect of the present invention as shown in FIG. 5, controls the communications of centralized extension services for the subscribers accommodated by the exchange 120, and comprises the following units. An identification information requesting unit 131 receives a special number for entry and an identification number of a communications device 140 from the communications device 140 accommodated by the exchange 120, and requests the communications device 140 to provide centralized extension service identification information and identification information of a user who issued the special number for entry. At the request, a service determining unit 132 determines a service to be provided for the user depending on the centralized extension service or the user identification information received from the communications device 140. A trigger set instructing unit 133 instructs the exchange 120 to set a trigger corresponding to the service determined by the service determining unit 132. The above listed units 131 through 133 comprises, for example, a program describing the procedure of the above process, a CPU for executing the program, a memory for storing the program, etc. The service control device can be applied to the communications system in the above described first and fourth embodiments.

Figure 6:
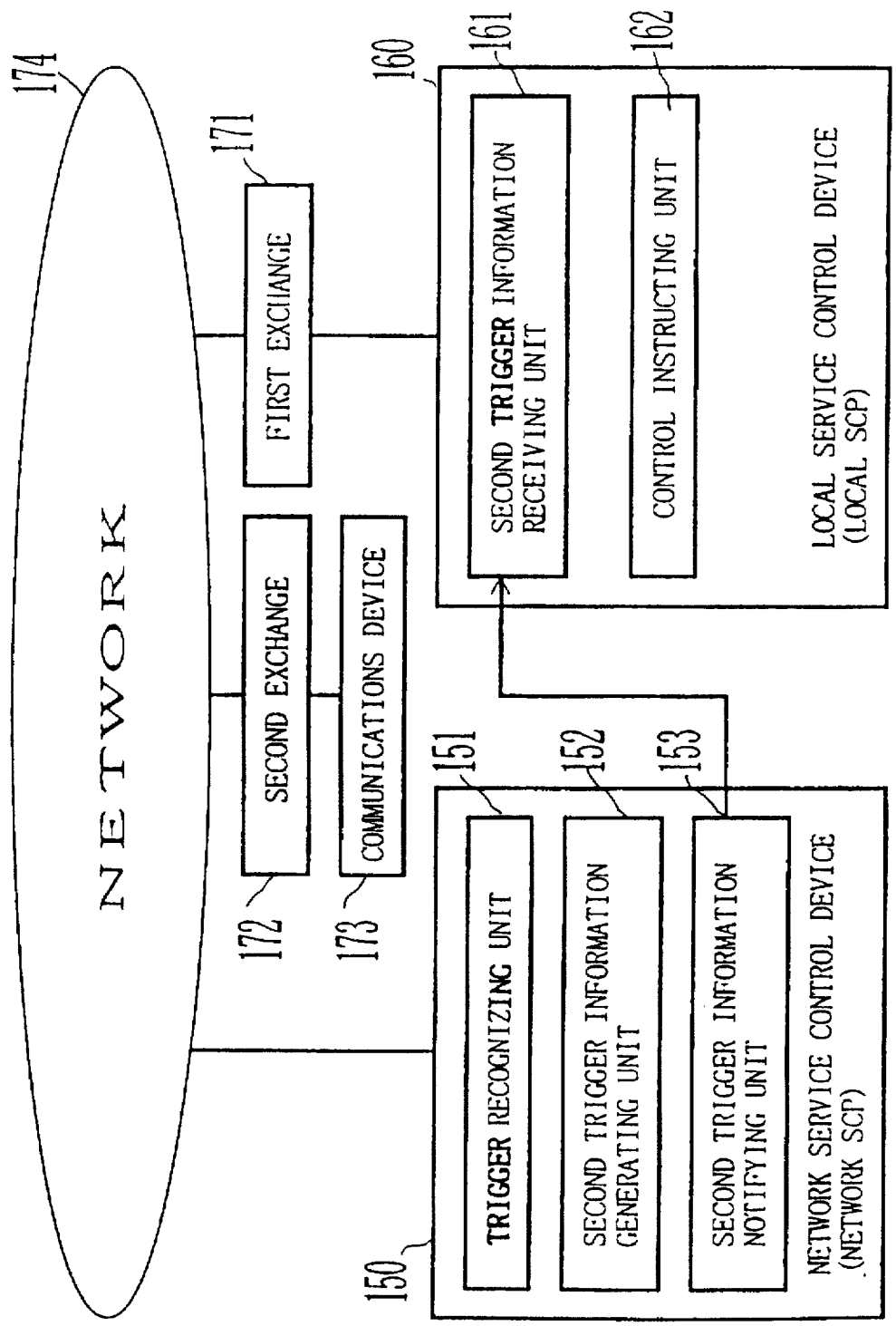
FIG. 6 is a block diagram of the service control devices of the first embodiment according to the second aspect of the present invention.

A network service control device (network SCP) 150 according to the third embodiment of the present invention as shown in FIG. 6 is provided in a communications system comprising a first exchange 171 for accommodating centralized extension service subscribers, a local service control device 160, provided corresponding to the first exchange 171, for managing centralized extension services, a fourth exchange 172, connected to the first exchange 171 through a network 174, for setting a trigger in corresponding to a predetermined service, and a communications device 173 accommodated by the fourth exchange 172 and entered for a centralized extension service in a predetermined procedure. The network service control device 150 comprises the following units.

When the trigger is detected in the fourth exchange 172 in the communications associated with a call from or to the communications device 173, a trigger recognizing unit 151 receives the trigger detection notification and the identification information of the communications device 173 and determines the type of the trigger. Based on the determination of the trigger recognizing unit 151, a fourth trigger information generating unit 152 generates fourth trigger information indicating the type of the above detected trigger. A fourth trigger information notifying unit 153 notifies the local service control device 160 of the fourth trigger information generated by the fourth trigger information generating unit 152 and the identification information of the communications device 173 and instructs it to control the first exchange 171 or the fourth exchange 172. The above listed units 151 through 153 comprises, for example, a program describing the procedure of the above process, a CPU for executing the program, a memory for storing the program, etc.

The local service control device (local SCP) 160 according to the first embodiment of the fourth aspect of the present invention as shown in FIG. 6 is provided in a communications system comprising the first exchange 171 for accommodating centralized extension service subscribers, the fourth exchange 172, connected to the first exchange 171 through a network 174, for setting a trigger in corresponding to a predetermined service, the communications device 173 accommodated by the fourth exchange 172 and entered for a centralized extension service in a predetermined procedure, and the network service control device 150 connected to the network 174. The local service control device 160 is provided corresponding to the first exchange 171, manages centralized extension services, and comprises the following units.

When the trigger is detected in the fourth exchange 172 in the communications associated with a call from or to the communications device 173, and when the trigger detection and the identification information of the communications device 173 are provided for the network service control device 150, a fourth trigger information receiving unit 161 receives the fourth trigger information indicating the type of the detected trigger transmitted from the network service control device 150 and the identification information of the communications device 173. Based on the fourth trigger information received by the fourth trigger information receiving unit 161 and the identification information of the communications device 173, a control instructing unit 162 issues an instruction to control the first exchange 171 or the fourth exchange 172. The units 161 and 162 comprises, for example, a program describing the procedure of the above process, a CPU for executing the program, a memory for storing the program, etc.

Figure 7:
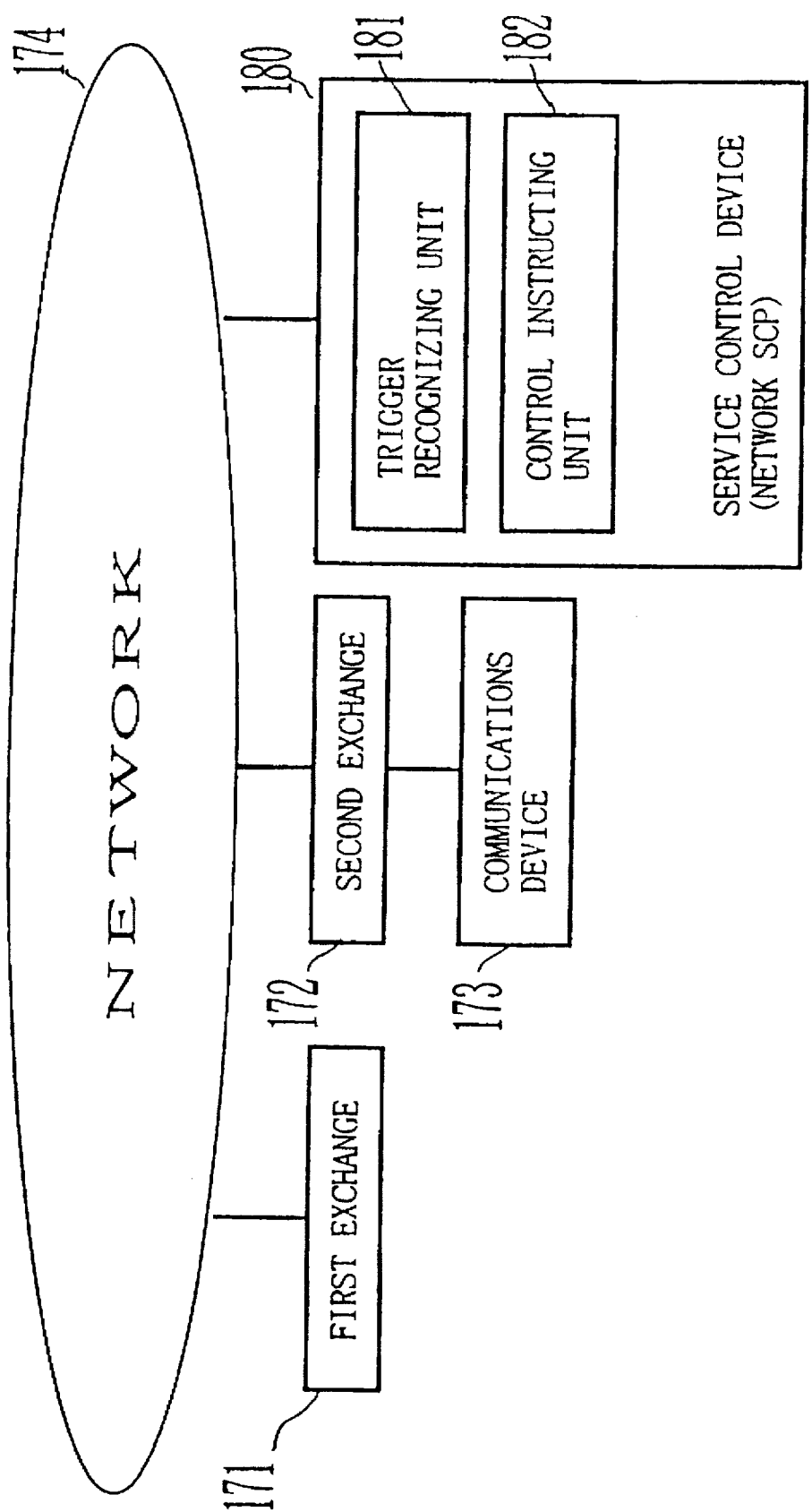
FIG. 7 is a block diagram of the service control device of the second embodiment according to the second aspect of the present invention.

The service control device 180 according to the fourth embodiment of the present invention as shown in FIG. 7 is provided in a communications system comprising the first exchange 171 for accommodating centralized extension service subscribers, the fourth exchange 172 connected to the first exchange 171 through a network 174, and the communications device 173 accommodated by the fourth exchange 172 and entered for a centralized extension service in a predetermined procedure. The service control device 180 manages centralized extension services and comprises the following units.

Upon receipt of a trigger detection notification that the trigger is detected in the fourth exchange 172 in the communications associated with a call from or to the communications device 173 and the identification information of the communications device 173, a trigger recognizing unit 181 determines the type of the trigger. Based on the type of the trigger determined by the trigger recognizing unit 181 and the identification information of the communications device 173, a control instructing unit 182 issues an instruction to control the first exchange 171 or the fourth exchange 172. The above listed units 181 and 182 comprises, for example, a program describing the procedure of the above process, a CPU for executing the program, a memory for storing the program, etc.

In the following embodiments, described is a common telephone set as a communications device. The telephone set can be used as an analog phone, an ISDN terminal unit, a mobile telephone, etc. It also can be used in a facsimile unit, an information processing device, etc., and is not limited to a telephone set.

Figure 8:
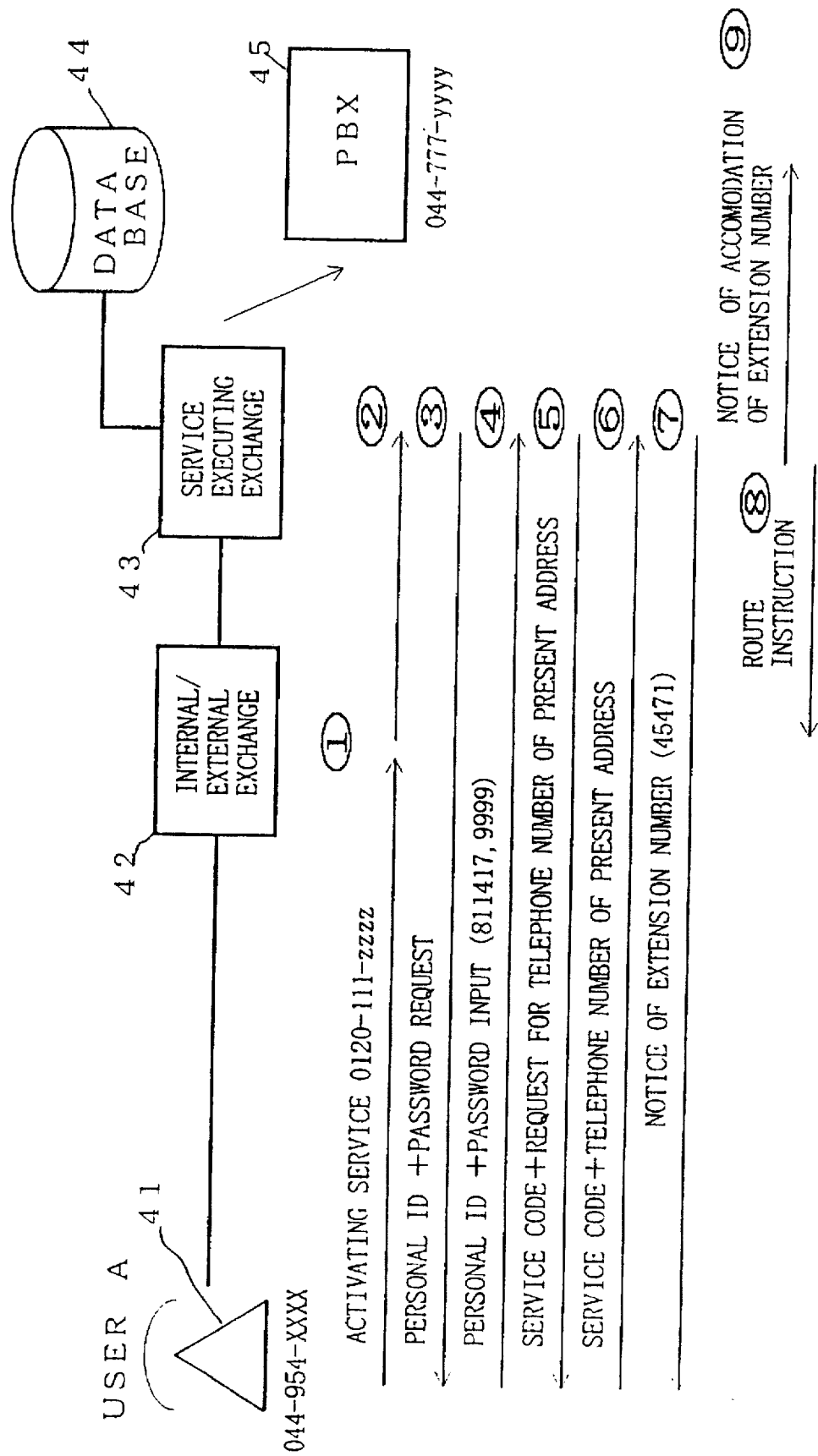
FIG. 8 shows the procedure of entering the telephone set connected to a public network as an extension of the PBX.

FIG. 8 shows the procedure of activating a service of entering a telephone set connected to a public network in the number system of the private branch exchange (PBX).

A telephone set 41 is accommodated by an internal/external exchange 42 in a public network, and the number 044-954-xxxx is assigned as a common subscriber telephone number of the public network. The internal/external exchange 42 exchanges communications in a city (local area). It connects a call between an internal exchange and a corresponding external exchange if communications are made between them.

A service executing exchange 43 is a node for executing a service in which a telephone set accommodated by the public network is entered corresponding to a number in the number system of the PBX, and corresponds to, for example, an SCP of an intelligent network. The service executing exchange 43 is connected to the public network. A data base 44 is managed by the service executing exchange 43 and stores data used in converting numbers, etc.

A PBX 45 accommodates an office line of the public network and is assigned the number 044-777-yyyy as a common subscriber number of the public network. The number system in a private network (or a local area network) is managed using 5-digit extension numbers. The PBX 45 is an exchange owned by company K and is preliminarily entered for the service provided by the service executing exchange 43.

If the telephone set 41 is entered such that it can be processed as an extension of the PBX 45 in the above described system, a user (user A) of the telephone set 41 dials the special number 0120-111-zzzz indicating a service activate request (1). The service activate request number is uniquely assigned to the PBX 45 when company K contracts with a common carrier and is stored in the data base 44 managed by the service executing exchange 43.

Upon receipt of the service activate request number, the internal/external exchange 42 transfers the number to the service executing exchange 43 (2). The transfer function is set when company K contracts with the common carrier who provides the service. If the service executing exchange 43 receives the service activate request number from the internal/external exchange 42 and recognizes that the number indicates an entry service should be activated for the PBX 45 of company K, then the service executing exchange 43 requests user A of the telephone set 41 to enter his or her personal ID and password as the personal identification information of user A (3). If the telephone set 41 is a common telephone set, the request is provided through, for example, a voice guidance system. If the telephone set 41 is an ISDN terminal unit, then the request is provided by transmitting letter information to the display of the telephone set. The personal ID is, for example, an employee number assigned to user A in company K, and the password can be a 4-digit number.

At the request, user A of the telephone set 41 enters 811417 and 9999 as his or her personal ID and password respectively. The entry is normally made by pushing buttons. The personal identification information can also be entered through a keypad or by inserting a card into a card reader if the telephone set is provided with the card reader. Otherwise, an IC card can be used to automatically pursue the necessary steps between the telephone set 41 and the service executing exchange 43. The two numbers output from the telephone set 41 are automatically transmitted to the service executing exchange 43 through the internal/external exchange 42. The personal ID and password are preliminarily stored as a set of personal identification information in the data base 44.

If the service executing exchange 43 receives the personal ID and password and the data match the numbers stored in the data base 44, then the service executing exchange 43 recognizes that user A of the telephone set 41 is an authorized user to be provided with the service and prompts user A for the service code and the telephone number of the telephone set 41 (5). The service code indicates a start or stop of the service for which the telephone set 41 is entered as an extension of the PBX 45. Examples of the service codes are shown as follows.

100: to activate service (The service is available until a service stop instruction is issued.)

110: to activate service (The service is available for 8 hours from the activation of the service.)

120: to activate service (The service is available for 4 hours from the activation of the service.)

900: to stop service

910: to stop service (connected to an announcement)

At the prompt, user A of the telephone set 41 enters, for example, 100 and 044-954-xxxx as a service code and a telephone number respectively. In the present embodiment, the telephone set 41 is a common telephone set and transmits a common subscriber telephone number as its telephone number. If a public network has a personal number system, then transmitted is an identification number assigned to a user as his or her telephone number (6).

The service executing exchange 43 associates the service code and telephone number with the personal ID and password of user A and stores them. Thus, the service executing exchange 43 recognizes that user A has activated the service for the telephone set 41. At this time, an extension number of the number system in the private network accommodated by the PBX 45 is assigned to the telephone set 41. The assigned extension number can be a fixed number uniquely assigned to user A as a personal ID. Otherwise, an unused extension number in the number system of the PBX 45 can be automatically assigned to user A when user A activates the service. In this embodiment, an extension number 45471 is uniquely assigned to user A, and the extension number 45471 is provided for the telephone set 41 (7).

The service executing exchange 43 instructs and sets (corresponding to the setting of a call issue detection trigger according to another embodiment described later) the internal/external exchange 42 accommodating the telephone set 41 to route all calls from the telephone set 41 to the service executing exchange 43 (8). The service executing exchange 43 informs the PBX 45 that the telephone set 41 which is assigned the extension number 45471 has been newly entered (9).

The telephone set 41 cannot be entered in the activation of a service according to the embodiment unless the personal ID and password of user A are entered. Accordingly, a user (common user) other than those related to company K is stopped from entering any telephone set for a service. Furthermore, since the number of the telephone set (telephone set 41 in this case) of user A is entered as being associated with the extension number of the PBX 45, user A can enter any telephone set for a service. For example, if user A enters the telephone number of his or her telephone set at home in the above described entry procedure, the telephone set can be successfully entered as an extension of the PBX 45.

Explained below are the data managed by the internal/external exchange 42, the service executing exchange 43, and the PBX 45.

FIG. 9 shows an example of a configuration of the data managed by the internal/external exchange 42, and data A1 contain subscriber data. A physical accommodation number is assigned to each physical circuit accommodated by the internal/external exchange 42. A subscriber number is a common subscriber telephone number. In this embodiment, the telephone number 044-954-xxxx of the telephone set 41 is stored as a subscriber number.

A service profile comprises a plurality of flags indicating whether or not each service, e.g. the above described entry service, provided for a subscriber is active, and is defined at an instruction from the service executing exchange 43. In the example shown in FIG. 8, user A of the telephone set 41 requests for 100 (to activate a permanent service) as a service code. Therefore, the service executing exchange 43 notifies the internal/external exchange 42 of the common subscriber telephone number (044-954-xxxx) of the telephone set 41 and that the service activation is defined. The internal/external exchange 42 sets the entry service active corresponding to the subscriber number of the telephone set 41 (044-954-xxxx). When the entry service is set active, a routing control can be exercised such that all calls from the telephone set 41 are transmitted to the service executing exchange 43.

Figure 10:
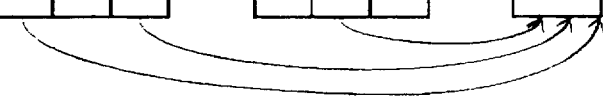
FIG. 10 shows an example of a configuration of the data managed by the service executing exchange and classified into index data, special number data, and entered user data.

FIG. 10 shows an example of a configuration of the data base 44 managed by the service executing exchange 43. Data B1 is an area for storing index data, that is, telephone numbers of common subscribers (representative numbers) of a PBX entered for the entry service, telephone numbers of common subscribers of common telephone sets entered as extensions of the PBX, etc. In the embodiment, the telephone number 044-777-yyyy of the PBX 45 is stored. The number is assigned to the PBX 45 owned by company K and stored in data B1 when company K contracts with the common carrier for the entry service. Since user A has activated the entry service through the telephone set 41, the telephone number 044-954-xxxx of the telephone set 41 is also stored.

Data B2 is an area for storing special number index data, that is, numbers dialed by users when they activate the entered services. These numbers are assigned when a company contracts with the common carrier for a specific service. A number is uniquely assigned to each PBX owned by the company. In the present example, the number 0120-111-zzzz is assigned to the PBX 45 of company K for activating the entry service, and stored in data B2.

Data B3 is an area for storing data of entered users for a service, and the contents of the data are rewritten each time the service is activated or stopped. For example, if user A pursues the entry procedure shown in FIG. 8 by dialing 0120-111-zzzz through the telephone set 41, then the data corresponding to user A are updated depending on the service code entered by the user.

In data B3, a personal ID and password are stored as being associated with the representative number of the PBX. An extension number is assigned to a telephone set newly entered by a user according to the number system of an entered extension of the PBX. The extension number can be stored as being uniquely assigned to a personal ID and password, or can be assigned for each service activation.

A present address number is the telephone number of a common subscriber of a telephone set being used by the user, and is entered by the user in the above listed entry procedure in FIG. 8. A service code indicates the type of service and is input by a user. In reference to the example shown in FIG. 8 and data B3, the present address number 044-954-xxxx and the service code 100 are set corresponding to the personal ID 811417 of user A in response to the input of user A, and the extension number 45471 is allocated to the numbers by the service executing exchange 43.

FIG. 11 shows an example of the configuration of the data managed by the PBX 45. An extension number is assigned according to the number system of an entered extension of the PBX 45. Extension numbers of telephone sets physically accommodated in the PBX 45 are stored. A new entry number is also stored as an extension of the PBX 45 at the notification from the service executing exchange 43 in step 7 in the entry procedure shown in FIG. 8. A physical accommodation number is assigned for each extension number and identifies a physical circuit to which the telephone set of the extension number is connected. Thus, retrieving the physical accommodation number indicates whether the telephone set assigned a specific extension number is a telephone set actually accommodated by the private network of the PBX 45 or a telephone set connected to a public network (external to the private network of the PBX 45).

The procedure of providing a service (procedure of sending and receiving a call) according to the present embodiment is described below by referring to FIGS. 12 through 15.

Figure 12:
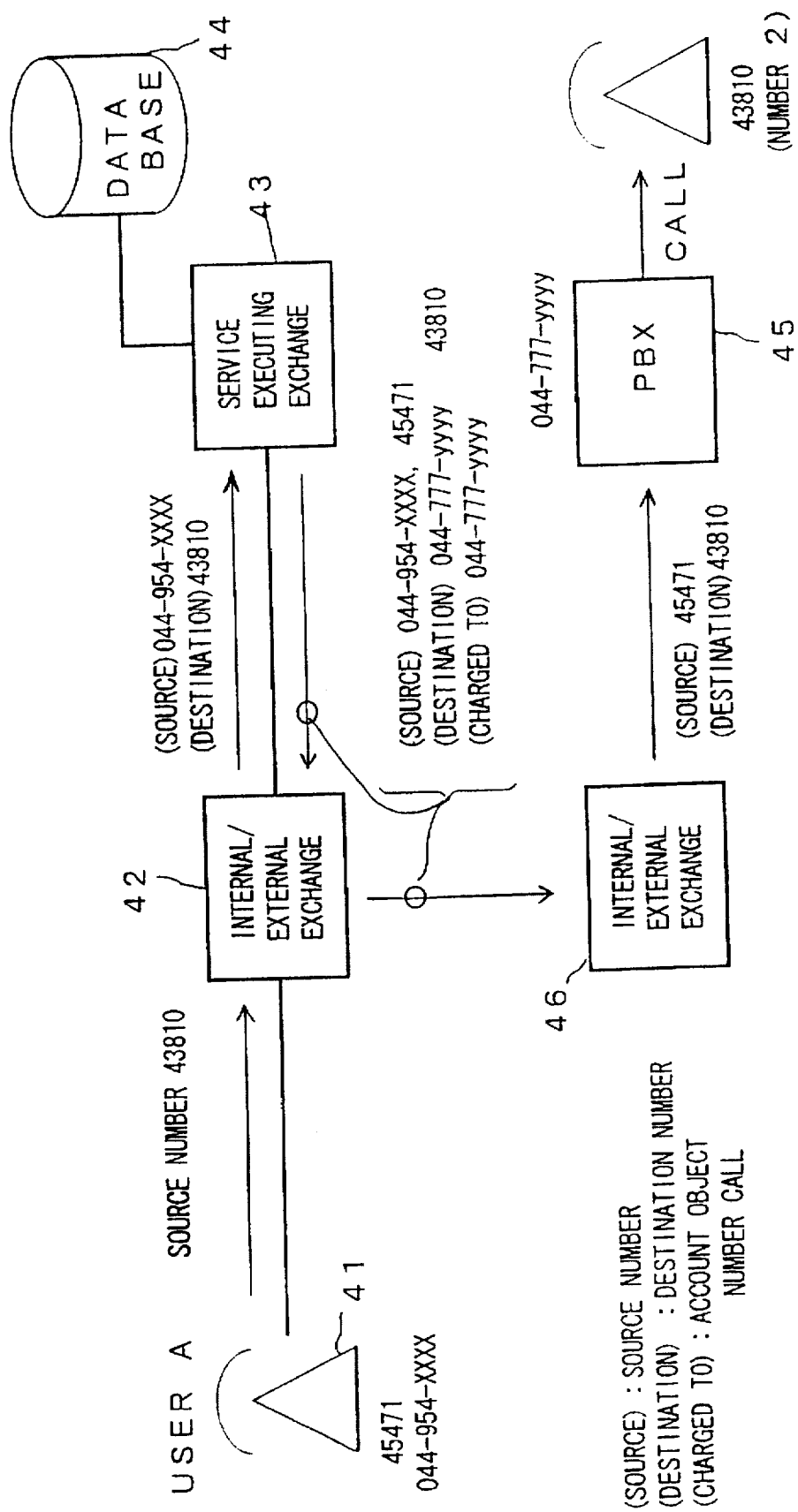
FIG. 12 shows the procedure of issuing a call from a telephone set connected to a public network and entered in the services according to the present invention to a telephone set accommodated in the PBX.

FIG. 12 shows the procedure pursued when user A of the telephone set 41 entered as an extension of the PBX 45 sends a call to a telephone set 47 accommodated by the private network of the PBX 45. In FIG. 12, if a unit is assigned the same number as the unit shown in FIG. 8, they are similar to each other.

In FIG. 12, an internal/external exchange 46 is an exchange which accommodates the PBX 45. The telephone set 47 is accommodated in the private network of the PBX 45, and is assigned 43810 as the extension number of the number system in the private network.

If user A of the telephone set 41 communicates with the telephone set 47, he or she sends 43810, that is, the extension number of the telephone set 47, as a destination number. When the internal/external exchange 42 recognizes that the flag of the entry service for the telephone set 41 is set active in the service profile of data A1 as shown in FIG. 9, the internal/external exchange 42 transmits the destination number 43810 received from the telephone set 41 directly to the service executing exchange 43. At this time, the internal/external exchange 42 also transmits to the service executing exchange 43 the common subscriber telephone number 044-954-xxxx of the telephone set 41 as a source number.

Upon receipt of the source and destination numbers, the service executing exchange 43 translates the numbers by referring to data B3 stored in the data base 44. First, the extension number 45471 is acquired from the common subscriber telephone number 044-954-xxxx of the telephone set 41. The common subscriber telephone number (representative number) 044-777-yyyy of the PBX 45 accommodating the telephone set 47 is acquired as a destination number from the extension number 43810 of the telephone set 47. Then, the representative number 044-777-yyyy of the PBX 45 is retrieved as an account object number. The source numbers 044-954-xxxx and 45471, the destination numbers 044-777-yyyy and 43810, and the account object number 044-777-yyyy are returned to the internal/external exchange 42.

If a number in the number system of the PBX 45 is received as a destination number, the account object number is the common subscriber telephone number (representative number) of the PBX 45. If a number other than the extension number of the PBX 45 is received as a destination number (including the case where a common subscriber telephone number of any telephone set is received), then the number of the sender (the source number) is the account object number. In this embodiment, the account object number as the common subscriber telephone number of the PBX 45 is used as the representative number of the PBX. It is obvious, however, that a predetermined number is set in data B3 in the data base 44 so that a cost can be charged to the number.

Upon receipt of the above described number, the internal/external exchange 42 performs a normal call setting process. That is, it recognizes the internal/external exchange 46 accommodating the PBX 45 using the destination number 044-777-yyyy received from the service executing exchange 43, and transmits to the internal/external exchange 46 the source number 044-954-xxxx and 45471, the destination number 044-777-yyyy and 43810, and the account object number 044-777-yyyy received from the service executing exchange 43.

The internal/external exchange 46 transmits to the PBX 45 the received source number and the destination extension number. On receiving the destination extension number 43810, the PBX 45 calls the telephone set 47 in the similar process of connecting between extensions. The communications fee for the connection between the telephone set 41 and the telephone set 47 is charged by the internal/external exchange 46 to the PBX 45.

Thus, if communications are set between the telephone set 41 entered as an extension of the PBX 45 and the telephone set 47 accommodated in the private network of the PBX 45, then a call is connected by sending the extension number assigned to the telephone set 47. The communications fee is charged to the representative number of the PBX 45.

Figure 13:
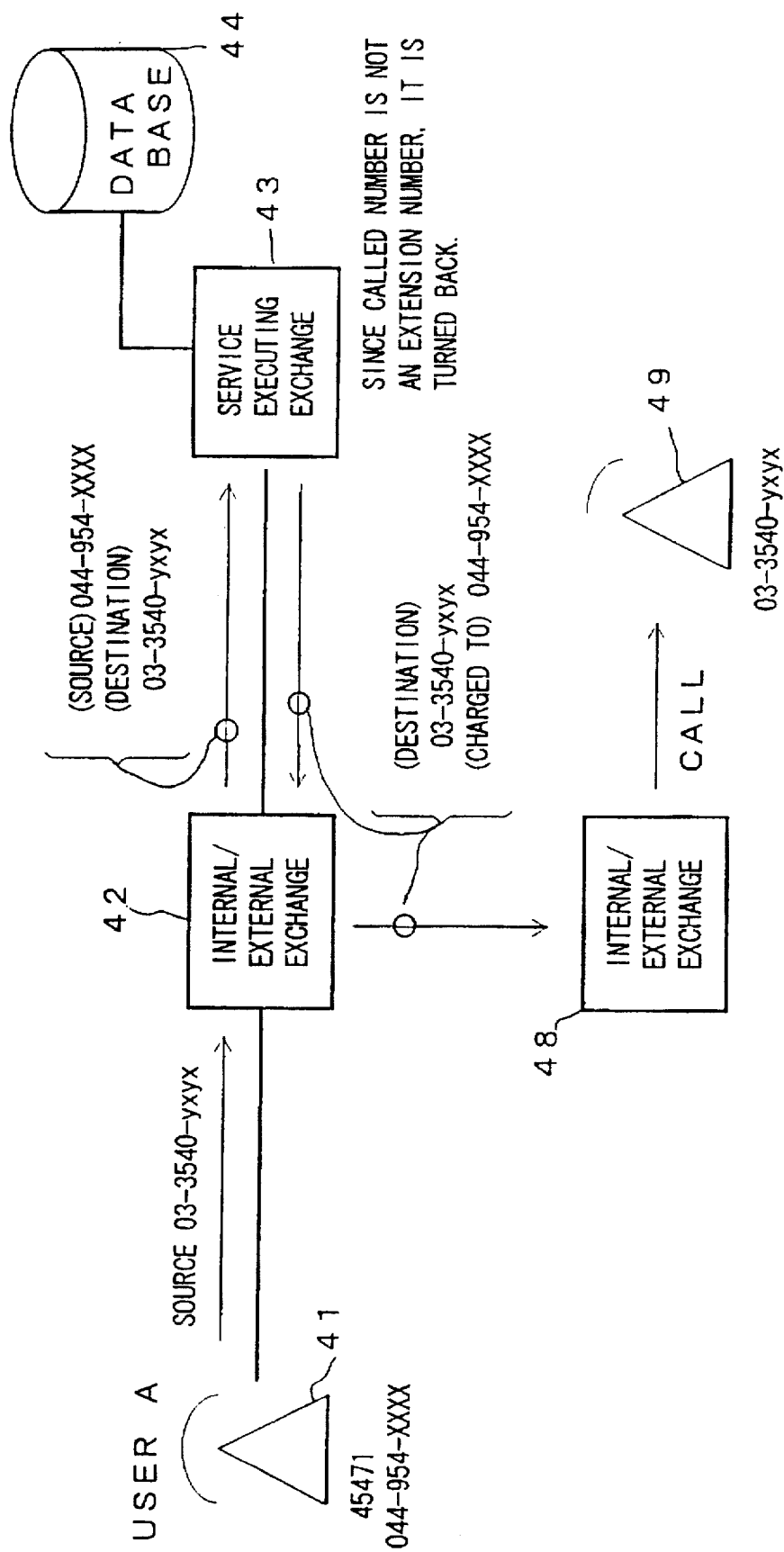
FIG. 13 shows the procedure of issuing a call from a telephone set connected to a public network and entered in the services according to the present invention to a common telephone set connected to the public network.

FIG. 13 shows the procedure pursued when user A of the telephone set 41 sends a call to a common telephone set 49 connected to a public network. In FIG. 13, if a unit is assigned the same unit number as the unit shown in FIG. 8 or 12, they are similar to each other.

In FIG. 13, an internal/external exchange 48 accommodates the telephone set 49. The telephone set 49 is connected to a public network and assigned 03-3540-yxyx as a common subscriber telephone number.

If user A of the telephone set 41 communicates with the telephone set 49, the user sends the common subscriber telephone number 03-3540-yxyx of the telephone set 49 as a destination number as in a normal operation in the public network. Since the entry service of the telephone set 41 is set active, the internal/external exchange 42 transmits the received destination number 03-3540-yxyx directly to the service executing exchange 43. At this time, the common subscriber telephone number 044-954-xxxx of the telephone set 41 is transmitted together.

On receiving the source number and destination number, the service executing exchange 43 retrieves the data base 44. However, since the destination number 03-3540-yxyx is not an extension number but a common subscriber telephone number, the numbers above are directly returned to the internal/external exchange 42. The common subscriber telephone number 044-954-xxxx of the telephone set 41 from which the call is sent is specified as a account object number. It is notified to the internal/external exchange 42. Thus, when the telephone set 41 issues a call, the account object number is the number of the telephone set 41 if the destination number does not refer to the extension number of the PBX 45.

On receiving the destination number 03-3540-yxyx and the account object number 044-954-xxxx, the internal/external exchange 42 performs a normal call setting process, recognizes the internal/external exchange 48 accommodating the telephone set 49 according to the above described destination number, and transmits to the internal/external exchange 48 the destination number and the account object number received from the service executing exchange 43.

Based on the received destination number 03-3540-yxyx, the internal/external exchange 48 calls the telephone set 49 in a normal call control sequence in a public network. The communications fee for the connection between the telephone set 41 and the telephone set 49 is charged by the internal/external exchange 42 or the internal/external exchange 48 to the telephone set 41.

If communications are set between the telephone set 41 entered as an extension of the PBX 45 and the telephone set 49 connected to a public network (not accommodate by the PBX 45), then a call is connected by sending the common subscriber telephone number assigned to the telephone set 49, not requiring an entering of, for example, zero as in a telephone set accommodated by a conventional PBX.

Figure 14:
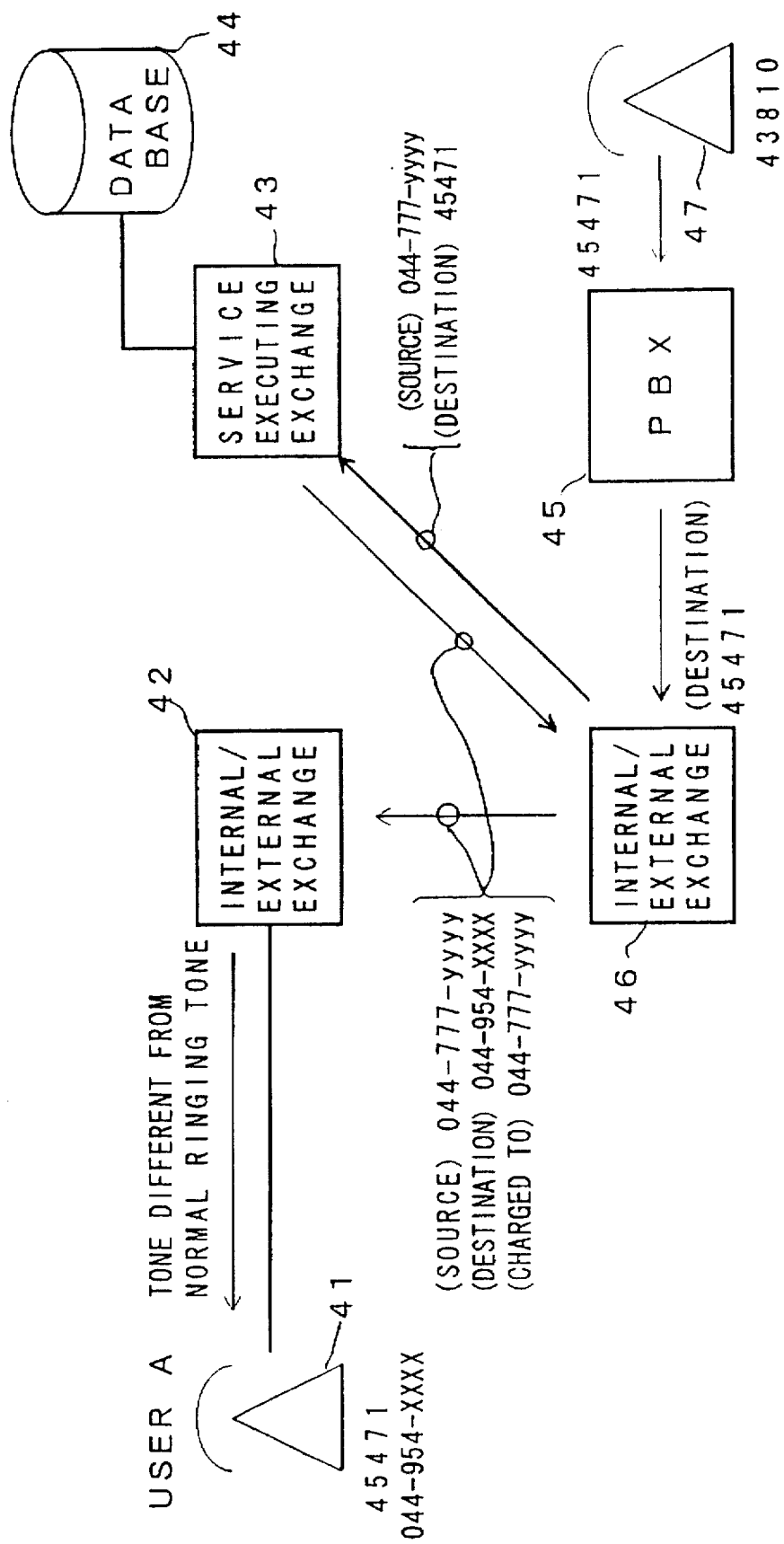
FIG. 14 shows the procedure of issuing a call from a telephone set accommodated in the PBX telephone set to a telephone set connected to the public network and entered in the services according to the present invention.

FIG. 14 shows the procedure of sending a call from the telephone set 47 accommodated by the PBX 45 to the telephone set 41 entered as an extension of the PBX 45 in the entry procedure shown in FIG. 8. In FIG. 14, if a unit is assigned the same unit number as the unit shown in FIG. 8 or 12, they are similar to each other.

If a call is issued from the telephone set 47 to the telephone set 41, then the telephone set 47 sends as a destination number the extension number 45471 assigned to the telephone set 41 in the entry procedure. The PBX 45 refers to the data PBX 1 shown in FIG. 11, retrieves the physical accommodation number of the received destination number (extension number) 47471, and determines whether the telephone set of the destination number is accommodated in the private network of the PBX 45 or connected externally to the private network. In this embodiment, since the telephone set 41 referred to by the destination number 45471 is connected externally to the private network of the PBX 45, the PBX 45 transmits the destination number 45471 to the internal/external exchange 46.

The internal/external exchange 46 manages and maintains data similar to data A1 stored in the internal/external exchange 42 shown in FIG. 9. That is, if the PBX 45 is entered for the present service (entry service) through a contract with a common carrier, then the common subscriber telephone number (representative number) of the PBX 45 is entered in the internal/external exchange 46 as subscriber data, and sets the flag active for the entry service in the service profile of data A1 corresponding to the number of the PBX 45. If the flag is successfully set, all calls issued by the PBX 45 are transmitted to the service executing exchange 43. As a result, the internal/external exchange 46 transmits the destination number to the service executing exchange 43 to have the received destination number 45471 converted to a common subscriber telephone number. The internal/external exchange 46 also transmits to the service executing exchange 43 the common subscriber telephone number 044-777-yyyy of the PBX 45 as a source number to which the communications fee is charged in an accounting process.

The above described call transfer function can be performed by instructing the internal/external exchange 46 to route the destination number to the service executing exchange 43 when the destination number is transferred to the internal/external exchange 46.

Upon receipt of the source number 044-777-yyyy and the destination number 45471, the service executing exchange 43 refers to data B3 stored in the data base 44 to convert the numbers. That is, the common subscriber telephone number 044-954-xxxx of the telephone set 41 is acquired as the destination number from the extension number 45471 of the telephone set 41. Since the extension number of the PBX 45 has been received as the destination number, the account object number should be the representative number 044-777-yyyy of the PBX 45. These numbers are returned to the internal/external exchange 46.

The internal/external exchange 46 performs a common subscriber telephone number exchanging process on the received destination number 044-954-xxxx, and transmits the received source number, destination number, and account object number to the internal/external exchange 42.

The internal/external exchange 42 calls the telephone set 41 in the procedure pursued for normal telephone communications over a public network according to the destination number 044-954-xxxx. However, the ringing tone for the telephone set 41 is not a normal ringing tone, but a ringing tone (ringing for an extension number) indicating that the sender is a telephone set accommodated by the PBX 45. In the calling process, the internal/external exchange 42 issues an instruction to have a ringing tone call up the telephone set 41 if a flag of the entry service for the telephone set 41 is set active in the service profile of data A1 and the source number refers to the PBX 45. The communications fee for the connection between the telephone set 41 and the telephone set 47 is charged by the internal/external exchange 46 or the internal/external exchange 42 to the PBX 45 according to the account object number notified by the service executing exchange 43.

As described above, if the telephone set 47 accommodated by the PBX 45 issues a call to the telephone set 41 entered as an extension of the PBX 45, then the call is connected by sending from a user of the telephone set 47 the extension number assigned to the telephone set 41. The communications fee is charged to the representative number of the PBX 45.

In the procedure of the communications from a normal telephone set connected to a public network (not accommodated by the PBX 45 or entered for the entry service) to the telephone set 41, the operation of each internal/external exchange is similar to the normal call connecting process in a public network. That is, if a user of the above described common telephone set dials the common subscriber telephone number of the telephone set 41, then the internal/external exchange accommodating the common telephone set transfers the number to the internal/external exchange 42. The internal/external exchange 42 can call the telephone set 41 without transferring the number to the service executing exchange 43. The procedure can be pursued regardless of the setting of the telephone set 41 for the entry service.

Figure 15:
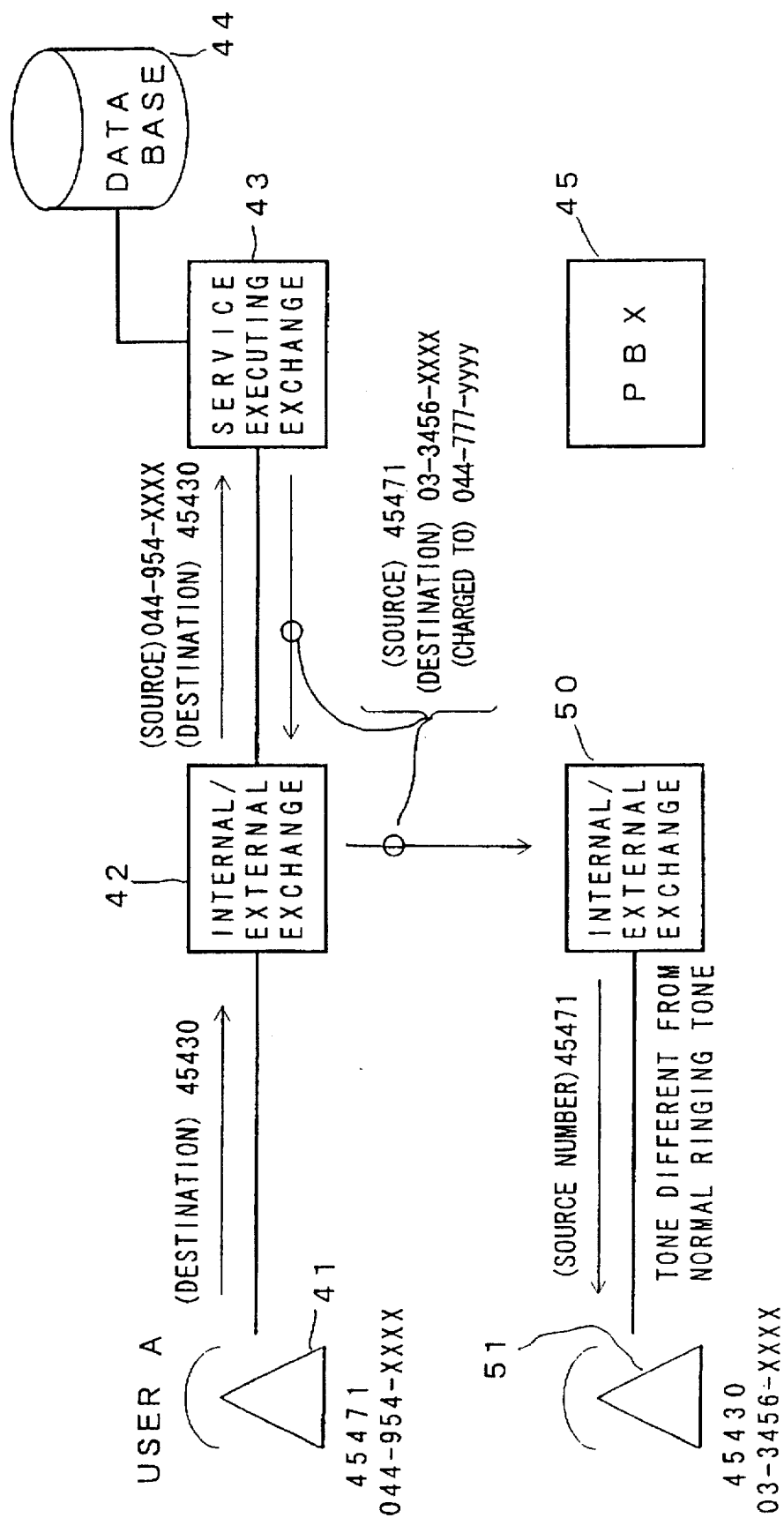
FIG. 15 shows the procedure for the case in which a call is issued between two telephone sets connected to a public network and entered in the services according to the present invention.

FIG. 15 shows the state in which the telephone set 41 and a telephone set 51 are entered as extensions of the PBX 45 in the above described procedure so that they can be provided with necessary services. The procedure of sending a call from the telephone set 41 to the telephone set 51 is explained lin FIG. 15. In FIG. 15, if a unit is assigned the same number as the unit shown in FIG. 8 or 12, then they are similar to each other.

In FIG. 15, an internal/external exchange 50 accommodates the telephone set 51. The telephone set 51 is assigned the common subscriber telephone number 03-3456-xxxx. The extension number 45430 of the PBX 45 corresponds to the common subscriber telephone number and is entered in the data base 44 of the service executing exchange 43.

When user A of the telephone set 41 communicates with the telephone set 51, the user sends the extension number 45430 of the telephone set 51 as the destination number. Since the entry service flag is set active for the telephone set 41 in the service profile of data A1 managed by the internal/external exchange 42 as shown in FIG. 9, the internal/external exchange 42 transfers the destination number to the service executing exchange 43. At this time, the common subscriber telephone number 044-954-xxxx of the telephone set 41 is transferred together as the source number.

On receiving the source number 044-954-xxxx and the destination number 45430, the service executing exchange 43 refers to data B3 to convert the numbers. That is, the service executing exchange 43 obtains the extension number of the telephone set 41 as the source number from the common subscriber telephone number 044-954-xxxx of the telephone set 41. It also obtains the common subscriber telephone number 03-3456-xxxx of the telephone set 51 as the destination number from the extension number 45430 of the telephone set 51. Since the received destination number 45430 is a number in the number system of the extension number of the PBX 45, the account object number is the common subscriber telephone number (representative number) of the PBX 45. These numbers are returned to the internal/external exchange 42.

On receiving the above listed three numbers, the internal/external exchange 42 performs the normal call setting process. That is, according to the destination number 03-3456-xxxx retrieved from data B3, the internal/external exchange 42 transfers to the internal/external exchange 50 the source number, destination number, and account object number received from the service executing exchange 43.

According to the destination number 03-3456-xxxx, the internal/external exchange 50 calls the telephone set 51 in the same procedure as the call connection in a normal public network. At this time, the ringing tone is that for an extension number. That is, if the entry service flag is set active for the telephone set 51 in the service profile of data A1 managed by the internal/external exchange 50 and if the source number received by the internal/external exchange 42 is entered as an extension of the PBX 45, then the telephone set 51 is called through the ringing tone for an extension number. The communications fee between the telephone set 41 and the telephone set 51 is charged by the internal/external exchange 50 or the internal/external exchange 42 to the PBX 45.

Thus, if a call is set between the telephone set 41 and the telephone set 51 in a state in which they are entered as extensions of the PBX 45 in the above described entry procedure, then the call is connected when the extension number assigned to the telephone set 51 is input. The communications fee is charged to the representative number of the PBX 45.

In the embodiment described above by referring to FIGS. 8 through 15, a service is provided by entering a telephone set connected to a public network as an extension of a predetermined PBX. However, the present invention can be applied to a centralized extension service system. The entry procedure of enabling a telephone set to be used for a centralized extension service is explained in another embodiment described later.

The procedure of entering and providing a service according to the present embodiment is explained in detail by referring to FIGS. 16 through 19.

Figure 16:
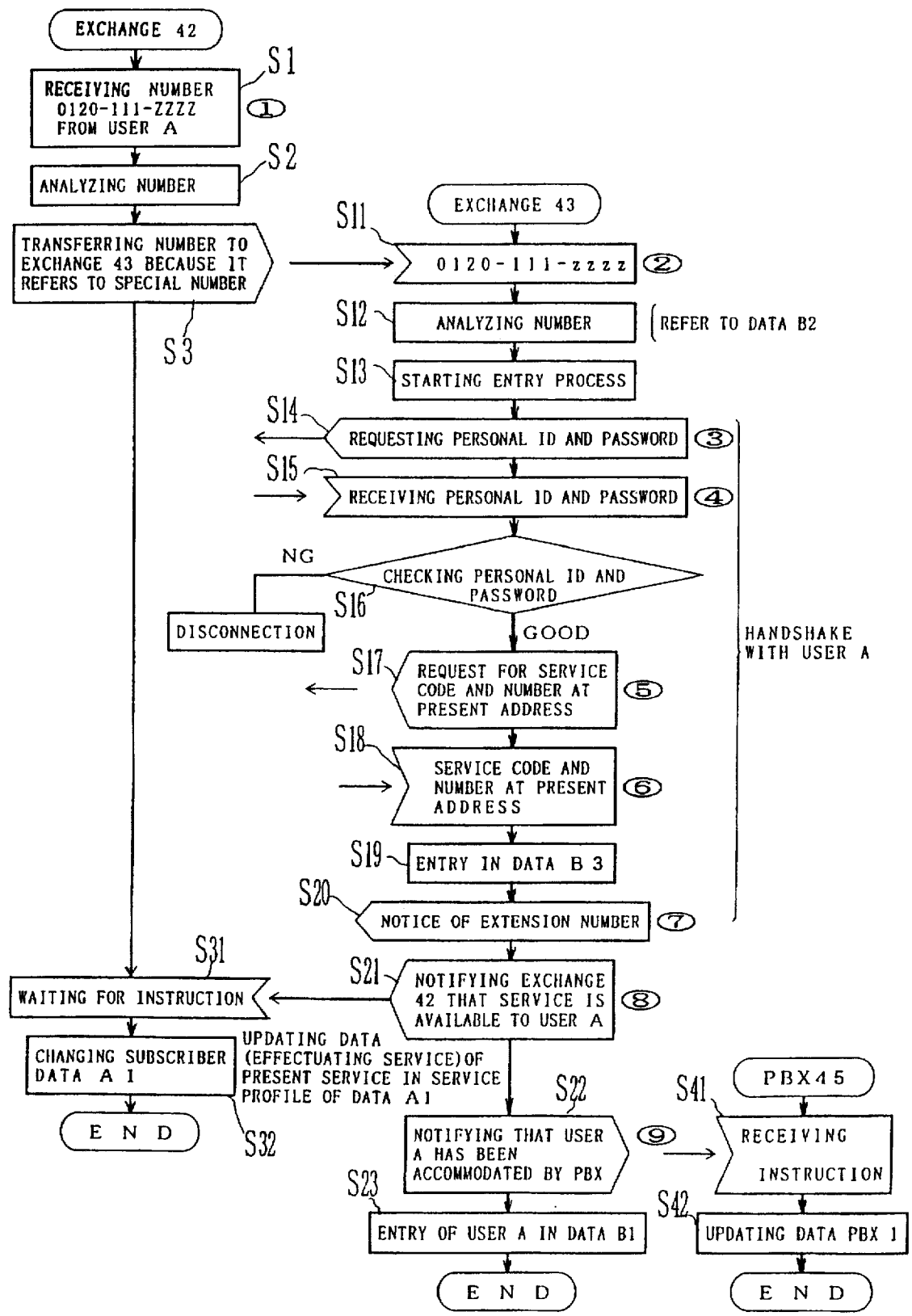
FIG. 16 is a flowchart showing the detailed entry steps shown in FIG. 8.

FIG. 16 is a flowchart showing in detail the process of entering a service according to the present embodiment and the flowchart corresponds to the procedure shown in FIG. 8. The numbers 1 through 9 shown in FIG. 16 respectively correspond to 1 through 9 shown in FIG. 8. The following procedure is pursued for the operations of the internal/external exchange 42, service executing exchange 43, and the PBX 45 performed after the special number 0120-111-zzzz is dialed to enter the telephone set 41 as an extension of the PBX 45.

On receiving the telephone number 0120-111-zzzz from user A in step S1, the internal/external exchange 42 analyzes whether the received number is a call number to be normally exchanged or a predetermined special number in step S2. Since the received number is a predetermined special number in this case, the number is transferred to the service executing exchange 43 and an instruction from the service executing exchange 43 is waited for in step S3.

The operation of the service executing exchange 43 which receives the above mentioned special number is described below.

On receiving the number 0120-111-zzzz in step S11, it is checked whether or not the number is a predetermined number by referring to data B2 in the data base 44 in step S12. In this case, it is recognized that the received number is used in entering as an extension of the PBX 45 the telephone set which sent the number. In step S13, the entry procedure is started.

The steps S14 through S20 to be pursued after step S13 are the processes performed by the handshake between the service executing exchange 43 and user A.

In step S14, the service executing exchange 43 prompts user A for his or her personal ID and password. In step S15, the service executing exchange 43 receives the personal ID and password entered by user A (or automatically issued by the telephone set 41 using, for example, the IC card of user A). In step S16, the service executing exchange 43 retrieves data B3 in the data base 44 and checks whether or not the personal ID and password receive in step S15 are preliminarily entered. If they are preliminarily entered numbers (GOOD in step S16), control is passed to step S17. If not (NG in step S16), the call is disconnected without accepting an activation request from user A and the process terminates.

In step S17, the service executing exchange 43 requests user A to enter the service code and the present address of the telephone set being used by user A. In step S18, the service executing exchange 43 receives the number entered by user A at the above mentioned request. In this case, it is assumed that user A enters the service code 100 (to activate a service). In step S19, the service executing exchange 43 associates the service code and the present address with the personal ID and password received in step S15, and enters them in data B3 in the data base 44. At this time, the extension number to be assigned to the telephone set 41 is determined (it can be preliminarily assigned as being associated with the personal ID), and the extension number is notified to user A in step S20.

In step S21, the service executing exchange 43 notifies the internal/external exchange 42 that the telephone set 41 used by user A has been entered as an extension of the PBX 45 and the entry service is available to the telephone set 41. In step S22, it notifies the PBX 45 that the telephone set 41 used by user A has been entered as an extension of the PBX 45. Then, in step S23, it enters user A for the entry service by storing the present address of user A received in step S18 in data B1 in the data base 44.

On receiving an activated service information sent in step S21 from the service executing exchange 43 in step S31, the internal/external exchange 42 rewrites the data of user A in subscriber data A1 in step S32. That is, the flag of the entry service of the service profile of the telephone set 41 used by user A is set active.

On receiving the accommodation notification transmitted in step S22 by the service executing exchange 43 about user A in step S41, the PBX 45 rewrites data PBX1 in step S42. That is, after the telephone set 41 has been entered as an extension managed by the PBX 45 in data B3 in the data base 44, the writes in data PBX1 the extension number notified to user A in step S20. Then, the PBX 45 enters a physical accommodation number after associating it with the extension number.

In the above described flowchart, the service code received in step S18 is 100. However, if the service code 110 (or 120) has been received, a data rewrite instruction is issued after 8 hours (or 4 hours) from the completion of the entry procedure. That is, the service executing exchange 43 keeps time using its built-in timer. If 8 hours (4 hours) have passed since the entry, it deletes the data of user A from data B1. It also deletes from data B3 the present address and service code (plus the extension number if necessary) entered as being associated with the personal ID and password of user A. Then, the service executing exchange 43 instructs the internal/external exchange 42 to set the entry service inactive. Then, it also instructs the PBX 45 to delete data of user A from data PBX1. Thus, the service executing exchange 43 stops the entry service from being provided for the telephone set 41 used by user A and releases the setting of the telephone set 41 entered as an extension of the PBX 45.

On the other hand, if the service code 900 (or 910) has been received in step S18, then the entry service is stopped immediately in the above described procedure (same as the operation activated after 8 hours from the receipt of the service code 110) in response to the receipt of the service code.

Figure 17:
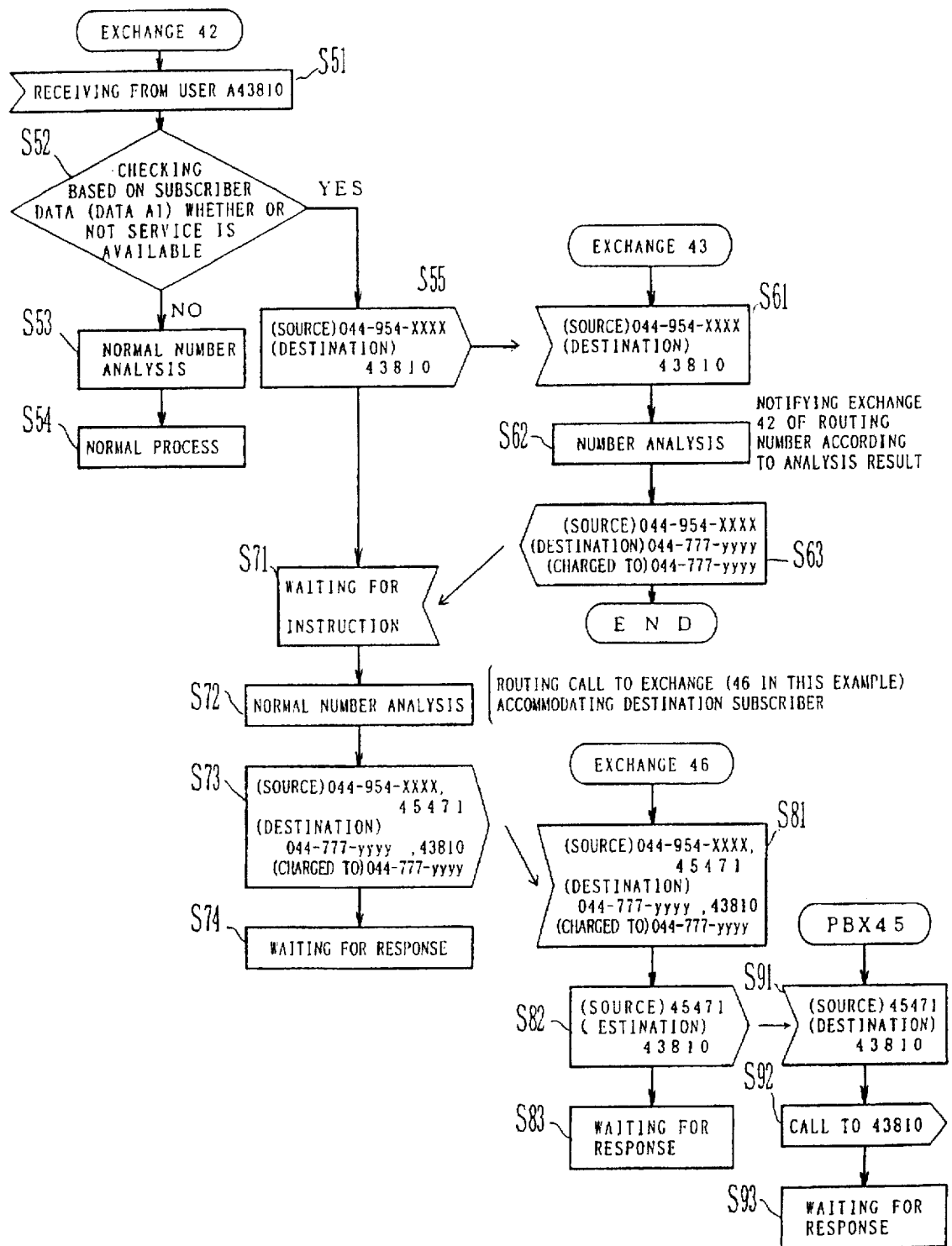
FIG. 17 is a flowchart showing the detailed service executing steps shown in FIG. 12.

FIG. 17 is a flowchart showing the process of providing a service according to the embodiment shown in FIG. 12. It corresponds to the procedure in which user A sends a call from the telephone set 41 entered for the entry service to the telephone set 47 accommodated as an extension of the PBX 45. The following procedure is pursued for the operations of the internal/external exchange 42, service executing exchange 43, internal/external exchange 46, and the PBX 45 after user A has dialed the extension number 43810 of the telephone set 47.

On receiving the destination number 43810 from user A in step S51, the internal/external exchange 42 refers to data A1 (subscriber data) in step S52 to check the service profile about the telephone set from which the above mentioned number has been sent (the telephone set 41 used by user A) and determine whether or not the entry service flag of the telephone set 41 is set active. If the service is inactive to the telephone set 41 (inactive in step S52), then a normal number analysis is made in step S53, and a normal exchange is performed in step S54. In this embodiment, the received number is not a common subscriber telephone number of a public network but the extension number of the PBX 45. Therefore, if the service is inactive, the exchange process is not permitted and the call is disconnected, thereby terminating the process.

If the entry service flag of the telephone set 41 is set active (active in step S52), then the internal/external exchange 42 refers to data A1 and transmits to the service executing exchange 43 in step S55 the common subscriber telephone number 044-954-xxxx of the telephone set 41 as a source number and the extension number 43810 of the telephone set 47 as a destination number.

On receiving the above listed source number and destination number in step S61, the service executing exchange 43 analyzes the numbers in step S62 based on the data base 44. The process in step S62 is described later in detail. In step S63, the numbers obtained as the analysis result obtained in step S62 are returned to the internal/external exchange 42. In this case, the source numbers 044-954-xxxx and 45471 (the extension number of the telephone set 41), the destination numbers 044-777-yyyy (the common subscriber telephone number of the PBX 45) and 43810, and the account object number 044-777-yyyy are transferred.

Upon receipt of the above listed numbers in step S71, the internal/external exchange 42 performs a normal analysis on the numbers. That is, using the received destination number 044-777-yyyy, the internal/external exchange 42 performs a call routing process to transfer the above listed destination number, common subscriber telephone number, and account object number to the exchange (internal/external exchange 46) accommodating the PBX 45. Then, in step S73, the internal/external exchange 42 transfers the numbers to the internal/external exchange 46. In step S74, it waits for a response from the internal/external exchange 46.

On receiving the above listed numbers from the internal/external exchange 42 in step S81, the internal/external exchange 46 transfers the source number 45471 and the destination number 43810 to the PBX 45 in step S82. That is, it transfers the numbers in the number system of the extensions of the PBX 45. Then, in step S83, it waits for a response from the PBX 45.

When receiving the above mentioned two numbers in step S91, the PBX 45 calls the telephone set assigned the destination number 43810 (telephone set 47) in step S92, and waits for a response from the telephone set 47 in step S93.

Figure 18:
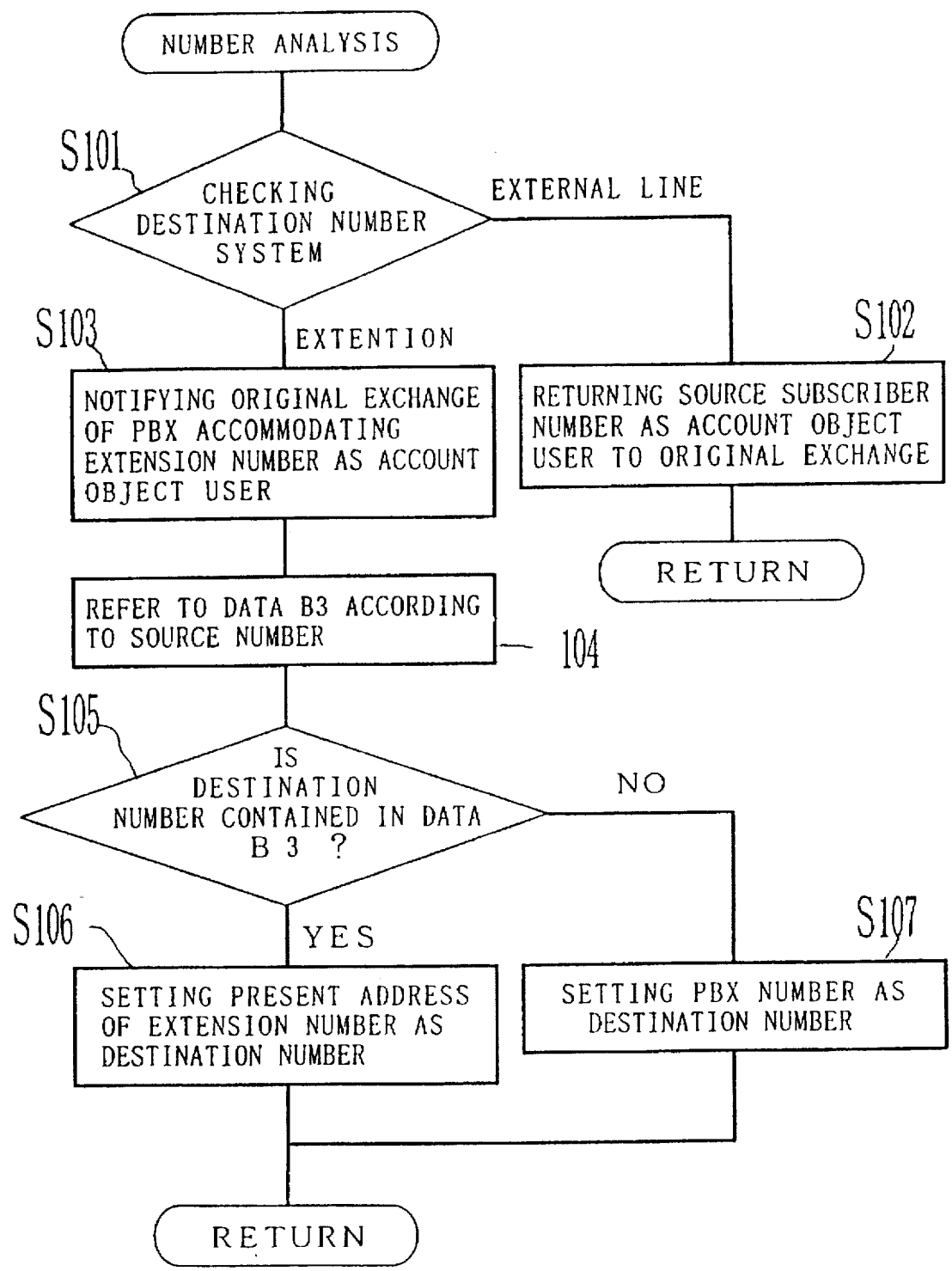
FIG. 18 is a flowchart showing the detailed number analysis process shown in FIG. 17.

FIG. 18 is a flowchart showing in detail the number analysis procedure in step S62 of the flowchart shown in FIG. 17. The service executing exchange 43 executes the processes in the flowchart by referring to the data base 44.

In step S101, the number system of the destination number received from the internal/external exchange 42 is checked. That is, it is determined whether the number belongs to the number system of common subscriber telephone numbers or it belongs to a predetermined number system (extension number of the PBX 45 in this case). If the above described destination number belongs to the number system of common subscriber telephone numbers (external number in step S101), then control is passed to step S102. If it belongs to another number system (extension number in step S101), then control is passed to step S103.

In step S102, the communications fee is charged to the user who made the call. That is, the common subscriber telephone number of the telephone set from which the call is made is defined as the account object number. Since user A issues a common subscriber telephone number (extension number) in the example shown in FIG. 13, the common subscriber telephone number 044-954-xxxx of the telephone set 41 is set as the account object number. The account object number is sent to the internal/external exchange 42.

In step S103, the PBX accommodating the above mentioned destination number (extension number) is charged with the communications fee. Since user A calls the extension number 43810 in the example shown in FIG. 12, the common subscriber telephone number 044-777-yyyy of the PBX 45 is set as the account object number, and the account object number is notified to the internal/external exchange 42.

After the notification, the service executing exchange 43 refers to data B3 of the data base 44 with the destination number (extension number of the PBX 45) received in step S104 defined as a key. In step S105, it is checked whether or not the above mentioned destination number has been entered as an extension number in data B3. If yes (Yes in step S105, indicating an event corresponding to FIG. 15), control is passed to step S106. If not (No in step S105), control is passed to step S107.

In step S106, the common subscriber telephone number of a telephone set assigned the above described destination number (extension number) is obtained. In the example shown in FIG. 15, acquired is the common subscriber telephone number 03-3456-xxxx of the telephone set 51 from the extension number 45430 assigned to the telephone set 51.

In step S107, the common subscriber telephone number of a PBX accommodating the telephone set assigned the above described destination number (extension number) is obtained. In the example shown in FIG. 12, acquired is the common subscriber telephone number 044-777-yyyy of the PBX 45 from the extension number 43810 assigned to the telephone set 47.

Figure 19:
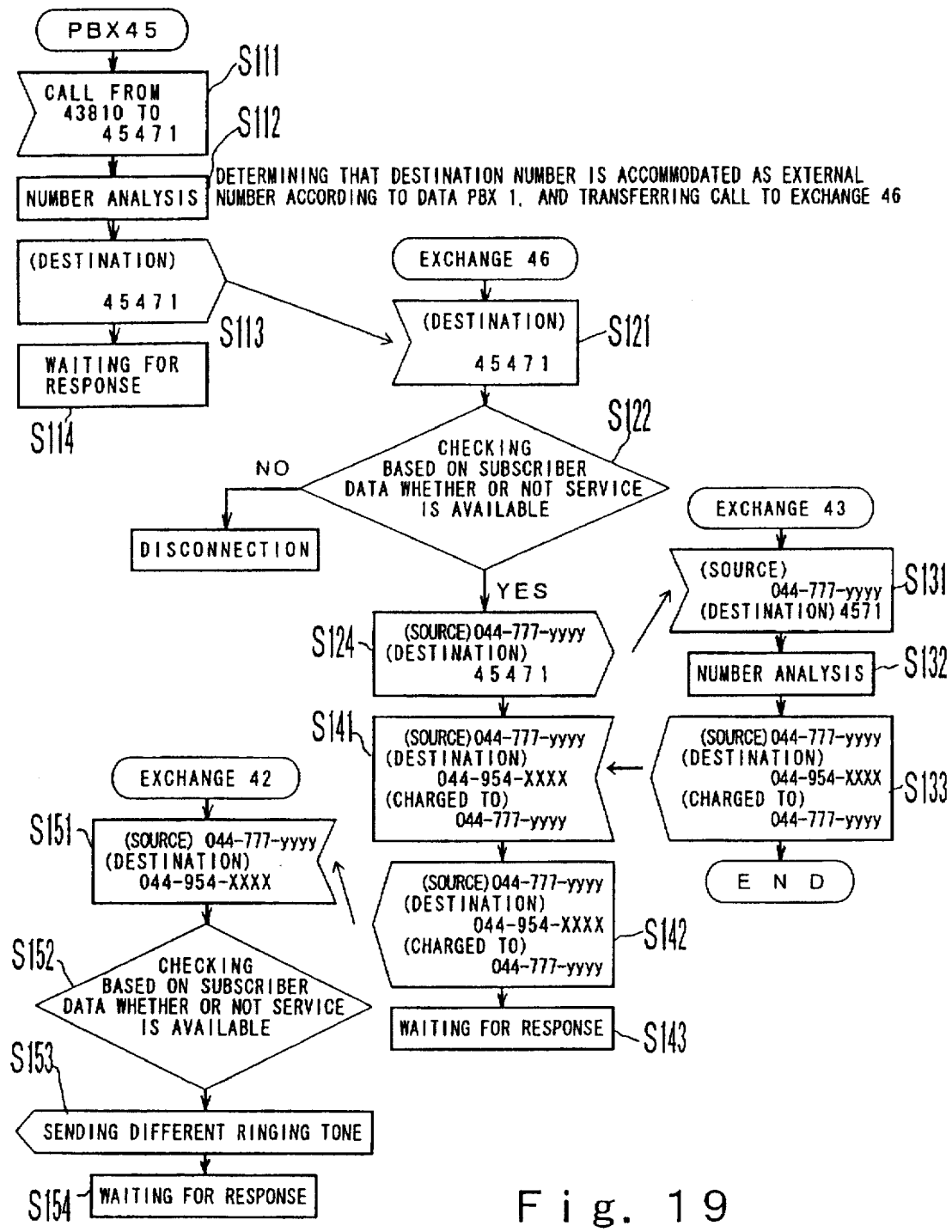
FIG. 19 is a flowchart showing the detailed service executing steps shown in FIG. 14.

FIG. 19 is a flowchart showing the process of actually providing a service according to the present embodiment. FIG. 19 shows the procedure of receiving a call at the telephone set 41 when communications are set from the telephone set 47 accommodated by the PBX 45 to the telephone set 41 entered for the entry service. The flowchart corresponds to FIG. 14. That is, the process shown in FIG. 19 corresponds to the operations of the internal/external exchange 42, the service executing exchange 43, the internal/external exchange 46, and the PBX 45 performed after the telephone set 47 has dialed the extension number 45471 of the telephone set 41.

If the PBX 45 has received the destination number 45471 from the telephone set 47 in step S111, then the PBX 45 refers to the a data PBX1 to analyze the received number in step S112. That is, the PBX 45 checks if the received number is the number physically accommodated by the PBX 45 or the number connected externally to the PBX 45 over a public network. Since the received number is externally connected to the PBX 45 in this example, the PBX 45 transmits the destination number to the internal/external exchange 46 in step S113, and waits for the response from the internal/external exchange 46 in step S114.

If the internal/external exchange 46 has received the destination number 45471 in step S121, then it refers to the service profile of data A1 internally managed by the internal/external exchange 46 in step S122 and determines whether or not the entry service of the PBX 45 is set active for the telephone set 41 having the destination number 45471. If the service is inactive to the telephone set 41 (inactive in step S122), then the internal/external exchange 46 determines that an exchange process cannot be performed on the received number because the received number is not a common subscriber telephone number of a public network but an extension number of the PBX 45 in step S123. Then, the internal/external exchange 46 disconnects the call and terminates the process. However, if the destination number received from the PBX 45 belongs to the number system of common subscriber telephone numbers, then a normal exchange process is performed at the internal/external exchange 46 even if the entry service is inactive to the telephone set 41

On the other hand, if the entry service of the PBX 45 is active (active in step S122), then the internal/external exchange 46 transmits to the service executing exchange 43 the common subscriber telephone number 044-777-yyyy of the PBX 45 as a source number and the extension number 45471 of the telephone set 41 as a destination number in step S124.

Upon receipt of the source number and the destination number in step S131, the service executing exchange 43 analyzes the numbers in step S132. The process in step S132 is the same as that shown by the flowchart in FIG. 18. However, the analysis numbers are different between them as explained below.

The number system of the destination number is checked in step S101. If the number belongs to the number system of common subscriber telephone numbers, then the calling user is set as an account object in step S102. Then, the common subscriber telephone number 044-777-yyyy of the PBX 45 is set as an account object number. On the other hand, if the received destination number belongs to the number system of extension numbers, then the PBX 45 is set as an account object number in step S103, and the common subscriber telephone number 044-777-yyyy of the PBX 45 is set as an account object number. Thus, the PBX 45 is an account object when a call is made by the telephone set accommodated by the PBX 45.

In step S106, retrieved is the common subscriber telephone number 044-954-xxxx of the telephone set 41 assigned the above mentioned destination number 45471.

In the branch process in step S105 in the embodiment FIG. 14, the destination number transmitted from the PBX 45 is recognized as the extension number of the PBX 45 based on the result obtained in step S101. It is also recognized that the extension number is assigned to a telephone set external to the PBX 45 because the extension number has been transmitted from the PBX 45 to the service executing exchange 43. Therefore, the service executing exchange 43 determines that the destination number is the number of the telephone set entered in the above described entry process. That is, since the number of the telephone set entered in the above described entry process is entered in data B3, the branch process in step S105 always results in "Yes" and the process in step S107 is not processed.

Control is returned to the process shown in FIG. 19. The service executing exchange 43 returns the source number 044-777-yyyy, the destination number 044-954-xxxx, and the account object number 044-777-yyyy obtained in step S132 to the internal/external exchange 46 in step S133, and terminates the process.

Upon receipt of the above listed three numbers in step S141, the internal/external exchange 46 sends the numbers directly to the internal/external exchange 42 in step S142, and waits for the response from the internal/external exchange 42 in step S143.

On receiving the three numbers transmitted from the internal/external exchange 46 in step S151, the internal/external exchange 42 refers to the subscriber data stored in data A1, and checks whether or not the entry service is set active for the telephone set 41 in step S152. If yes, called is the telephone set assigned the destination number 044-954-xxxx, that is, the telephone set 41 in step S153. At this time, if the internal/external exchange 42 has recognized that the source number 044-777-yyyy is a common subscriber telephone number of the PBX 45, then it sets the calling tone for the telephone set 41 as an extension number calling tone, and waits for a response from the telephone set 41 in step S154.

Explained below is an embodiment of the system in which an optional telephone set is externally entered for a centralized extension service so that the entered telephone set may utilize the centralized extension service.

Figure 20:
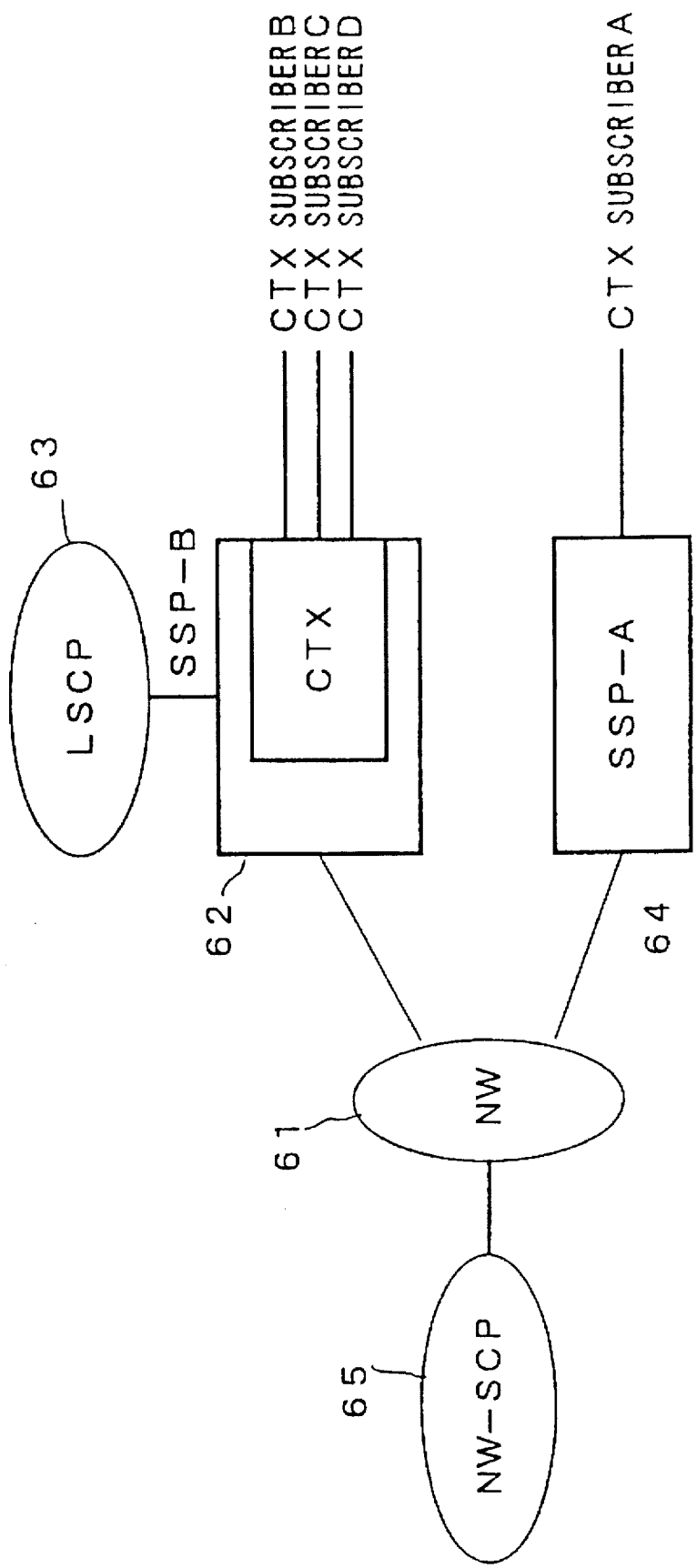
FIG. 20 shows the configuration for a centralized extension service realized in the intelligent network according to the third embodiment.

FIG. 20 shows the configuration where a centralized extension service is realized by an intelligent network (IN). In FIG. 20, a station exchange (SSP-B) 62 has centralized extension service capabilities and accommodates centralized extension service subscribers B, C, and D. The centralized extension service subscribers B, C, and D are the telephone sets which fixedly subscribes to a centralized extension service at a contract with a common carrier. The communications among the centralized extension service subscribers B, C, and D are connected as those using extension numbers by calling a number in a number system (extension numbers) defined in a centralized extension service group. If the centralized extension service subscribers B, C, and D make a call out of the centralized extension service group, then the call is connected by dialing a common subscriber telephone number, and the communications fee is charged to the number determined between the subscriber and the common carrier (for example, the representative number of the centralized extension service subscriber company). The centralized extension service also provides various services such as an automatic connection between extensions or between an extension number and an external number, a call waiting, a call transfer, a conference communications, an abbreviated. dial number, an accounting process, a call back, automatic re-dial, etc.

Plural types of triggers are set in the SSP-B 62. If a trigger is detected in a call issued by the subscribers B, C, and D or in a call arriving at the centralized extension service subscribers B, C, and D, then a request is made based on the trigger and the request notice is given to a local service control point (LSCP) 63.

The LSCP 63 manages the information about centralized extension services using a data base and provides various services such as routing information, voice guidance, etc. at a request from the SSP-B 62.

A station exchange (SSP-A) 64 is connected to a network 61 to which the SSP-B 62 is also connected. The SSP-A 64 does not accommodate the present centralized extension service subscriber.

A network service control point (NW-SCP) 65 integrally controls the LSCPs 63 (a single unit is shown in FIG. 20, but a plurality of station exchanges correspond to an LSCP practically), and is connected to the network 61.

As described above, a centralized extension service hereinafter refers to a configuration where subscribers (B, C, and D) of a centralized extension service group are accommodated by a single station exchange (SSP-B 62). Then, a first management from refers to a managing of the information associated with the centralized extension service of each station exchange (SSP-B 62) by a computer (LSCP 63) provided for the exchange. Each station exchange can accommodate a plurality of centralized extension service groups.

Figure 21:
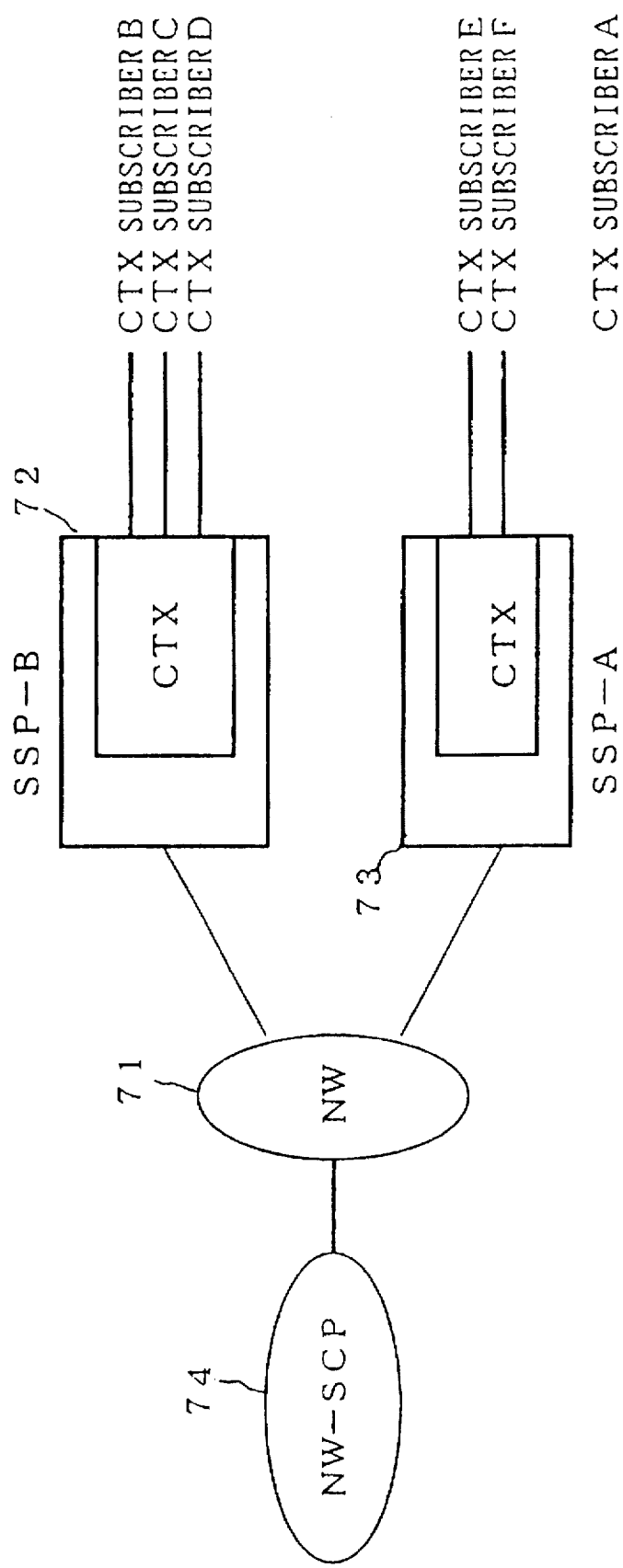
FIG. 21 shows the configuration for a centralized extension service realized in the intelligent network according to the fourth embodiment.

FIG. 21 shows the configuration where a centralized extension service is realized by another form of IN. In FIG. 21, a first station exchange (SSP-B) 72 and a fourth station exchange (SSP-A) 73 accommodate subscribers B, C, and D and subscribers E and F respectively. The centralized extension service subscribers B through F are the telephone sets which belong to the same centralized extension service group. The communications to be made among the subscribers are connected as communications using extension numbers based on the number ɪsystem (extension numbers) predetermined in the group. With the configuration, provided are various services such as an automatic connection between extensions or between an extension number and an external number, a call waiting, a call transfer, a conference communications, automatic re-dial, etc.

Plural types of triggers are set in the SSP-A 73 and the SSP-B 72. If a trigger is detected in a call issued by the subscribers B through F or in a call arriving at the centralized extension service subscribers B through F, then a request is made based on the trigger and the request notice is given to a network service control point (NW-SCP) 74.

The NW-SCP 74 is connected to a network 71 and manages the information about centralized extension services using a data base and provides various services such as routing information, voice guidance, etc. at a request from the SSP-A 73 or the SSP-B 72.

As described above, a city-wide centralized extension service (or a global centralized extension service) hereinafter refers to a configuration where subscribers (B through F) of a plurality of centralized extension service groups are accommodated by a plurality of station exchanges (SSP-A 73 and SSP-B 72). FIG. 21 shows a 2-exchange configuration, but it can be designed such that the subscribers of a single centralized extension service group can be accommodated by N station exchanges. A fourth management form refers to a managing of all information about the centralized extension services by a computer (NW-SCP 74) in the network. A centralized extension service and a city-wide centralized extension service can be optionally combined with the first and fourth management forms. That is, for example, a centralized extension service (not a city-wide type) can be managed in the fourth management form.

As described above, the IN configuration is adopted in the present embodiment and the data of centralized extension services are stored in the SCP independently of an exchange (SSP). Therefore, simply changing the interface at the SCP to the SSP sets up a network including the exchanges of a plurality of vendors, and can easily change and enlarge the system.

Described below are the data structures of a centralized extension service group and of subscribers in the first management form.

FIG. 22 shows the structure of the centralized extension service group data CTXG 1 stored and managed by the NW-SCP 65. As shown in FIG. 22, the centralized extension service group data CTXG 1 consists of a centralized extension service ID which identifies each centralized extension service group and a corresponding network address. The CTX ID is an identification number which identifies a centralized extension service group, and the CWC ID is an identification number which identifies a city-wide centralized extension service group. An address refers to a number identifying a station exchange for accommodating a centralized extension service subscriber and providing a service. The record in the first line in FIG. 22 indicates that the station exchange (SSP-B 62) accommodating the centralized extension service group having the CTX ID 7240 (for example, a group including the centralized extension service subscribers B through D) is assigned the address 342. Since subscribers who belong to a group can be accommodated by a plurality of station exchanges in the city-wide centralized extension services, a single record stores a plurality of addresses of the plural exchanges.

FIG. 23 shows the configuration of the index data INDX stored by the LSCP 63 and the subscriber data U1 and U2. The index data INDX comprise a centralized extension service ID (CTX ID) and index information (Index) indicating the position (area) in the data base which stores corresponding data. When the SSP-B 62 receives an access instruction about an optional CTX ID, the subscriber data U1 and U2 corresponding to the CTX ID are retrieved to obtain various information.

The subscriber data U1 comprises a subscriber code (sub ID), a corresponding password (PIN), a default extension number, a service profile, and a mobility index. The subscriber data U1 also contains a corresponding common subscriber telephone number (telephone number) of a telephone set (not shown). A subscriber code can be an employee number of a company if the company subscribes for a centralized extension service. A password is known by the subscriber code assignee only. A default extension number is preliminarily assigned to the telephone set used by a user having the subscriber code. A service profile is information which defines the type of service to be presented (centralized extension service). A mobility index refers to a flag indicating 1 if the centralized extension service subscriber receives a service outside his or her office and 0 if he or she does not receive it.

The subscriber data U2 is generated for only the user having the subscriber code whose mobility index of the subscriber data U1 is set to 1, and comprises a subscriber code, the present position, the present extension number, and the subscription type of the centralized extension service subscriber having the subscriber code. The present position refers to a common subscriber telephone number (DN) of the telephone set entered and used by the centralized extension service subscriber as a centralized extension service subscriber telephone set. The present extension number is the extension number of a centralized extension service assigned to the entered telephone set. A subscription type refers to the information indicating the period in which a related centralized extension service can be presented through the entry of the telephone set.

FIG. 24 shows the contents of the service profile of the subscriber data U1. The service profile stores a subscriber code and corresponding service names and trigger conditions. The service names A through F indicate services provided by the centralized extension services such as a call waiting, an automatic re-dial, a telephone conference, a call back, an automatic connection between extension numbers or between extension and external numbers, and a call transfer. These services can be individually specified as necessary or unnecessary by a subscriber who requests entries for services. The trigger conditions a through d are flags automatically set by the LSCP 63 in a predetermined sequence depending on the active/inactive state set of the services for each subscriber code. The trigger conditions a through d refer to a call issue detection trigger, a busy destination detection trigger, a hooking detection trigger, and a call waiting detection trigger respectively.

One example method of determining a trigger condition is to set a busy destination detection trigger and a hooking detection trigger because a busy destination and a hooking should be detected as an event for exchanging a call when a call waiting service is provided. Thus, other services can be presented by properly combining trigger conditions a through d. These triggers are explained later in detail. The service profile also stores detailed data on the services set here. For example, if a call transfer service is set, then a transfer destination number and other data are stored.

In the description above, the service profile data of each subscriber are stored in the subscriber data U1. The service profile data can be provided as being separated from the subscriber data U1. In this case, the service profile of the subscriber data U1 shown in FIG. 23 stores addresses $P_1$, $P_2$, $P_3$, ... at which the service profile data of each subscriber code are stored. If a service profile is referred to relating to the subscriber code 880521, then the record of the subscriber code is accessed according to address $P_1$.

FIG. 25 shows the configuration of the service profile data SPF stored in the LSCP 63 in a configuration where a service profile is preliminarily set for each centralized extension service group (for each CTX ID). In this case, the service profile in the subscriber data U1 shown in FIG. 23 stores an address indicating an area storing the service profile data set for the centralized extension service group 7240.

With regard to the service profile data SPF, the trigger conditions are also set depending on the active/inactive state of each service. In the example shown in FIG. 25, a call waiting service and a 3-user communications service are active among call waiting, automatic re-dial and 3-user communications services, and a call issue detection trigger and a hooking detection trigger are active among call issue detection trigger, busy destination detection trigger, hooking detection trigger, . . . . . In this case, all centralized extension service subscribers belonging to a certain centralized extension service group are provided with the same service.

Figure 26:
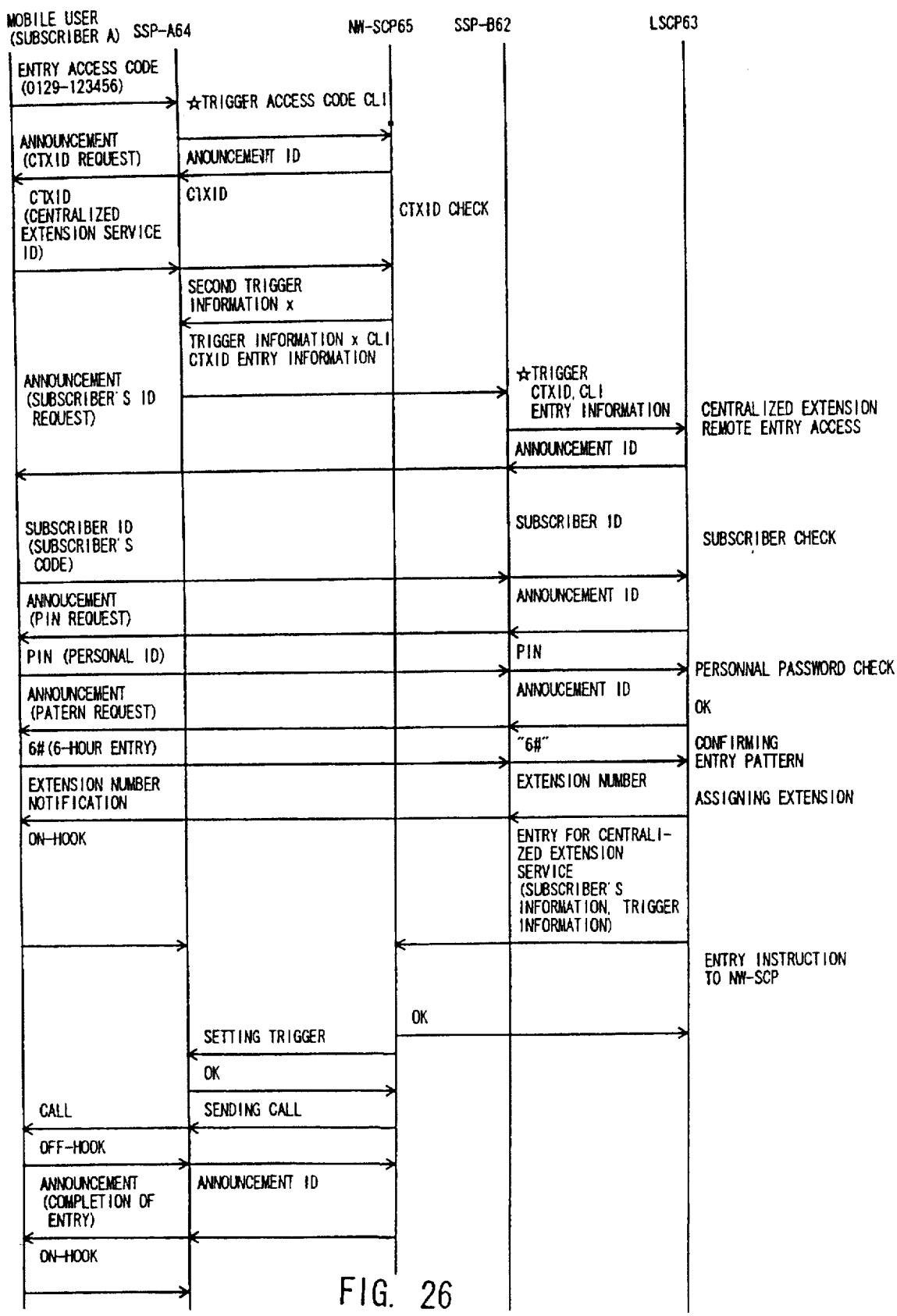
FIG. 26 shows the entry procedure according to the third embodiment.

Then, described below by referring to FIG. 26 is the procedure of subscriber A's entering an optional telephone set (hereinafter referred to as telephone set A, not preliminary entered for a centralized extension service) accommodated by the SSP-A 64 in the first form. Subscriber A is an employee of a company which subscribes to the centralized extension service.

First, subscriber A dials a special number (for example, entry access code 0120-123456) for an entry for a centralized extension service. Upon detection of the call from subscriber A (trigger detection), the SSP-A 64 transfers the common subscriber telephone number (CLI) of subscriber A and the entry access code to the NW-SCP 65. Upon receipt of these data, the NW-SCP 65 returns an announce ID to the SSP-A 64. The announce ID prompts subscriber A for his or her centralized extension service ID (CTXID), and the SSP-A64 transfers a message in response to the announce ID to the telephone set A. For example, the telephone set A receives the announcement "Enter your centralized extension service ID."

If subscriber A enters a centralized extension service ID (CTXID: 7240), the SSP-A 64 transfers the centralized extension service ID to the NW-SCP 65, and the NW-SCP 65 checks the ID. The NW-SCP 65 transfers to the SSP-A 64 the fourth trigger information x to request the SSP-A 64. The fourth trigger information x indicates a request of a remote entry for a centralized extension service. Upon receipt of the fourth trigger information x, the SSP-A64 transfers to the SP-B62 to which the LSCP 63 is connected the fourth information x, the common subscriber telephone number of subscriber A, the centralized extension service ID specified by subscriber A, and entry information.

If the SSP-B 62 detects the fourth trigger information x, it passes the received information to the LSCP 63. When the LSCP 63 recognizes according to the information received from the SSP-B 62 that subscriber A is requesting a centralized extension service entry access, it retrieves the database shown in FIG. 23 and recognizes the centralized extension service group for which subscriber A requests an entry.

Then, the LSCP 63 transmits an announce ID for the prompt for the subscriber code and the password of subscriber A to the SSP-B62. In response to the announce ID, the SSP-B 62 sequentially transmits the announcements "Enter your subscriber code" and "Enter your password" to the telephone set A of subscriber A. If subscriber A enters the subscriber code (sub ID 880521) and the password (3420) according to the announcements, then the LSCP 63 refers to the subscriber data U1 in the data base and confirms that the subscriber who tries to enter the telephone set A is subscriber A. Then, the LSCP 63 refers to the password and confirms the identity of subscriber A. The announcements about the prompts for a subscriber code and a password are issued in separate sequences. That is, output first is an announcement of a prompt for a subscriber code. After the subscriber code has been confirmed, issued is the prompt for a password. If the LSCP 63 has confirmed that the entered subscriber code and password are entered in the data base and that subscriber A is a correct centralized extension service user, then the mobility index INDX corresponding to subscriber A in the subscriber data U1 is set to 1.

Thus, setting the mobility index of subscriber A to 1 reserves an area for storing the information about subscriber A in the subscriber data U2. Then, the common subscriber telephone number (CLI) of the telephone set A received at the start of the entry procedure is written as the present position data of subscriber A.

Then, the LSCP 63 transmits to the SSP-B 62 the announce ID for an entry type of subscriber A. Upon receipt of the announce ID, the SSP-B 62 transmits the announcement "Select an optional entry type" to the telephone set A of subscriber A through the NW 61 and the SSP-A 64. On receiving the announcement, subscriber A selects one mode from among the modes, that is, a mode in which a centralized extension service entry is continuously active until a release procedure is performed (permanent entry); a mode in which an entry active period is set (temporary entry); and a mode in which an entry is active to one call only (call-by-call entry). In the example shown in FIG. 26, subscriber A selects a temporary entry, enters "6#" through the telephone set A, and sets 6 hours as an entry active period. "0#" is entered for a permanent entry, and "00#" is entered for a call-by-call entry. The subscription type information entered by subscriber A is received once by the SSP-B 62 and transmitted to the LSCP 63, and the LSCP 63 stores the subscription form information entered by subscriber A in the subscriber data U2.

Then, the LSCP 63 determines the extension number to be assigned to subscriber A. If a default extension number is preliminarily assigned to subscriber A (subscriber code 880521) in the subscriber data U1, then the LSCP 63 gives notice of the extension number to the SSP-B 62, and the SSP-B 62 notifies subscriber A through the NW61 and the SSP-A 64 of the extension number. On the other hand, if no default extension number is set, then the LSCP 63 assigns an unused extension number to subscriber A, and notifies subscriber A of the extension number in the procedure similar to that for the above described default extension number. An extension number can be set also by entering an optional extension number by subscriber A. If the LSCP 63 assigns an extension number to subscriber A, it notifies the SSP-B 62 of the extension number. The SSP-B 62 notifies the telephone set A of subscriber A of the notified extension number through voice or on a display unit. The LSCP 63 writes in the subscriber data U2 the extension number provided for subscriber A as the present extension number. On receiving the notice of the above described extension number, subscriber A sets the telephone set on-hook.

After notifying the SSP-B 62 of the extension number, the LSCP 63 instructs the NW-SCP 65 to enter for a centralized extension service. At this time, the LSCP 63 notifies the NW-SCP 65 of the subscriber information about subscriber A read from the subscriber data U1 and U2 and the trigger information containing trigger conditions set as being associated with a service provided for subscriber A. The notified trigger conditions are determined by referring to the service profile shown in FIG. 24 or 25. On receiving the above mentioned centralized extension service entry instruction, the NW-SCP 65 returns an OK signal to the LSCP 63.

Then, the NW-SCP 65 sets the above described trigger in the SSP-A 64 accommodating subscriber A through the network 61. In response to the setting, the SSP-A 64 returns an OK signal. If the service profile of subscriber A (subscriber code 880521) shows, for example, a state as shown in FIG. 24, then triggers a through d are set to active in the SSP-A 64. The triggers a through d are described later.

Upon receipt of the OK signal, the NW-SCP 65 issues to the SSP-A 64 a request for a call to the telephone set A of subscriber A. On receiving the call request, the SSP-A 64 calls the telephone set A of subscriber A with a ringing tone. If subscriber A answers the call by setting the telephone set A off-hook, then the SSP-A 64 notifies the NW-SCP 65 of this operation. Upon receipt of the notification, the NW-SCP 65 notifies the SSP-A 64 of the announce ID for notifying the completion of entry. When the SSP-A 64 receives the announce ID, it announces the completion of entry to the telephone set A of subscriber A. The announcement can be, for example, "The entry for the centralized extension service has been completed". If subscriber A answers the announcement with the telephone set A placed on-hook, then the telephone set A (subscriber A) can be provided with centralized extension services similar to those for the centralized extension service subscribers B through D accommodated by the SSP-B 62. That is, subscriber A can call the centralized extension service subscribers B through D or the centralized extension service subscriber B through D can call subscriber A on the external telephone set A accommodated by the SSP-A 64 using the extension number. If subscriber A communicates with a terminal unit which does not belong to the centralized extension service group, then the communications fee is charged to the representative number of the centralized extension service. Furthermore, the telephone set A of subscriber A can be provided with centralized extension services such as call waiting, call transfer, automatic re-dial, etc. depending on the trigger set by the NW-SCP 65 in the SSP-A 64 for subscriber A.

In the above described entry procedure, preliminarily determined are the services provided for subscriber A, and a trigger is automatically set depending on the services. However, subscriber A can set each service active or inactive through the communications with the LSCP 63, after subscriber A has been given notice of the extension number, and the triggers are set in the SSP-A 64 based on the active service.

Figure 27:
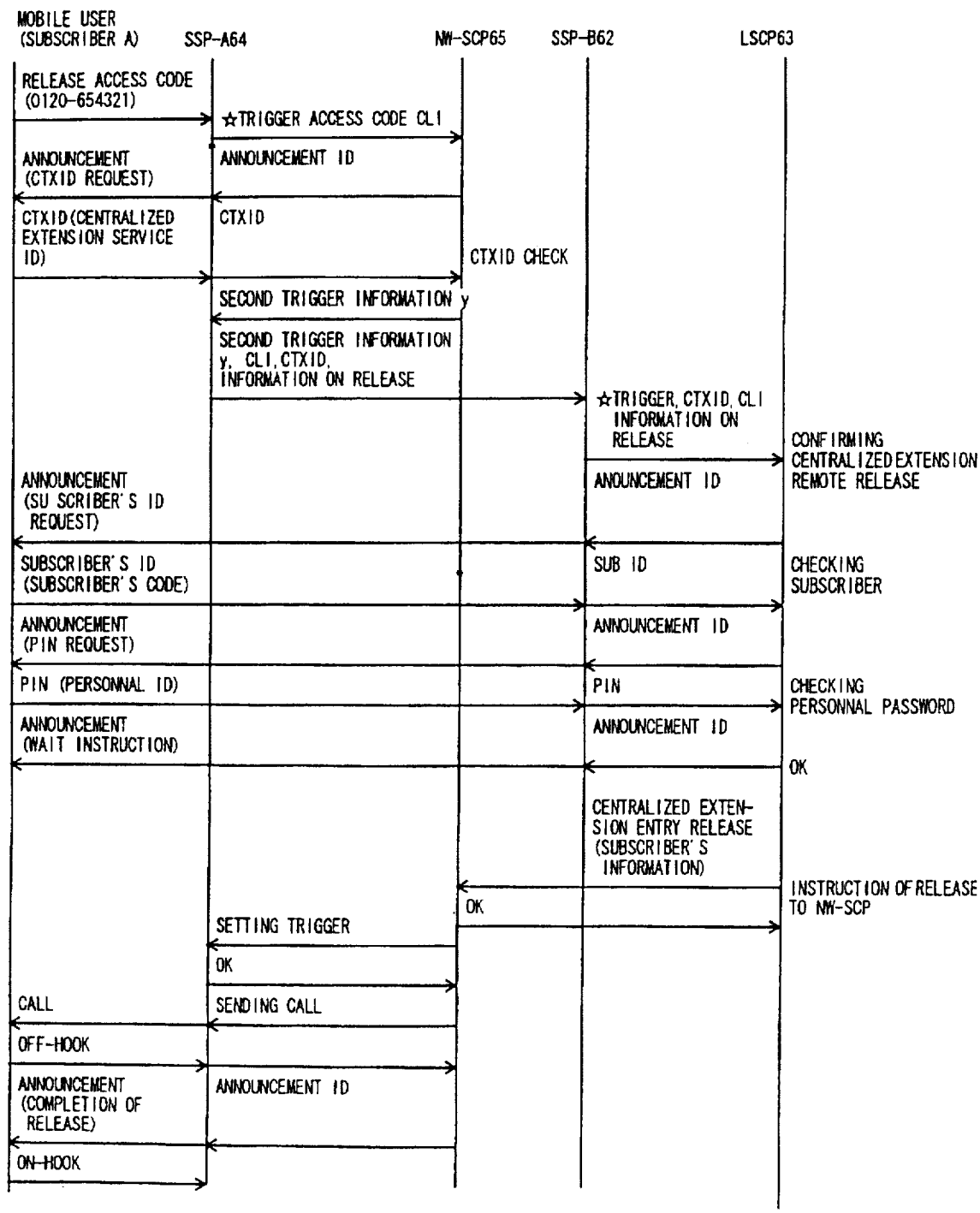
FIG. 27 shows the releasing procedure according to the third embodiment.

The procedure of releasing, from the entry of the centralized extension service, subscriber A (telephone set A) entered in the above described procedure is explained below by referring to FIG. 27.

The releasing procedure in the first management form is basically the same as the entry procedure explained by referring to FIG. 26. That is, if subscriber A dials the special number indicating the release of the centralized extension service (release access code: for example, 0120-654321), then the NW-SCP 65 is accessed in the same manner as the above described entry procedure. However, since the NW-SCP 65 has received a release access code from subscriber A, it transfers the fourth trigger information y to the SSP-A 64. The fourth trigger information y indicates a request of a release for a entered centralized extension service. The SSP-A 64 transfers to the SSP-B 62 the fourth trigger information y, the common subscriber telephone number of subscriber A, centralized extension service ID, and release information.

When the SSP-B 62 detects the fourth trigger information y, it passes the received information to the LSCP 63. Then, the LSCP 63 recognizes according to the information received from the SSP-B 62 that subscriber A is requesting centralized extension service release access.

If the LSCP 63 recognizes the centralized extension service release access, then it receives from subscriber A through the SSP-B 62 as in the above described entry procedure a centralized extension service ID (CTX ID), a subscriber code (sub ID), and a password, and checks whether or not the data are valid by referring to the index data INDX and the subscriber data U1. If, after checking the data, it is recognized that the subscriber who requests the release of the entry of a centralized extension service is subscriber A, that is, a user of a centralized extension service, then the LSCP 63 gives the announcement, for example, "The centralized extension service is being released. Please wait until the process is completed."

Then, the LSCP 63 instructs the NW-SCP 65 to release the entry of a centralized extension service from the telephone set A. At this time, LSCP 63 reads the present position (subscriber information) of subscriber A from the subscriber data U2, and notifies the NW-SCP 65 of the information. Upon receipt of the instruction to release the entry of the above described centralized extension service, the NW-SCP 65 returns an OK signal to the LSCP 63. Upon receipt of the OK signal, the LSCP 63 sets the mobility index of subscriber A to 0 in the subscriber data U1, and clears the data on subscriber A from the subscriber data U2.

According to the above described centralized extension service entry release instruction, the NW-SCP 65 notifies the SSP-A 64 of the release of the trigger. Upon receipt of the release notification, the SSP-A 64 releases the trigger and returns an OK signal. If the NW-SCP 65 receives the OK signal, then it issues to the SSP-A 64 a request for a call to the telephone set A of subscriber A. In response to the request, the SSP-A 64 calls the telephone set A of subscriber A. If subscriber A answers the call by setting the telephone set A off-hook, then the SSP-A 64 notifies the NW-SCP 65 of the off-hook operation. Upon receipt of the notification, the NW-SCP 65 transmits to the SSP-A 64 the announce ID to notify subscriber A of the completion of the release. The contents of the announcement are, for example, "The entry of the centralized extension service for the telephone set you are using at present has been released." If subscriber A has confirmed the release of the telephone set A from the centralized extension service entry, then subscriber A sets the telephone set A on-hook. Thus, the telephone set A (subscriber A) returns to the initial state where the telephone set A is not entered for the above described centralized extension service.

The above described release process is performed when a permanent entry is released or when a temporary entry is released halfway. However, if a predetermined time has passed in the temporary entry, the LSCP 63 automatically sets the mobility index of subscriber A to 0 in the subscriber data U1, clears the data on subscriber A from the subscriber data U2, and releases the trigger set in the SSP-A 64. This process is controlled by counting the passing time from the entry point using a timer built in the LSCP 63.

Described below is the fourth management form. In the fourth form, an NW-SCP 74 manages all information about centralized extension services. The data managed by the NW-SCP 74 are index data INDX and subscriber data U1 and U2 shown in FIG. 23, and the service profile data shown in FIG. 24 or 25. That is, the data managed by the NW-SCP 74 in the fourth form is the same as the data managed by the LSCP 63 in the first form.

Figure 28:
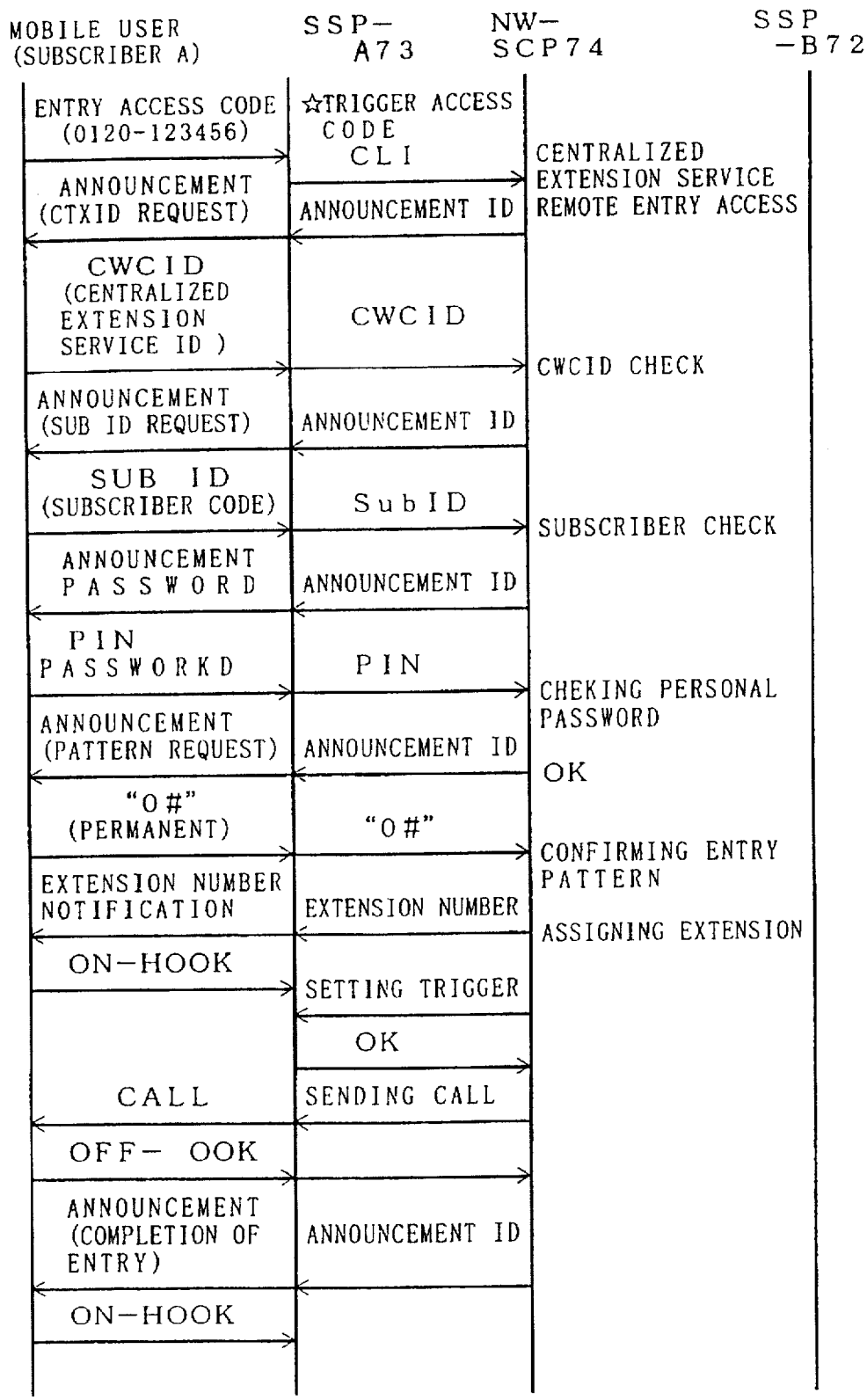
FIG. 28 shows the entry procedure according to the fourth embodiment.

FIG. 28 shows the procedure of entering an optional telephone set (not preliminary entered for a centralized extension service and referred to as a telephone set A) accommodated by the SSP-A 73 for a centralized extension service provided by the NW-SCP 74.

The entry procedure in the fourth management form is the same as that in the first management form on the whole. However, in the fourth form, an LSCP is not provided for each station exchange, and all information about centralized extension services (city-wide centralized extension services) is integrally managed by the NW-SCP 74. Therefore, entry information is transmitted between the telephone set of subscriber A and the NW-SCP 74. That is, when subscriber A sends an entry access code, the SSP-A73 transfers to the NW-SCP 74 the common subscriber telephone number of subscriber A and the access code. When the NW-SCP 74 recognizes the centralized extension service entry access from subscriber A, the communications start for entry information between subscriber A and the NW-SCP 74. The NW-SCP 74 issues a trigger set instruction to the SSP-A 73. FIG. 28 shows an example of a procedure followed when a permanent entry is selected as an entry form.

Figure 29:
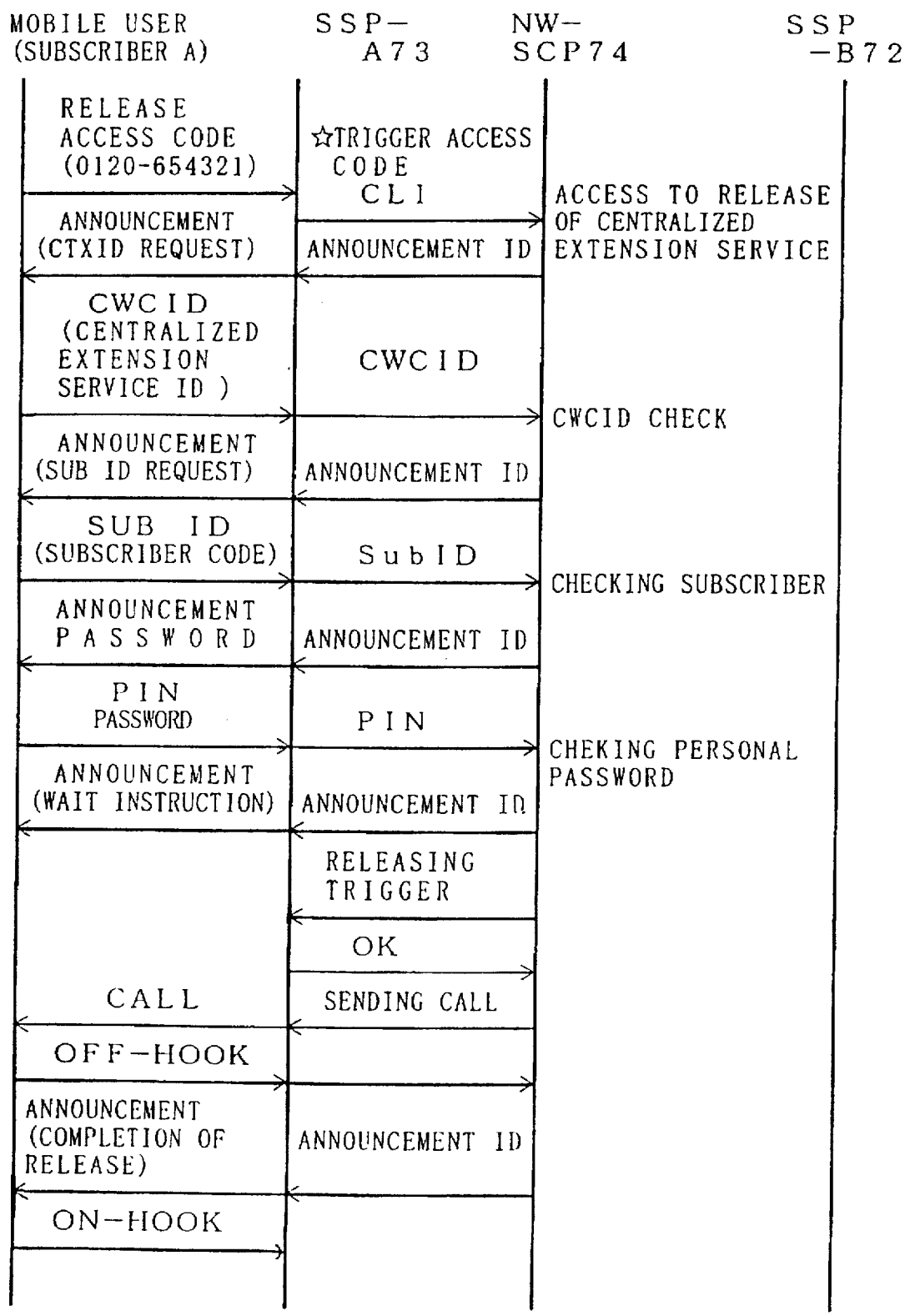
FIG. 29 shows the releasing procedure according to the fourth embodiment.

FIG. 29 shows the procedure followed when subscriber A (telephone set A) entered in the procedure shown in FIG. 28 is released from an entry for a centralized extension service. The release procedure according to the fourth management form shown in FIG. 29 is basically the same as that shown in FIG. 28 except that a release access code is issued instead of an entry access code. As in the entry procedure, the release information is transmitted between subscriber A and the NW-SCP 74 in the fourth form.

Described below is a trigger set in the SSP-A 64 or the SSP-A 73 in the above described entry procedure. Specifically described is a call issue detection trigger, a busy destination detection trigger, a hooking detection trigger, and a call waiting detection trigger. Since the process of setting a trigger is common to the SSP-A 64 and the SSP-A 73, explained below is only the process performed when subscriber A is entered for a centralized extension service in the SSP-A 64 in the first management form.

FIG. 30 shows the configuration of the data (exchange data SSP) stored and managed by the SSP-A 64. Exchange data SSP contain an accommodation physical number identifying the subscriber line accommodated by the SSP-A 64 and a common subscriber telephone number of a telephone set connected to a subscriber line one-to-one corresponding to the number. If an optional telephone set accommodated by the SSP-A 64 is entered for a centralized extension service in the above described procedure, a trigger information setting area is provided for each common subscriber telephone number of the above described telephone set. The area is used to set flags in for triggers a through d.

The call issue detection trigger (trigger a) indicates that a predetermined process is carried out if every call issued from a centralized extension service subscriber accommodated by the SSP-A 64 has been detected and recognized as a call under a centralized extension service. Setting the trigger is accomplished by setting 1 for the flag of the trigger a of the telephone set entered for the centralized extension service in the trigger information of the exchange data SSP. If a centralized extension service call is made, that is, if the flag of the trigger a of a calling telephone set indicates 1, then the call is transferred to the NW-SCP 65 for access it. At this time, the SSP-A 64 transfers to the NW-SCP 65 the common subscriber telephone number (telephone number) of a source subscriber (subscriber A), a destination number, and information that the access is made at a request for a process according to the call issue detection trigger.

The busy destination detection trigger (trigger b) indicates that a predetermined process is carried out if a call from a centralized extension service subscriber A accommodated by the SSP-A 64 has been detected as a busy destination call.

The hooking detection trigger (trigger c) indicates that a predetermined process is carried out if detected is a hooking from a centralized extension service subscriber A accommodated by the SSP-A 64.

The call waiting detection trigger (trigger d) indicates that a predetermined process is carried out if detected is a call arrival at subscriber A during the communications of the centralized extension service subscriber A accommodated by the SSP-A 64.

If these triggers have been detected, the SSP-A 64 accesses the NW-SCP 65. At this time, the SSP-A 64 notifies the NW-SCP 65 of the common subscriber telephone number (telephone number) of subscriber A and of the information that the access indicates, in response to the respective triggers, a request for a process according to the busy destination detection trigger, a request for a process according to the hooking detection trigger, and a request for a process according to the call waiting detection trigger.

Figure 31:
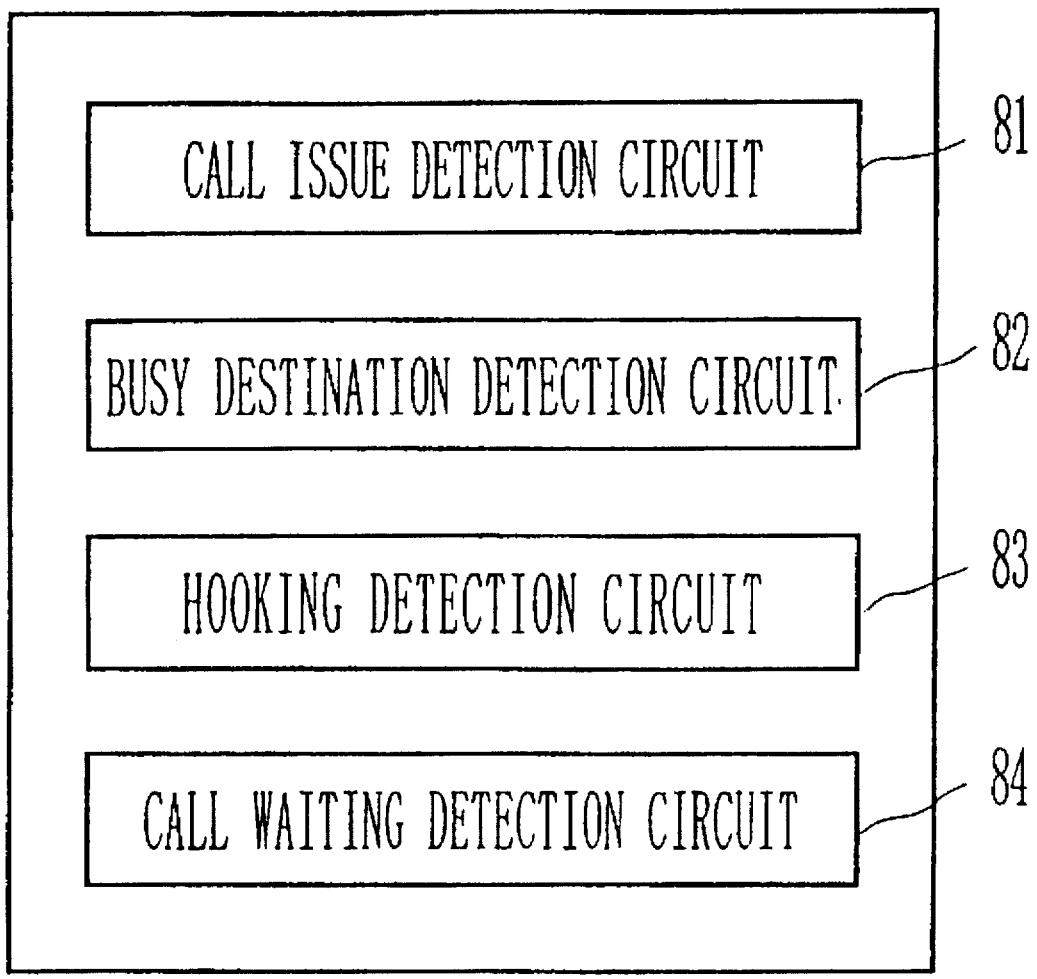
FIG. 31 is a block diagram of a detecting circuit in the SSP-A.

FIG. 31 is a block diagram showing various detection circuits in the SSP-A 64 (or the SSP-A 73). Each of these detection circuits is provided for a common subscriber telephone number.

A call issue detection circuit 81 detects a call issued by a telephone set accommodated by the SSP-A 64. A busy destination detection circuit 82 detects that a call issued by the telephone set accommodated by the SSP-A 64 is not answered because of a busy status at its destination, and detects a busy signal returned by an exchange accommodating the destination telephone set. A hooking detection circuit 83 detects a hooking signal from the telephone set accommodated by the SSP-A 64. A call waiting detection circuit 84 detects the arrival of a call to a telephone set accommodated by the SSP-A 64 when it is involved in another call. Since these detection circuits 81 through 84 can be realized by the circuits of existing station exchanges, the detailed drawings of the circuits are omitted here.

If the detection circuits 81 through 84 have detected the above described event, the SSP-A 64 refers to the exchange data SSP shown in FIG. 30 to check whether or not a trigger corresponding to the detected event has been set yet. If it has been already set, the NW-SCP 65 is accessed as described above.

Described below is the procedure of activating various services in a communications system in which subscriber A is allowed to be provided with a centralized extension service by setting the above described trigger in the SSP-A 64 or the SSP-A 73. Hereinafter, please refer to the configuration shown in FIG. 20 when the first management form is described, and refer to the configuration shown in FIG. 21 when the fourth management form is described. Subscriber A is entered for a centralized extension service in the procedure shown in FIG. 26 or 28.

Figure 32:
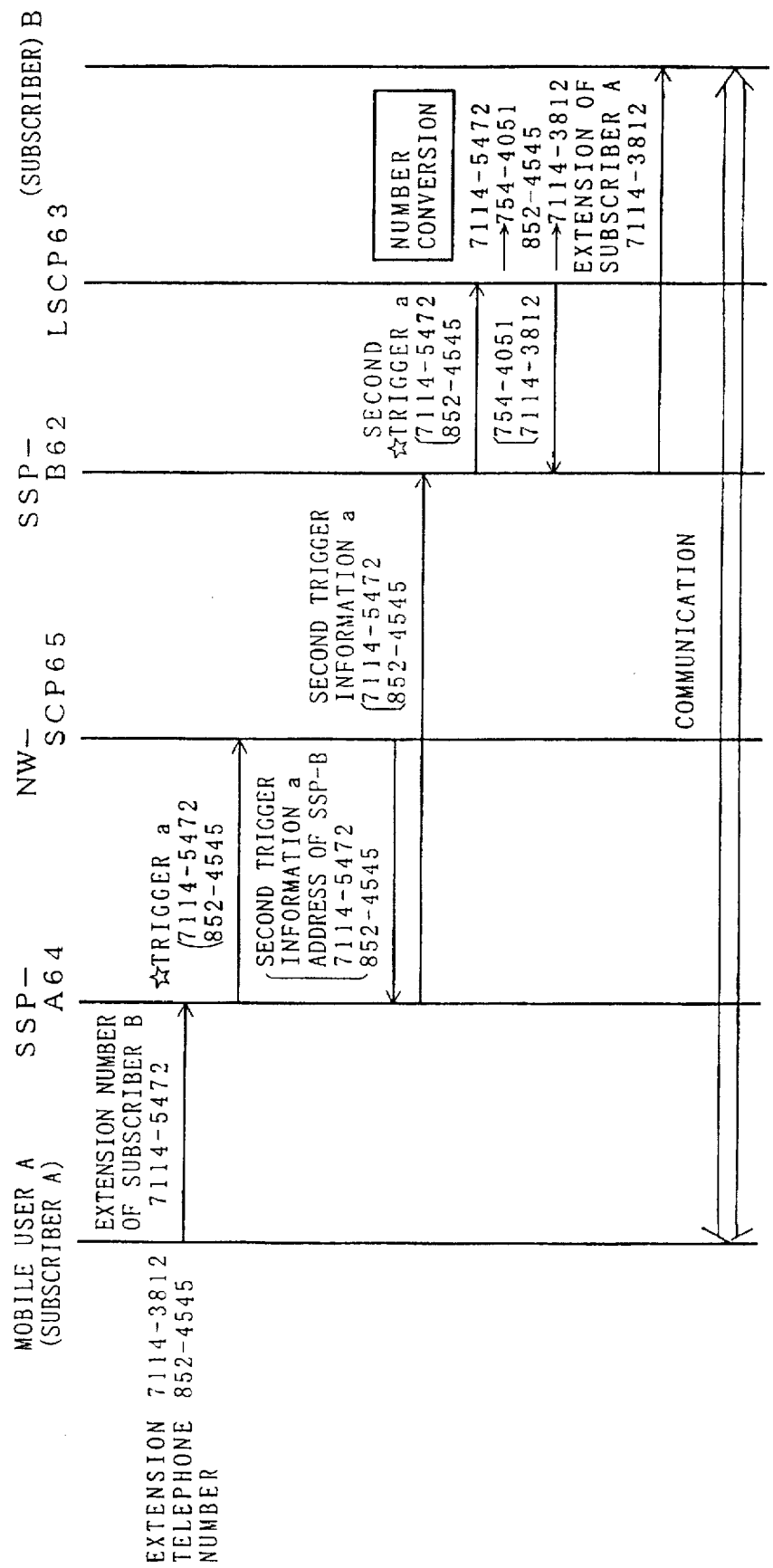
FIG. 32 shows the sending procedure according to the first aspect.

FIG. 32 shows the procedure of issuing a call when subscriber A calls subscriber B using an extension number in the first management form. First, subscriber A dials the extension number 7114-5472 of subscriber B.

On receiving the call, the SSP-A 64 checks the flag of the trigger a in the trigger information of subscriber A set in the exchange data SSP. Since the flag is set to 1, the SSP-A 64 detects a call issue detection trigger and performs a process in response to the detection. That is, the SSP-A 64 transfers to the NW-SCP 65 the extension number of subscriber B and the common subscriber telephone number (hereinafter referred to as a telephone number) of subscriber A.

Upon receipt of the notification, the NW-SCP 65 recognizes a request of centralized extension service call from subscriber A, identifies the centralized extension service for which subscriber A is entered by retrieving the data base managed by the NW-SCP 65 based on the telephone number of subscriber A and the trigger information, and obtains the network address of the SSP-B 62. Then, the NW-SCP 65 transfers to the SSP-B 62 the fourth trigger information a, the extension number of subscriber B, and the telephone number of subscriber A.

Upon receipt of the fourth trigger information a, the SSP-B 62 notifies the LSCP 63 of the extension number 7114-5472 of subscriber B and the telephone number 852-4545 of subscriber A to ask it to convert the number. The LSCP 63 converts the extension number of subscriber B into the telephone number 754-4051 and the telephone number of subscriber A into the extension number 7144-3812. At this time, the LSCP 63 retrieves the call issue rules based on the telephone numbers of the source (subscriber A) and the destination (subscriber B). If the call from subscriber A is not limited by the rules, then the LSCP 63 returns the extension number of subscriber A and the telephone number of subscriber B to the SSP-B 62. In response to this, the SSP-B 62 calls subscriber B and notifies subscriber B of the extension number of subscriber A. Then, subscriber A is connected to subscriber B, enabling them to communicate with each other. If the call is limited by the rules, it is disconnected.

Figure 33:
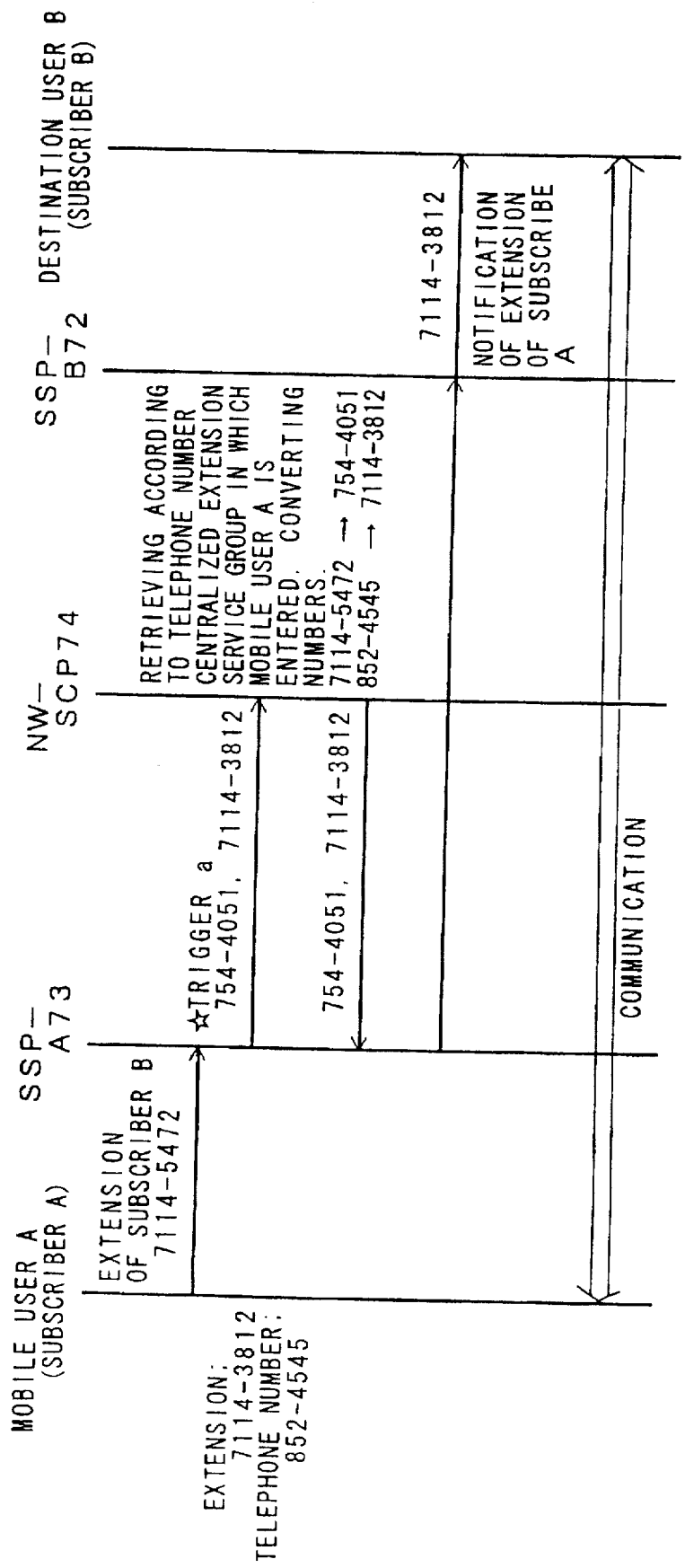
FIG. 33 shows the sending procedure according to the fourth aspect.

FIG. 33 shows the procedure of issuing a call from subscriber A to subscriber B using the extension number in the fourth management form. First, subscriber A dials the extension number 7114-5472 of subscriber B. On receiving the call, the SSP-A 73 detects a call issue detection trigger (trigger a) as in the first management mode and recognizes that the call of subscriber A is a centralized extension service call.

On detecting the centralized extension service call, the SSP-A 73 transmits to the NW-SCP 74 the extension number 7114-5472 of subscriber B and the telephone number 852-4545 of subscriber A and notifies the NW-SCP 74 of the centralized extension service call from subscriber A. Upon receipt of the notification, the NW-SCP 74 refers to the telephone number of subscriber A and identifies the centralized extension service for which subscriber A is entered. Thus, the NW-SCP 74 converts the extension number of subscriber B into the telephone number 754-4051 and the telephone number of subscriber A into the extension number 7144-3812 of subscriber A, and returns them to the SSP-A 73. Upon receipt of these numbers, the SSP-A 73 calls subscriber B through the network 71 and the SSP-B 72, and notifies subscriber B of the extension number of subscriber A, thereby enabling them to communicate with each other.

In the call issue procedure shown in FIG. 32 or 33, the destination is the centralized extension service subscriber B, but can obviously be the telephone set not entered for a centralized extension service. In this case, however, a call issue detection trigger is detected by the SSP-A 64 (or the SSP-A 73) when a call is issued by subscriber A, and the NW-SCP 65 (or the NW-SCP 74) is accessed. The NW-SCP 65 (or the NW-SCP 74) charges the communications fee for the call from subscriber A to the representative number of a centralized extension service group.

Figure 34:
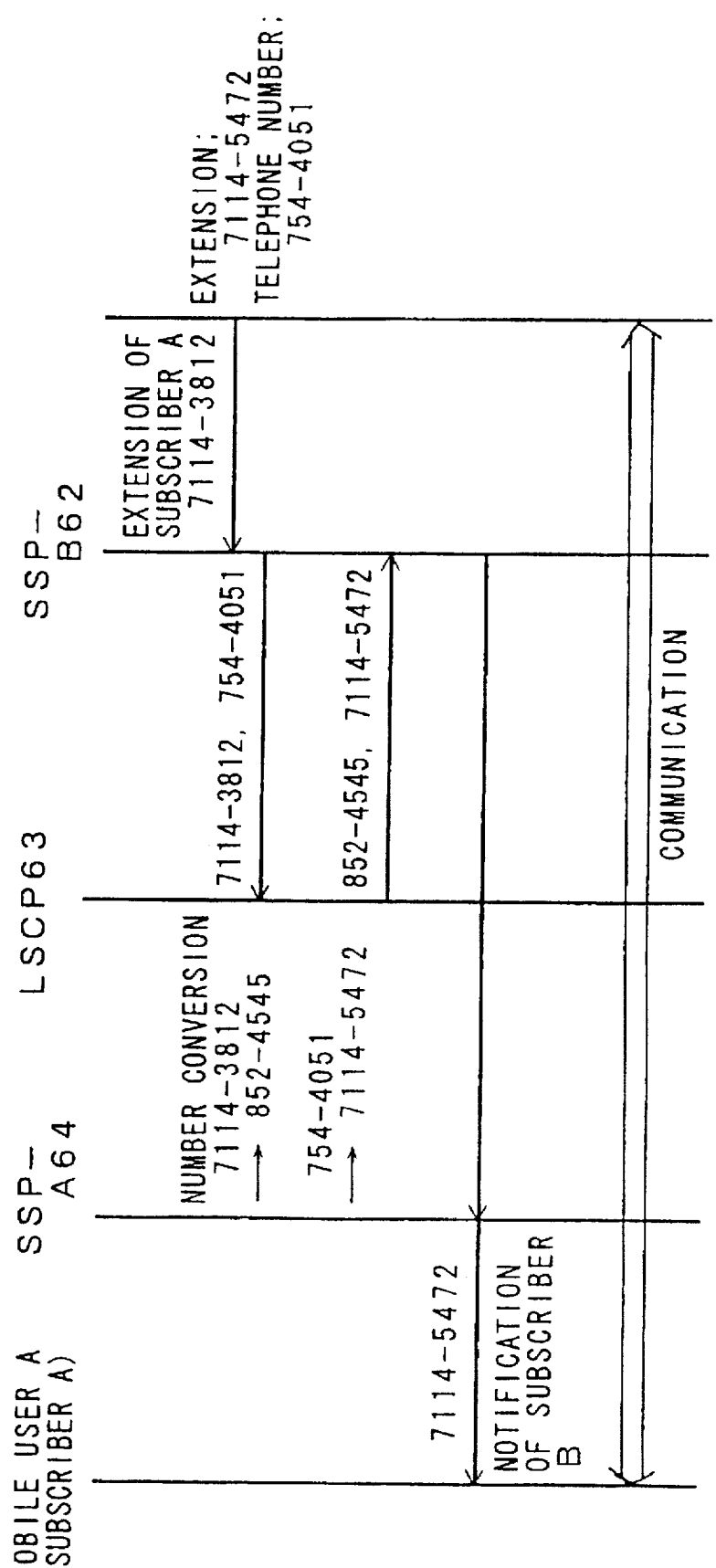
FIG. 34 shows the receiving procedure according to the first aspect.

FIG. 34 shows the procedure of receiving a call at subscriber A in the first management form. If subscriber B entered for the same centralized extension service group issues a call by dialing the extension number 7114-3812 of subscriber A, then the SSP-B 62 transfers to the LSCP 63 the extension number of subscriber A and the telephone number 754-4051 of subscriber B and asks the LSCP 63 to convert the numbers. The LSCP 63 converts the extension number of subscriber A into the telephone number 852-4545 of subscriber A, converts the telephone number of subscriber B into the extension number 7114-5472 of subscriber B, and returns them to the SSP-B 62. The SSP-B 62 calls subscriber A through the SSP-A 64, and notifies subscriber A of the extension number of subscriber B, thereby enabling them to communicate with each other.

Figure 35:
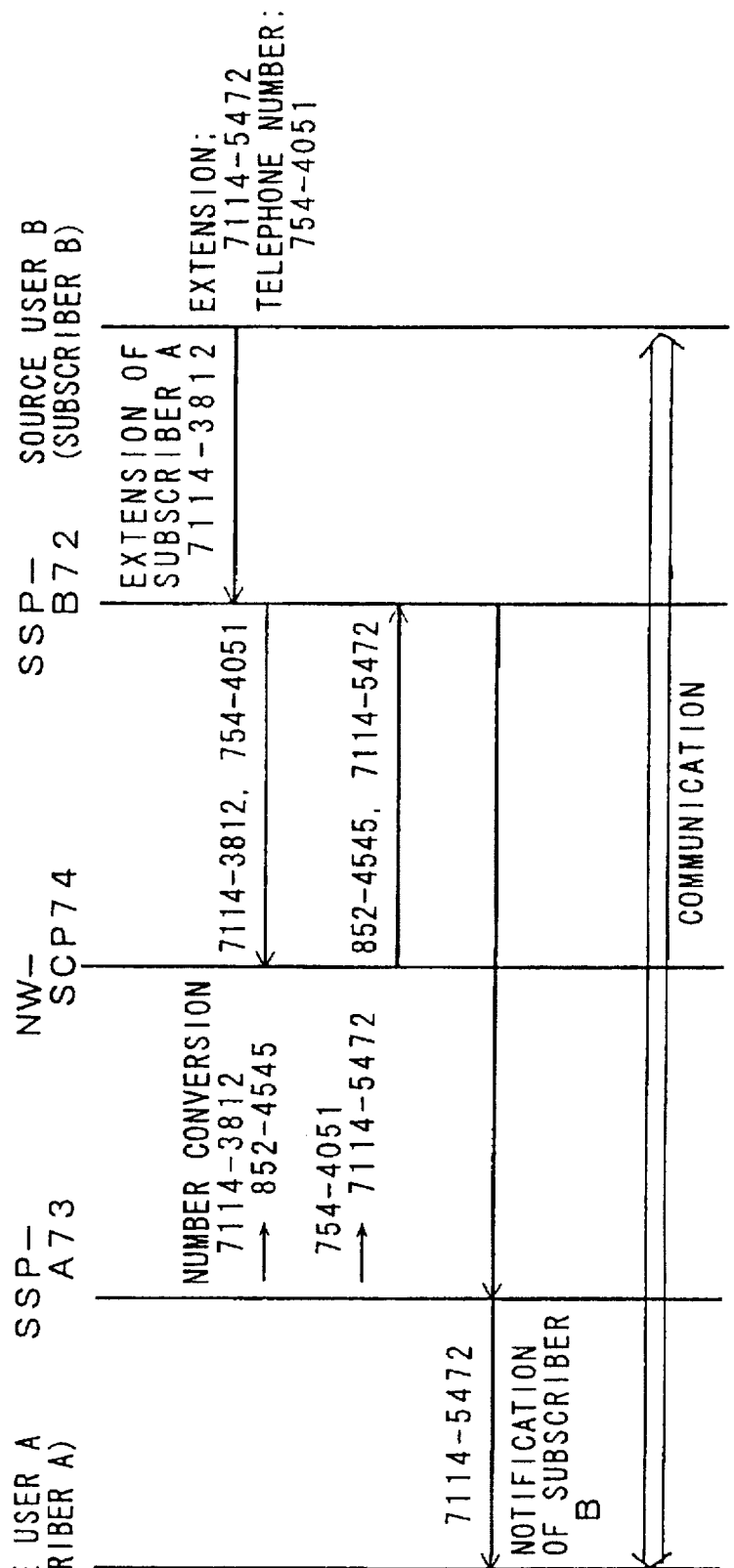
FIG. 35 shows the receiving procedure according to the fourth aspect.

FIG. 35 shows the procedure of receiving a call at subscriber A in the fourth management form. The procedure is the same as that in the first form on the whole, but the process of converting a number is performed by the NW-SCP 74, not by the LSCP 63.

In the procedure of receiving a call shown in FIG. 34 or 35, the call is sent by the centralized extension service subscriber B. However, the caller can be a telephone set not entered for a centralized extension service.

Figure 36:
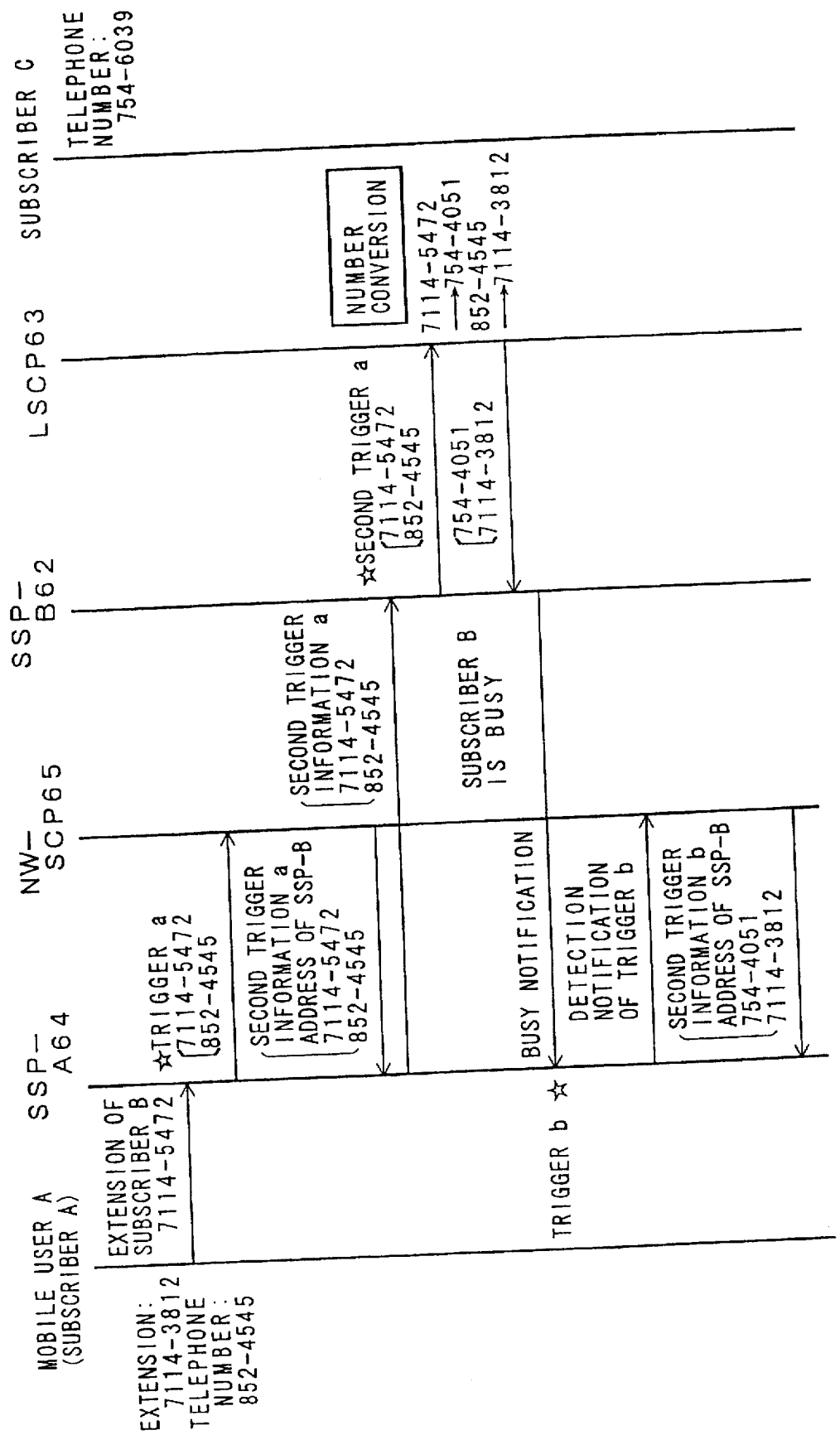
FIG. 36 shows the procedure (1) of activating an automatic re-dial service according to the first aspect.
Figure 37:
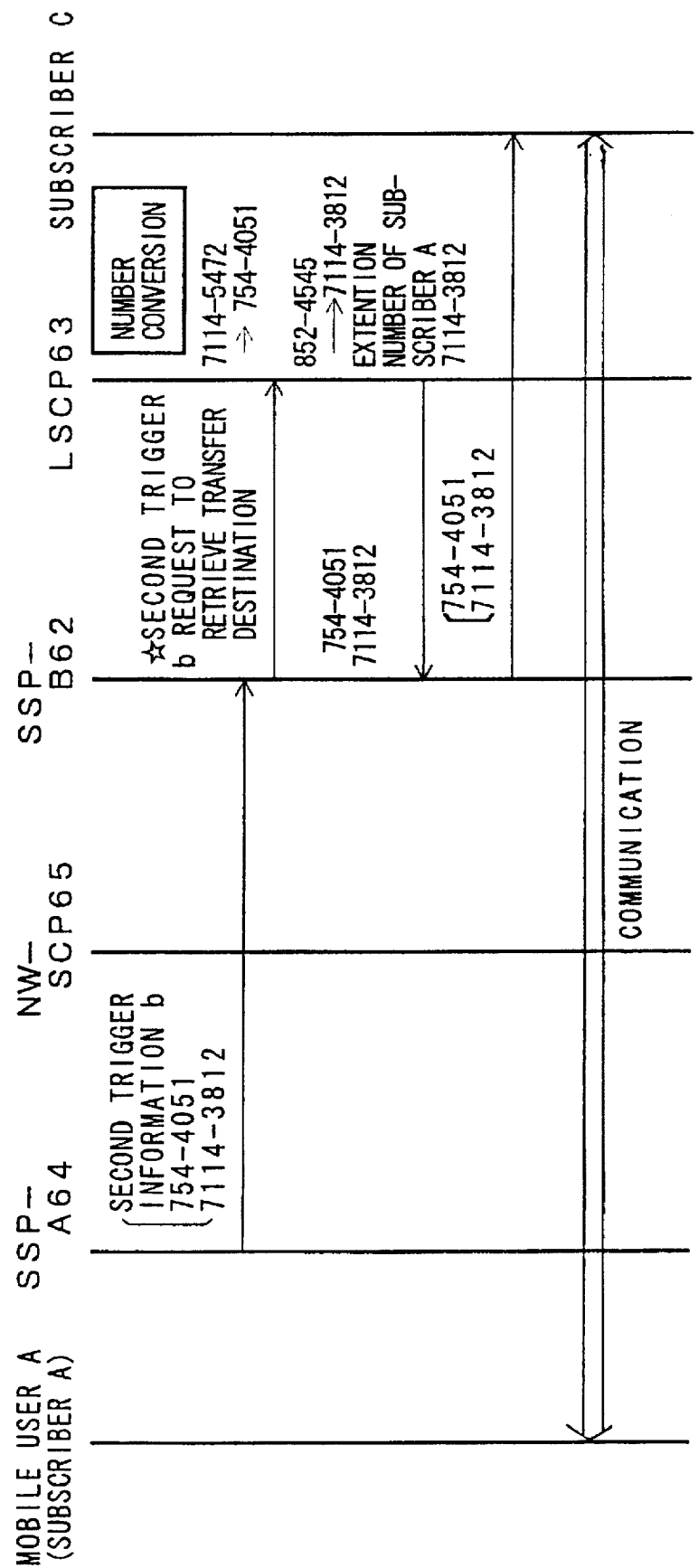
FIG. 37 shows the procedure (2) of activating an automatic re-dial service according to the first aspect.

FIGS. 36 and 37 show the procedure of activating an automatic redialing service in the first management form. Described below is the procedure of re-calling subscriber B. In this case, subscriber A issues a call to subscriber B entered in the same centralized extension service group. If subscriber B is in a busy status (for example, in communications), then subscriber B is called again.

If subscriber A issues a call by dialing the extension number 7114-5472 of subscriber B, then a call issue detection trigger is detected by the SSP-A 64 as described by referring to FIG. 32, and the SSP-B 62 detects a fourth trigger a, thereby accessing the LSCP 63. Although the SSP-B 62 tries to call subscriber B based on the routing information received from the LSCP 63, subscriber B is busy and a busy notification is given to the SSP-A 64.

If the busy destination detection circuit 82 in the SSP-A 64 detects the busy notification, then it checks whether or not the flag of the trigger b of the trigger information in the exchange data SSP is set. If the flag of the trigger b (busy destination detection trigger) is set, it is considered that the trigger has been detected and a busy destination detection notice is given to the NW-SCP 65 in response to the call from subscriber A. On receiving the notice, the NW-SCP 65 retrieves the network address of the SSP-B 62 from the data base, and transfers to the SSP-B 62 through the SSP-A 64 the fourth trigger information b, the extension number of subscriber B, and the telephone number of subscriber A.

Upon receipt of the fourth trigger information b, the SSP-B 62 notifies the LSCP 63 of the extension number 7114-5472 of the receiving subscriber B and the telephone number 852-4545 of subscriber A, and asks the LSCP 63 to retrieve a service to be provided when the busy state is detected.

The LSCP 63 retrieves the subscriber data U1 of subscriber A and the service profile based on the telephone number of subscriber A. Set in the present example is an automatic redialing function. Therefore, the LSCP 63 converts the extension number of subscriber B into its telephone number and the telephone number of subscriber A into its extension number, and returns the converted numbers to the SSP-B 62. The SSP-B 62 calls subscriber B again. The automatic redialing process is repeatedly performed until subscriber A sets the receiver on hook.

Figure 38:
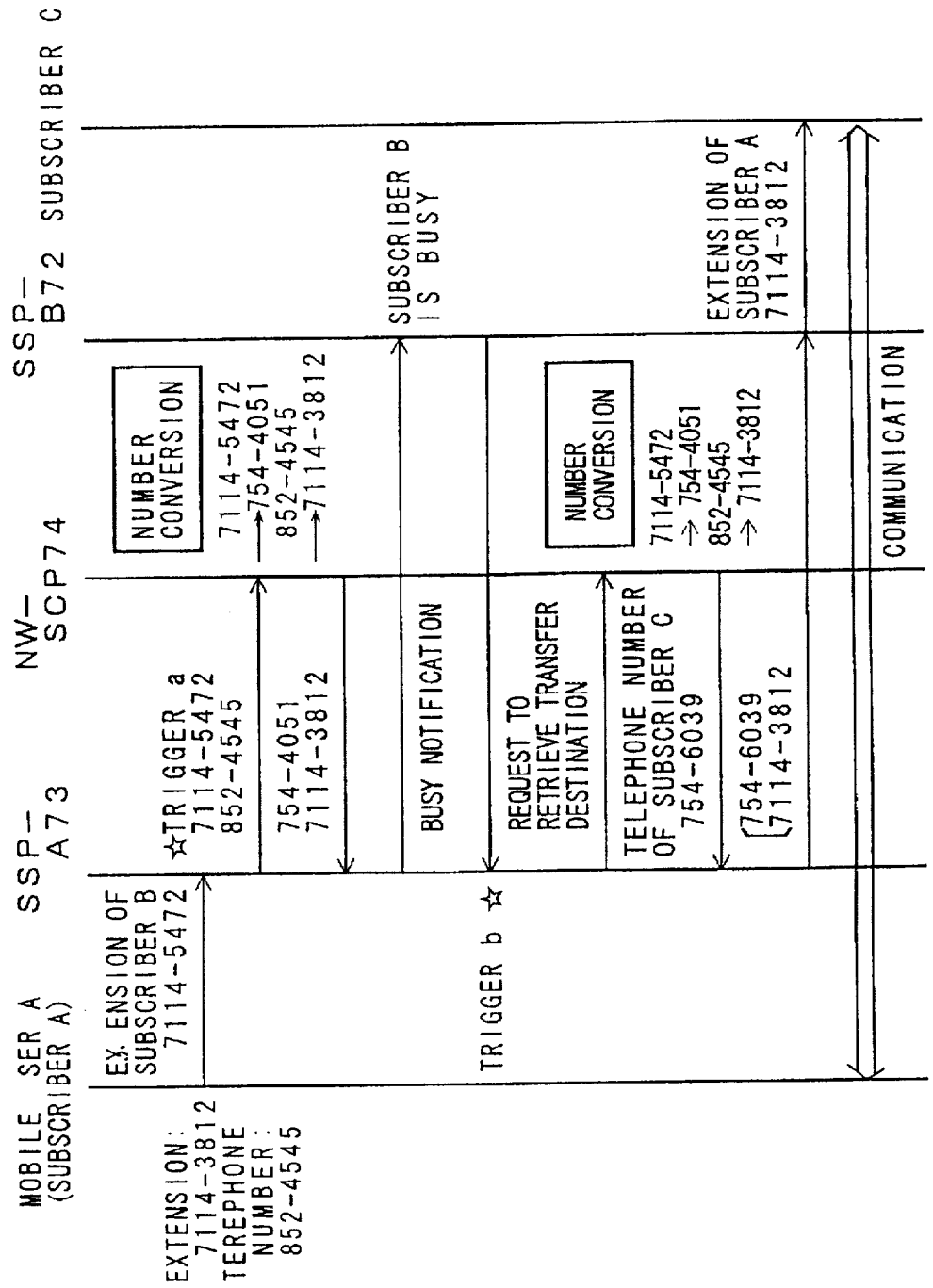
FIG. 38 shows the procedure of activating an automatic re-dial service according to the fourth aspect.

FIG. 38 shows the procedure of activating an automatic redialing service in the fourth management form. Described below is the procedure of transferring a call. In this case, subscriber A issues a call to subscriber B belonging to the same centralized extension service group. If subscriber B is in a busy status, then subscriber B is called again in the following procedure.

If subscriber A issues a call by dialing the extension number 7114-5472 of subscriber B, then as described by referring to FIG. 33, the SSP-A 73 tries to call subscriber B through the SSP-B 72. However, subscriber B is busy and a busy notification is given to the SSP-A 73.

If the busy destination detection circuit 82 in the SSP-A 73 detects the busy notification, then it checks whether or not the trigger b of the exchange data is set. If the flag of the trigger b (busy destination detection trigger) is set, it is considered that the trigger has been detected and a busy destination detection notice is given to the NW-SCP 74 in response to the call from subscriber A. At this time, the SSP-A 73 notifies the NW-SCP 74 of the extension number 7114-5472 of subscriber B and the telephone number 852-4545 of subscriber A, and asks it to retrieve a service to be provided when the busy status is detected.

The NW-SCP 74 retrieves the subscriber data U1 of subscriber A and the service profile based on the telephone number of subscriber A. If the NW-SCP 74 recognizes as a result of the retrieval that the service to be provided is an automatic redialing service, then the NW-SCP 74 converts the extension number of subscriber B into its telephone number and the telephone number of subscriber A into its extension number, and then turns the converted numbers to the SSP-B 72 through the SSP-A 73. Then, the SSP-B 72 calls subscriber B again.

Figure 39:
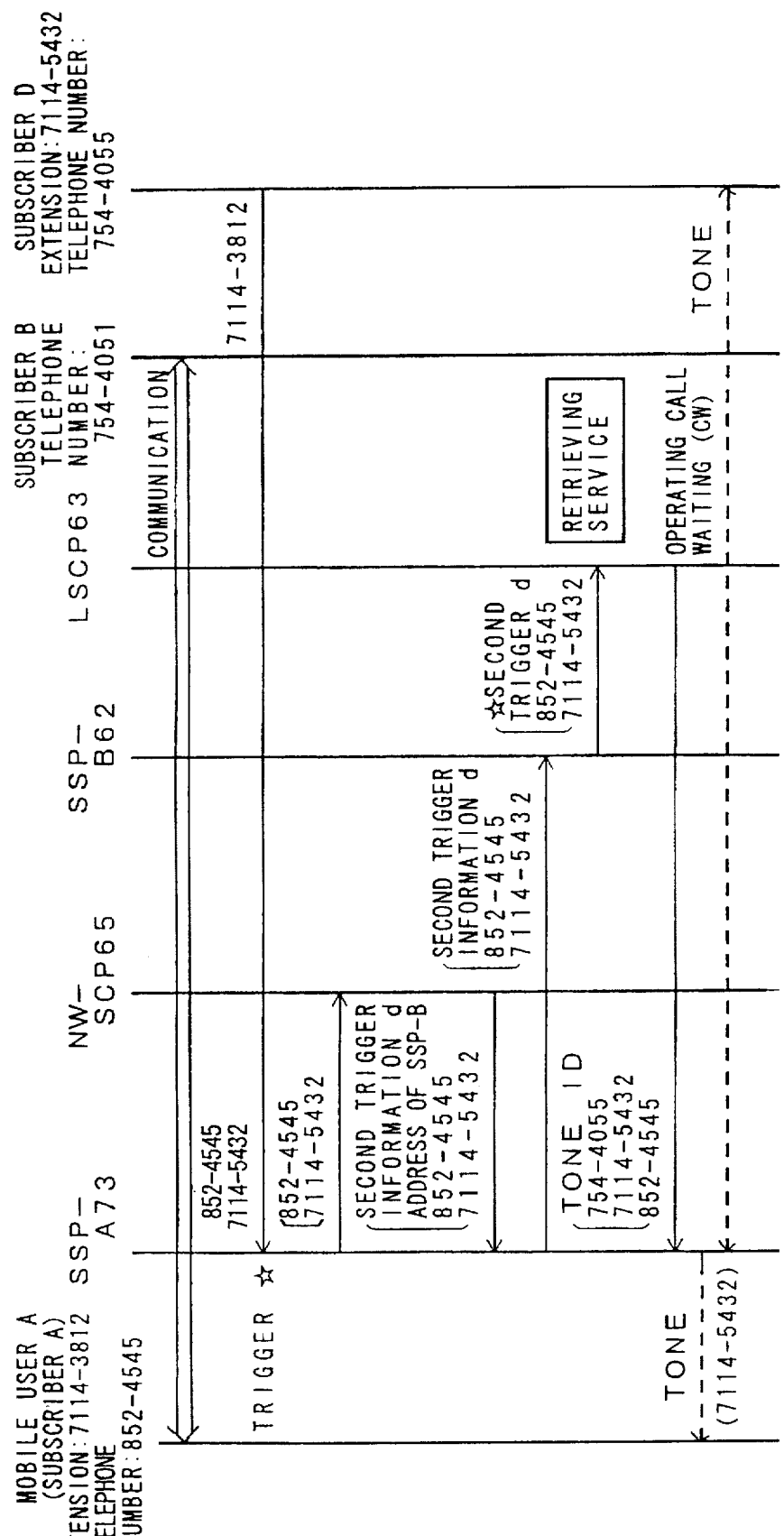
FIG. 39 shows the procedure (1) of activating a call wait service according to the first aspect.
Figure 40:
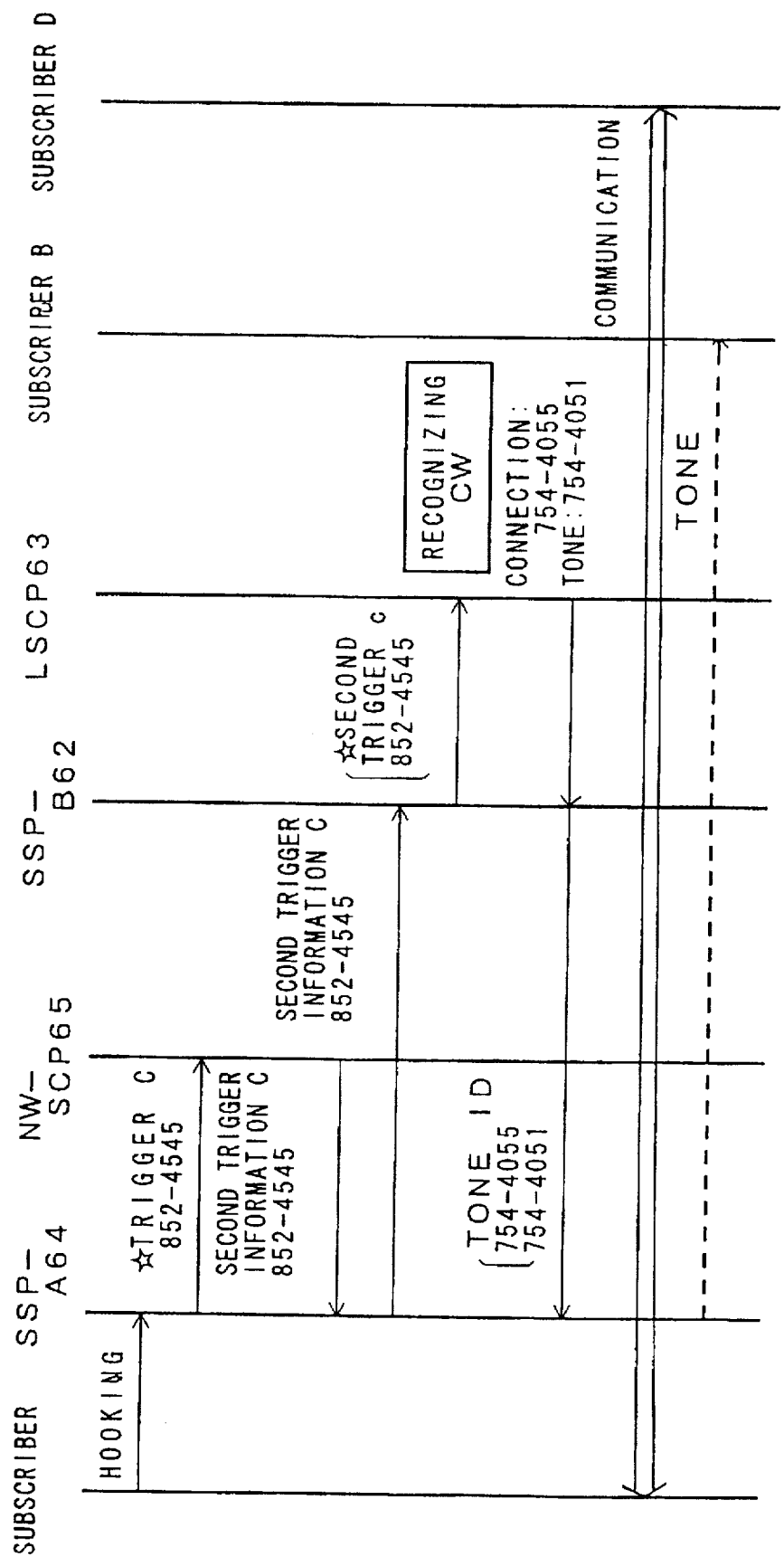
FIG. 40 shows the procedure (2) of activating a call wait service according to the first aspect.

FIGS. 39 and 40 show the procedure of activating a call waiting service in the first management form. In this example, subscriber D calls subscriber A during the communications between subscriber A and subscriber B, and subscriber A communicates with subscriber D with subscriber B being kept in the wait state. Subscriber A is set to be provided with a call waiting service, and accordingly the hooking detection trigger and the call waiting detection trigger are set in the SSP-A 64.

If subscriber D calls subscriber A during the communications between subscriber A and subscriber B, then the call waiting detection circuit 84 in the SSP-A 64 detects the arrival of the call and retrieves the trigger d of the exchange data. Since the trigger d (call waiting detection trigger) is set, it is considered that the trigger has been detected and the SSP-A 64 transfers the telephone number 852-4545 of subscriber A and the extension number 7114-5432 of subscriber D to the NW-SCP 65, and notifies the NW-SCP 65 of the call waiting detection at subscriber A. On receiving the notification, the NW-SCP 65 retrieves the network address of the SSP-B 62 and transfers to the SSP-B 62 the fourth trigger information d, the telephone number of subscriber A, and the extension number of subscriber D.

Upon receipt of the fourth trigger information d, the SSP-B 62 notifies the LSCP 63 of the telephone number of subscriber A and the extension number of subscriber D, and asks the LSCP 63 to retrieve a service to be provided for subscriber A at the arrival of a call as a call waiting. The LSCP 63 retrieves the subscriber data U1 and the service profile based on the telephone number of subscriber A. When the LSCP 63 recognizes through the retrieval that subscriber A is set to be provided with a call waiting service, it transfers to the SSP-A 64 the telephone numbers 852-4545 and 754-4055 of subscribers A and D, the extension number 7114-5432 of subscriber D, and the tone ID specifying the ringing tone to the subscribers. The LSCP 63 is set to connect and exchange a call when subscriber A performs a hooking.

According to the tone ID, the SSP-A 64 issues a tone notifying that there is a call waiting to subscriber A, and also issues a ringing tone to subscriber D.

If subscriber A answers the tone with a hooking, then the hooking detection circuit 83 in the SSP-A 64 detects the hooking and the SSP-A 64 checks whether or not the flag of the trigger c of the trigger information of the exchange data SSP is set. Since the flag of the trigger c (hooking detection trigger) is set in this case, it is considered that the trigger has been detected and the SSP-A 64 transfers to the NW-SCP 65 the telephone numbers of subscribers A, and notifies the NW-SCP 65 of the detection of the hooking at subscriber A. Upon receipt of the notification, the NW-SCP 65 retrieves the network address of the SSP-B 62 and transfers the telephone numbers of subscribers A to the SSP-B 62.

Upon receipt of the fourth trigger information c, the SSP-B 62 transmits the telephone numbers of subscribers A to the LSCP 63 and asks it to retrieve a process in response to the hooking. According to the telephone number of subscriber A, the LSCP 63 retrieves the subscriber data U1 of subscriber A and the service profile. Since a call connection exchange is set in this case, the LSCP 63 obtains the telephone number 754-4055 of subscriber D which is the destination after the exchange, the telephone number 754-4051 of the waiting subscriber B which is kept in the wait state during the communications of subscriber D, transmits the numbers and the tone ID specifying the ringing tone to subscriber B to the SSP-A 64.

The SSP-A 64 connects subscriber A to subscriber D according to the above described information, and issues to subscriber B a hold tone corresponding to the above described tone ID with the announcing voice "Hold the line, please."

Figure 41:
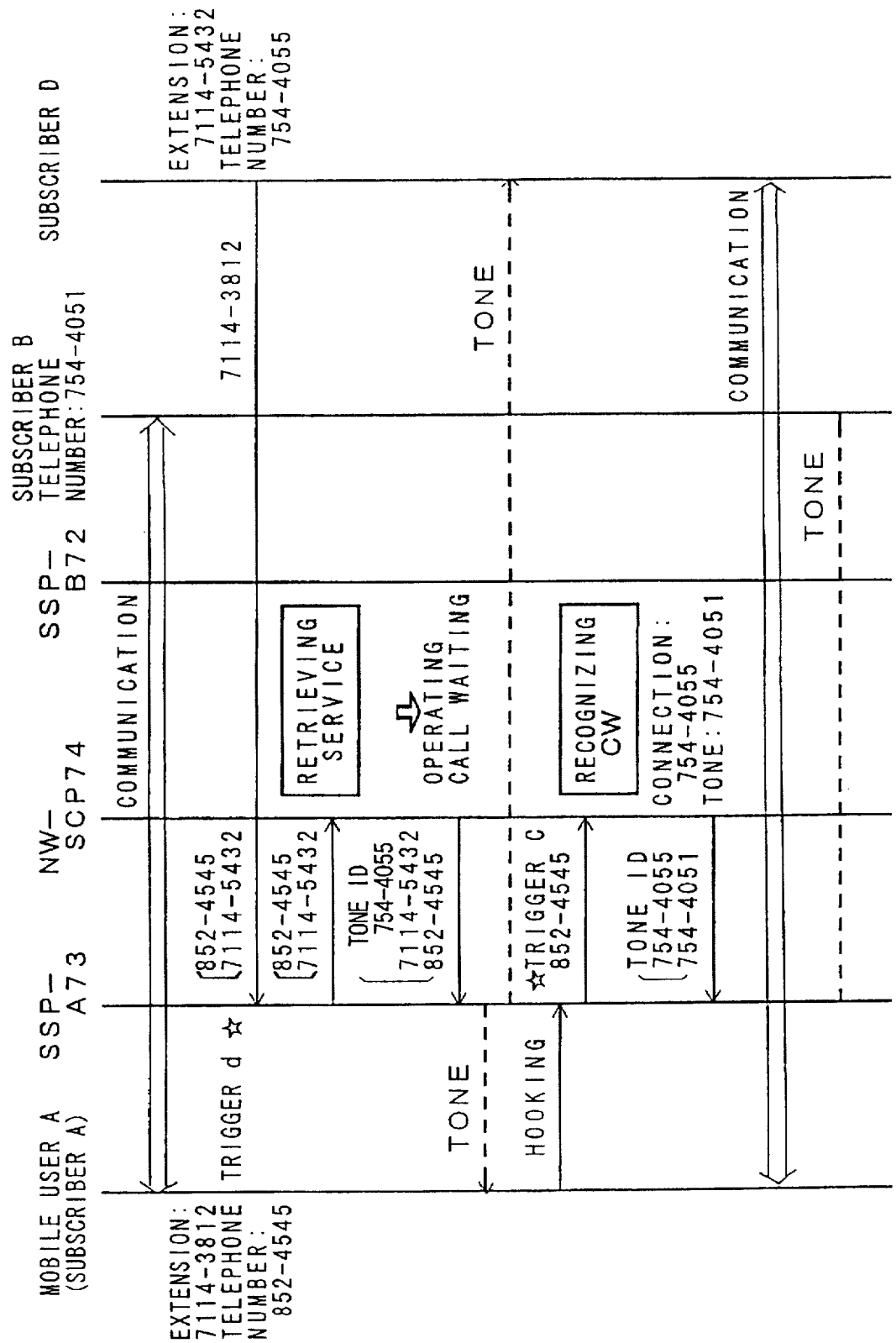
FIG. 41 shows the procedure of activating a call wait service according to the fourth aspect.

FIG. 41 shows the procedure of activating the call waiting service in the fourth management form. In this example, when subscriber D calls subscriber A while subscriber A is communicating with subscriber B belonging to the same centralized extension service group as subscriber A, subscriber A communicates with subscriber D while subscriber B is being kept in the wait state. As in the first management form, the SSP-A 73 is set to provide subscriber A with a call waiting service, according to which a hooking detection trigger and a call waiting detection trigger are set.

If subscriber D calls subscriber A during the communications between subscribers A and B, the call waiting detection circuit 84 in the SSP-A 73 detects the arrival of the call, and retrieves the flag of the trigger d of the service file of the exchange data SSP. Since the trigger d (call waiting detection trigger) is set, it is considered that the trigger has been detected and the SSP-A 73 transfers to the NW-SCP 74 the telephone number 852-4545 of subscriber A and the extension number 754-4055 of subscriber D, and notifies the NW-SCP 74 of the call waiting detection at subscriber A. Upon receipt of the notification, the NW-SCP 74 retrieves the subscriber data U1 of subscriber A and the service profile according to the telephone number of subscriber A and recognizes the service to be provided for subscriber A. When the NW-SCP 74 recognizes that the subscriber A is set to receive a call waiting service, it transfers to the SSP-A 73 the telephone numbers 852-4545 and 754-4055 of subscribers A and D together with the tone IDs specifying the ringing tone to the subscribers. At this time, the NW-SCP 74 sets the system such that a call connection is exchanged if subscriber A performs a hooking.

According to the tone ID, the SSP-A 73 sends a tone announcing the call waiting at subscriber A. On the other hand, it sends a ringing tone to subscriber D.

If subscriber A answers the tone with a hooking, then the hooking detection circuit 83 in the SSP-A 73 detects the hooking and checks whether or not the flag of the trigger c of the service file of the exchange data SSP is set. Since the flag of the trigger c (hooking detection trigger) is set in this case, it is considered that the trigger c has been detected. The SSP-A 73 transfers the telephone numbers of subscribers A to the NW-SCP 74, and notifies the NW-SCP 74 of the detection of the hooking. Upon receipt of the notification, the NW-SCP 74 retrieves the subscriber data U1 of subscriber A and the service profile according to the telephone number of subscriber A, and recognizes the process for the hooking. Since a call connection change is set, the NW-SCP 74 obtains the telephone number 754-4055 of subscriber D which is the destination after the exchange, the telephone number 754-4051 of the waiting subscriber B which is kept in the wait state during the communications of subscriber D, transmits the numbers and the tone ID specifying the ringing tone to subscriber B to the SSP-A 73.

The SSP-A 73 connects subscriber A to subscriber D according to the above described information, and issues to subscriber B a hold tone corresponding to the above described tone ID with the announcing voice "Hold the line, please."

Explained by referring to FIGS. 39 through 41 are the call waiting services where centralized extension service subscribers are the person who communicates with subscriber A (subscriber B) and the call sender (subscriber D) who sends a call to subscriber A during the communications between subscribers A and B. However, the services can be provided even if the subscribers B and D are not centralized extension services subscribers.

As described above, there are many common capabilities in the procedures of performing centralized extension services between the first and fourth management forms. However, the fourth mode is recommended because it requires less steps. Therefore, if a data base can be retrieved more quickly in the NW-SCP 74, the first management mode will be completely replaced with the fourth form.

If, as described above, the data stored and managed in the first management form by the LSCP 63 are the same as those stored and managed in the fourth form by the NW-SCP 74. Therefore, the first mode can be easily replaced with the fourth form by transferring the data stored in the LSCP 63 to the NW-SCP 74. The effect can be obtained by realizing a centralized extension service with the IN configuration.

A centralized extension service subscriber (subscriber A) frequently goes out of the office where his or her telephone set is mounted. In this case, if a call arrives while he or she is away from the office, the call should be processed appropriately.

In this example, described below is the entry of subscriber A who has been entered for a centralized extension service in the above described procedure and moves from the office where the telephone set A accommodated by the SSP-A 73 is mounted to another place. Subscriber A is leaving the office in 60 minutes.

First, subscriber A dials the special number (mobility entry access code: for example, 0120-123457) indicating a mobility entry of a centralized extension service subscriber. The mobility entry access code is transmitted together with the telephone number 852-4545 of subscriber A to the NW-SCP 74. Upon receipt of the notification, the NW-SCP 74 recognizes the request for a mobility entry from subscriber A, and prompts subscriber A for a centralized extension service ID (CTXID), a subscriber code (subID), and a password as in the procedure described by referring to FIG. 28.

The NW-SCP 74 receives the information from subscriber A, compares it with the data set in the subscriber data U1, and recognizes that the entry request is made by subscriber A. Then, the NW-SCP 74 sends to subscriber A the announcement "Please set the time to start the service." The time to start the service refers to the minutes to go to start the mobility process service. In response to the announcement, subscriber A enters "60#" because he or she intends to leave the office in 60 minutes. If subscriber A wants to immediately start the service, "0#" should be input. Since the service starting time can be properly set, the subscriber can make the entry without fail even if he or she is very busy before going out.

On receiving the time set by subscriber A, the NW-SCP 74 prompts subscriber A to specify the process to be performed on a call arriving while subscriber A is away from the office. The centralized extension service in the present embodiment provides announcement connection, mailbox, call transfer, and FAX connection services, and the NW-SCP 74 prompts subscriber A to select one of the services.

If the announce connection service is selected, then the NW-SCP 74 sends the announcement "Subscriber A is now on the move." in response to the arrival of a call while he or she is out. If the mailbox service is selected, then the NW-SCP 74 stores a sender's message to subscriber A if it arrives while subscriber A is away from the office. Subscriber A can be informed of the arrival of the call while he or she is away from the office and receives the message if subscriber accesses the mailbox.

If the call transfer service has been selected, then the NW-SCP 74 prompts subscriber A to enter the number of the transfer destination. The transfer destination number can be a telephone number or an extension number. If subscriber A enters the transfer destination, then the NW-SCP 74 notifies subscriber A of the extension number. Thus, the arrival of a call while subscriber A is on the move is correctly transferred to the transfer destination specified by subscriber A.

If the FAX connection service has been selected, then the NW-SCP 74 sends the announcement "Subscriber A is now on the move. This line is switched for a FAX service." in response to the arrival of a call during subscriber A is away from the office. On the other hand, the sender of the call to subscriber A is allowed to FAX-communicates to subscriber A using the same number of subscriber A.

Described below is another embodiment of setting the telephone number of the destination and the time taken for arriving at the destination (mobile time).

This embodiment is similar to the above described embodiment in the process steps before and including the entry of a centralized extension service ID, a subscriber code, and a password at the request of the NW-SCP 74. Then, the NW-SCP 74 prompts subscriber A to enter the mobile time by sending the announcement "Enter the mobile time." If the expected mobile time is 90 minutes, then subscriber A enters "90#". Then, the NW-SCP 74 prompts subscriber A to enter the telephone number of the destination by sending the announcement "Enter the telephone number of the destination." In response to the prompt, subscriber A enters the telephone number of the destination. Upon receipt of the telephone number of the destination, the NW-SCP 74 sets the telephone number of the destination as being associated with subscriber A in the subscriber data. Practically, the telephone number of the destination is written in 90 minutes to the area which stores the present position of subscriber A in the subscriber data U2.

The following procedure is the same as that of the above described embodiment, and a subscriber selects as a mobile process one of the announcement connection, mailbox, and call transfer services.

The above described entry permits a predetermined service to be performed when a call arrives within 90 minutes from the present time at the telephone set (mounted at a place where a subscriber is located before movement) entered for the above described service (announcement connection, mailbox, or call transfer). After 90 minutes, the telephone set entered as a destination can be provided with a predetermined service as a centralized extension service subscriber. That is, any telephone set at a remote site can be entered for a centralized extension service at a time specified by subscriber A.

The mobile entry of a centralized extension service subscriber can be performed by either the first or fourth form. An optional telephone set connected to the network 61 or 71 can also be entered.

In the above mentioned embodiment, communications through telephone sets are explained as an example of a communications device. However, the present invention is not limited to this application, but can be applied to other communications devices. For example, it is applied to data communications among computers.

When communications are established between a communications device connected to a public network and another communications device accommodated by a communications network of another number system according to the communications device entry method of the present invention, the common subscriber number of the communications device in the public network is entered as being associated with an optional number in the other number system. Therefore, a user can enter an optional communications device connected to the public network as a communications device in the communications network of the other number system.

In the communications system according to the present invention, the communications device connected to the public network entered by the above described method is entered as an extension of the communications network (private network or local network) of the other number system. Therefore, if a call is sent from the communications device to an optional communications device accommodated by the private network, then the call can be connected by dialing the extension number in the number system of the private network. The communications fee is charged to the representative number of the private network. If a call is sent from an optional communications device accommodated by the private network to the entered communications device, then the call can be connected by dialing the extension number in the number system of the private network assigned to the communications device.

Furthermore, an optional communications device connected to the public network can be used as if it were a communications device accommodated by a specific centralized extension service (or a PBX), and the optional communications device can be provided with various services presented by the centralized extension service (or the PBX). Thus, the user can be easily provided with the various services presented by the centralized extension service (or the PBX) through the communications device connected to the public network even when the user is away from his or her office.

What is claimed is:

1. A communications device entry method applied to a communications system in which a first communications network in a first number system and a secod communications network in a second number system are connected; comprising the steps of:

sending a predetermined special number from a communications device connected to the first communications network;

issuing a request from a service control device which receives the special number to the communications device for user identification information of the communications device;

transferring the user identification information from the communications device to the service control device upon receiving the request from the service control device;

determining in the service control device whether the user identification is valid, and in the event that it is valid sending from the service control device to the communications device a request for a user number assigned to the communications device in the first number system;

sending the user number in the first number system assigned to the communications device from the communications device to the service control device in response to the request for the user number; and associating in the service control device the user number in the first number system assigned to the communications device with a predetermined number in the second number system.

2. The communications device entry method according to claim 1, further comprising the steps of:

requesting from the service control device to the communications device to enter a predetermined service code indicating an effective service period; and giving notice of a selected service code from the communications device to the service control device at the request.

3. A service control device with entry capabilities operated in a communications system connected to a first communications network in a first number system and a second communications network in a second number system, comprising:

identification information requesting means for prompting a communications device connected to the first communications network for user identification information of the communications device when said identification information requesting means receives a predetermined special number from the communications device;

confirming means for receiving the user identification information from the communications device and checking whether or not the identification information is preliminarily entered;

user number requesting means for prompting the communications device for a user number assigned to the communications device in the first number system when said confirming means confirms that the identification information is preliminarily entered; and entering means for receiving the user number transmitted from the communications device in response to the prompting, and entering in a data base the user number as being associated with a predetermined number in the second number system.

4. A communications system connected to a first communications network in a first number system and a second communications network in a second number system; comprising:

a communications device connected to the first communications network and assigned a predetermined number in the first number system;

a service control device with entry capabilities for communicating with the communications device in a predetermined procedure and entering in a data base, as associating with a predetermined number in the second number system, the predetermined number in the first number system assigned to the communications device obtained by the communicating with the communications device; and an exchange for accommodating a station line connected to the first communication in the network and an extension in the fourth communications network.

5. A communications system connected to a public network in a first number system and a private network in a second number system, comprising:
- a first communications device connected to the public network and assigned a first user number in the first number system;
- a service control device with entry capabilities comprising:
  - identification information requesting means for prompting said first communications device for user identification information of a user of said first communications device when said identification information requesting means receives a predetermined special number from said first communications device;
  - confirming means for receiving the user identification information and checking whether or not the user identification information is preliminarily entered;
  - user number requesting means for prompting the user for a user number when said confirming means confirms that the user identification information is preliminarily entered; and
  - entering means for receiving the first user number, assigning a first extension number in the second number system to said first communications device, and entering in a data base the first extension number as being associated with the first user number; and
- a local exchange for accommodating a station line connected to the public network and an extension in the private network.

6. A communications system connected to a public network in a first number system and a private network in a second number system, comprising:
- a first communications device connected to the public network and assigned a first user number in the first number system;
- a service control device with entry capabilities for communicating with the first communications device in a predetermined procedure and entering in a data base, as associating with a first extension number in the second number system, the first user number in the first number system assigned to the first communications device obtained by the communicating with the communications device; and
- a local exchange for accommodating a station line connected to the public network and an extension in the private network.

7. The communications system according to claim 6, wherein
- if the first communications device issues a second extension number in the second number system, then the service control device receives the second extension number through the public network, refers to the data base according to the second extension number, and performs a routing process exchange to transfer the second extension number to the local exchange.

8. The communications system according to claim 7, wherein
- said service control device charges for communications between the first communications device and a communications device having the second extension number to a number of the local exchange or a predetermined number.

9. The communications system according to claim 6, wherein
- if an optional communications device accommodated as an extension of the private network issues the first extension number, then the service control device receives the first extension number through the public network, extracts the first user number by referring to the data base according to the first extension number, and controls the public network to call the first communications device using the first user number.

10. The communications system according to claim 9, wherein:
- the first communications device is called as an extension call from the private network.

11. A communications system connected to a public network in a first number system and a private network in a fourth number system, comprising:
- first and fourth communications devices connected to the public network and assigned first and fourth user numbers respectively in a first number system; and
- a service control device with entry capabilities for communicating with the first communications device in a predetermined procedure, entering in a data base the first user number as being associated with a first extension number in the second number system, likewise communicating with the second communications device in a predetermined procedure, entering in the data base the second user number as being associated with a second extension number in the fourth number system, wherein
- if the first communications device issues the second extension number, then the service control device receives the second extension number through the public network, extracts the second user number by referring to the data base according to the second extension number, and controls the public network to call the second communications device using the second user number.

12. The communications system according to claim 11, wherein:
- the service control device charges for communications between the first communications device and the second communications device to a predetermined number.

13. A communications device entry method applied to a communications system having a first exchange for accommodating a centralized extension service subscriber grouped according to predetermined centralized extension service identification information, a local Service Control Point (SCP), connected to the first exchange, for managing the centralized extension service, a network SCP connected to the first exchange through a network, and a second exchange connected to the network, comprising the steps of:
- sending to the fist exchange a service activate request from an optional communications device;
- notifying the network SCP from the first exchange via the network of a predetermined number for entry corresponding to the service activate request and an identification number of the optional communications device to be accommodated by the second exchange;
- notifying by the network SCP the local SCP of entry request information and the identification number of the communications device;
- requesting by the local SCP, in response to a notification from the network SCP, to the communications device for the centralized extension service identification information and information identifying a user who sent the service activate request through the communications device;
- sending, in response to a request from the local SCP, from the communications device to the local SCP the centralized extension service identification information and the information identifying the user; and determining by the local SCP the centralized extension service to be provided for the communications device according to the centralized extension service identification information or the information identifying the user received from the communications device.

14. The communications device entry method according to claim 13, further comprising the step of:

specifying an effective period of the service provided for the communications device.

15. The communications device entry method according to claim 13, further comprising the step of:

selecting one communications device entry mode from a mode effective until an entry is released, a mode effective only during a period specified by the entry, and a mode effective at each call of the entry.

16. The communications device entry method according to claim 13, further comprising the step of:

setting by the network SCP a trigger to activate the centralized extension service in the fourth exchange according to the determined centralized extension service.

17. The communications device entry method according to claim 13, further comprising the step of:

assigning by the local SCP to the communications device a number in a number system adopted in the centralized extension service group.

18. The communications device entry method according to claim 13, further comprising the steps of:

acquiring by the local SCP a service to be provided for the communications device by communicating with the user through the communications device; and setting by the local SCP the acquired service associated with the user identification information in a service profile.

19. A communications device entry method applied in a communications system having a first exchange accommodating a centralized extension service subscriber grouped according to predetermined centralized extension service identification information, a network Service Control Point (SCP), connected to the first exchange, for managing a centralized extension service, and a second exchange connected to the network, comprising the steps of:

sending to the second exchange a service activate request from an optional communications device;

notifying by the fourth exchange via the network the network SCP of a predetermined number for entry corresponding to the service activate request and an identification number of the optional communications device;

requesting by the network SCP the communications device to enter centralized extension service identification information and information identifying a user who sent the service activate request from the communications device;

sending the centralized extension service identification information and the user identification information from the communications device to the network SCP; and determining by the network SCP a centralized extension service to be provided for the communications device according to the centralized extension service identification information or the user identification information received from the communications device.

20. The communications device entry method according to claim 19, further comprising the step of:

specifying an effective period of a service provided for the communications device.

21. The communications device entry method according to claim 19, further comprising the step of:

selecting one communications device entry mode from a mode effective until an entry is released, a mode effective only during a period specified by the entry, and a mode effective at each call of the entry.

22. The communications device entry method according to claim 19, further comprising the step of:

setting by the network SCP a trigger to activate the centralized extension service in the second exchange according to the determined centralized extension service.

23. The communications device entry method according to claim 19, further comprising the step of:

assigning by the network SCP to the communications device a number in a number system adopted in the centralized extension service group.

24. The communications device entry method according to claim 19, further comprising the steps of:

acquiring by the network SCP a service to be provided for the communications device by communicating with the user through the communications device; and setting by the network SCP the acquired service associated with the user identification information in a service profile.

25. A communications device entry method applied in a communications system having a first exchange accommodating a centralized extension service subscriber grouped according to predetermined centralized extension service identification information, a Service Control Point (SCP) for managing centralized extension services, and a second exchange connected to the first exchange through a network, comprising the steps of:

sending to the first exchange a service activate request from a first communications device;

notifying via the network by the first exchange the SCP of a predetermined number corresponding to the service activate request for mobility entry and an identification number of the first communications device accommodated by the second exchange;

requesting by the SCP the first communications device to enter centralized extension service identification information and identification information about a user who sent the service activate request from the first communications device;

sending, in response to the request, the centralized extension service identification information the identification information about the user from the first communications device to the SCP;

requesting by the SCP, in response to the information from the first communications device, mobile time information to the user sending, upon request by the SCP mobile time information from the first communications device to the SCP; and controlling by the SCP a predetermined service to be provided for a sender of a call if the call arrive at the first communications device in a period indicated by the mobile time information received from the first communications device.

26. The communications device entry method according to claim 25, further comprising the steps of:

requesting by the SCP the user to enter an identification number of a second communications device provided at a moved-to position of the user;

sending, at a request of the SCP, the identification number of the second communications device from the first communications device to the SCP; and entering by the SCP the second communications device for a centralized extension service if time period defined by the mobile time information has passed.

27. The communications device entry method according to claim 25, further comprising the step of:

specifying by the user through the first communications device to the SCP a service to be provided for a sender of a call to the first communications device during the mobile time of the user.

28. The communications device entry method according to claim 25, further comprising the step of:

requesting by the SCP the user to enter one service chosen from a group comprising announcement, mailbox, call transfer, and FAX connection services through the first communications device, whereby the service is to be provided for the sender of a call to the first communications device during the mobile time of the user.

* * * * *